US012509522B2

(12) United States Patent
Rommelaere et al.

(10) Patent No.: US 12,509,522 B2
(45) Date of Patent: Dec. 30, 2025

(54) POLYPEPTIDES COMPRISING IMMUNOGLOBULIN SINGLE VARIABLE DOMAINS TARGETING IL-13 AND OX40L

(71) Applicants: Ablynx N.V., Zwijnaarde (BE); Sanofi, Paris (FR)

(72) Inventors: Heidi Rommelaere, Ghent (BE); Ann Brigé, Ertvelde (BE); Sigrid Cornelis, Sint Martens-Latem (BE); Bruno Dombrecht, Heusden (BE); Klaus Erb, Ingelheim Am Rhein (DE); Eric Lorent, Zwijnaarde (BE); John Park, Warthausen (DE); Robert Resnick, Bridgewater, NJ (US); Melanie Rieger, Zwijnaarde (BE); Bernd Weigle, Ingelheim Am Rhein (DE)

(73) Assignees: Ablynx N.V., Zwijnaarde (BE); Sanofi, Paris (FR)

( * ) Notice: Subject to any disclaimer, the term of this patent is extended or adjusted under 35 U.S.C. 154(b) by 373 days.

(21) Appl. No.: 17/483,967

(22) Filed: Sep. 24, 2021

(65) Prior Publication Data

US 2022/0153854 A1   May 19, 2022

Related U.S. Application Data

(60) Provisional application No. 63/093,804, filed on Oct. 20, 2020, provisional application No. 63/083,222, filed on Sep. 25, 2020.

(30) Foreign Application Priority Data

Sep. 28, 2020  (EP) ..................................... 20315421
Sep. 29, 2020  (EP) ..................................... 20306115

(51) Int. Cl.
| | |
|---|---|
| *C07K 16/00* | (2006.01) |
| *A61K 39/00* | (2006.01) |
| *A61P 11/06* | (2006.01) |
| *A61P 37/08* | (2006.01) |
| *C07K 16/24* | (2006.01) |
| *C07K 16/28* | (2006.01) |
| *C07K 16/46* | (2006.01) |
| *C12N 5/00* | (2006.01) |
| *C12N 15/09* | (2006.01) |

(52) U.S. Cl.
CPC .......... *C07K 16/2875* (2013.01); *A61P 11/06* (2018.01); *A61P 37/08* (2018.01); *C07K 16/244* (2013.01); *A61K 39/00* (2013.01); *A61K 2039/505* (2013.01); *C07K 2317/31* (2013.01); *C07K 2317/565* (2013.01); *C07K 2317/569* (2013.01); *C07K 2317/76* (2013.01)

(58) Field of Classification Search
None
See application file for complete search history.

(56) References Cited

FOREIGN PATENT DOCUMENTS

| WO | WO 2011/073180 A1 | 6/2011 | |
|---|---|---|---|
| WO | WO 2015/173325 A2 | 11/2015 | |
| WO | WO-2017068186 A1 * | 4/2017 | .............. A61P 31/04 |
| WO | WO 2021/110817 A1 | 6/2021 | |
| WO | WO 2021/116182 A1 | 6/2021 | |

OTHER PUBLICATIONS

Al Qaraghuli et al. Antibody-protein binding and conformational changes: identifying allosteric signalling pathways to engineer a better effector response. Nature Scientific Reports 10:13969, (2020). (Year: 2020).*
Edwards et al. The remarkable flexibility of the human antibody repertoire; isolation of over one thousand different antibodies to a single protein, BLyS. Journal of Molecular Biology 334:103-118; (2003). (Year: 2003).*
Rudikoff et al. Single amino acid substitution altering antigen-binding specificity Proc. Natl. Acad. Sci. USA, 79(6):1979-1983, (Mar. 1982). (Year: 1982).*
Guo et al. Protein tolerance to random amino acid change. PNAS USA 101(25):9205-10; (2004). (Year: 2004).*
Yu et al. A methodological review of induced animal models of autoimmune diseases. Autoimmunity Reviews 17:473-479, (2018). (Year: 2018).*
Lommatzsch et al. Roads to remission: evolving treatment concepts in type 2 inflammatory diseases. The Lancet vol. 80:1-13, (Feb. 2025). (Year: 2025).*
Zittersteign et al. A primer to gene therapy: Progress, prospects, and Problems. Journal of Inher. Metab. Disease 44:54-71, (2021). (Year: 2021).*
Miao, X. Recent advances in the development of new transgenic animal technology Cell. Mol. Life Sci. 70:815-828, (2013). ( (Year: 2013).*
[No Author Listed], Kymab Announces Positive Phase 2a Results for KY1005 in Moderate to Severe Atopic Dermatitis. Kymab Group Ltd. Newswire Distribution Network & Management. Retrieved from www.globenewswire.com. Aug. 11, 2020. 5 pages.
Di et al., Basophil-associated OX40 ligand participates in the initiation of Th2 responses during airway inflammation. J Biol Chem. May 15, 2015;290(20):12523-36. doi: 10.1074/jbc.M115.642637. Epub Apr. 3, 2015.
Lei et al., Crucial role of OX40/OX40L signaling in a murine model of asthma. Mol Med Rep. Mar. 2018;17(3):4213-4220. doi: 10.3892/mmr.2018.8453. Epub Jan. 18, 2018.

(Continued)

*Primary Examiner* — Elizabeth C. Kemmerer
*Assistant Examiner* — Regina M DeBerry
(74) *Attorney, Agent, or Firm* — MH2 Technology Law Group, LLP

(57) ABSTRACT

The present disclosure provides a novel type of drug for treating a subject suffering from an inflammatory disease. Specifically, the disclosure provides polypeptides comprising at least three immunoglobulin single variable domains (ISVDs), characterized in that at least one ISV binds to OX40L and at least two ISVDs bind to IL-13. The present disclosure also provides nucleic acids, vectors and compositions.

20 Claims, 15 Drawing Sheets

Figure 1:
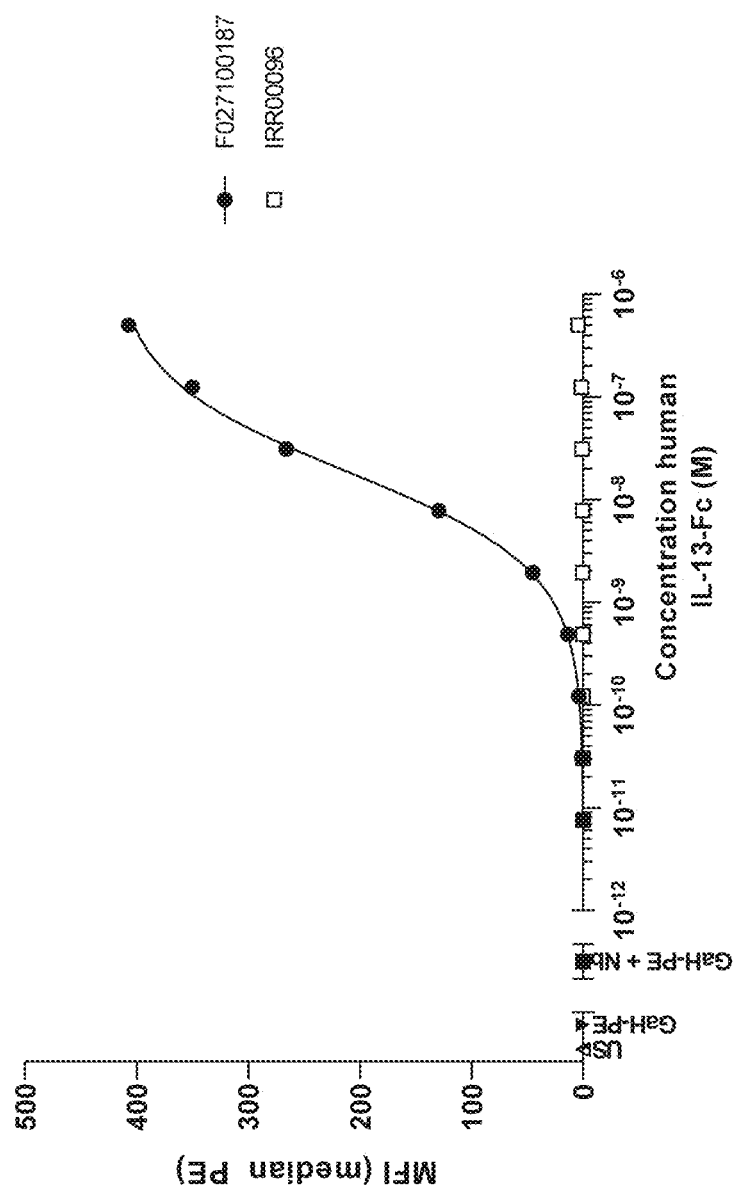

Specification includes a Sequence Listing.

(56) References Cited

OTHER PUBLICATIONS

Li et al., A meta-analysis of anti-interleukin-13 monoclonal antibodies for uncontrolled asthma. PLoS One. Jan. 31, 2019;14(1):e0211790. doi: 10.1371/journal.pone.0211790. 13 pages.

Ma et al., Elevated serum OX40L is a biomarker for identifying corticosteroid resistance in pediatric asthmatic patients. BMC Pulm Med. Mar. 19, 2019;19(1):66. doi: 10.1186/s12890-019-0819-5.

Marone et al., The Intriguing Role of Interleukin 13 in the Pathophysiology of Asthma. Front Pharmacol. Dec. 6, 2019;10:1387. doi: 10.3389/fphar.2019.01387.

Newsom et al., New and Emerging Systemic Treatments for Atopic Dermatitis. Drugs. Jul. 2020;80(11):1041-1052. doi: 10.1007/s40265-020-01335-7.

Ratnarajah et al., Inhibition of IL-13: A New Pathway for Atopic Dermatitis. J Cutan Med Surg. May-Jun. 2021;25(3):315-328. doi: 10.1177/1203475420982553. Epub Dec. 22, 2020.

\* cited by examiner

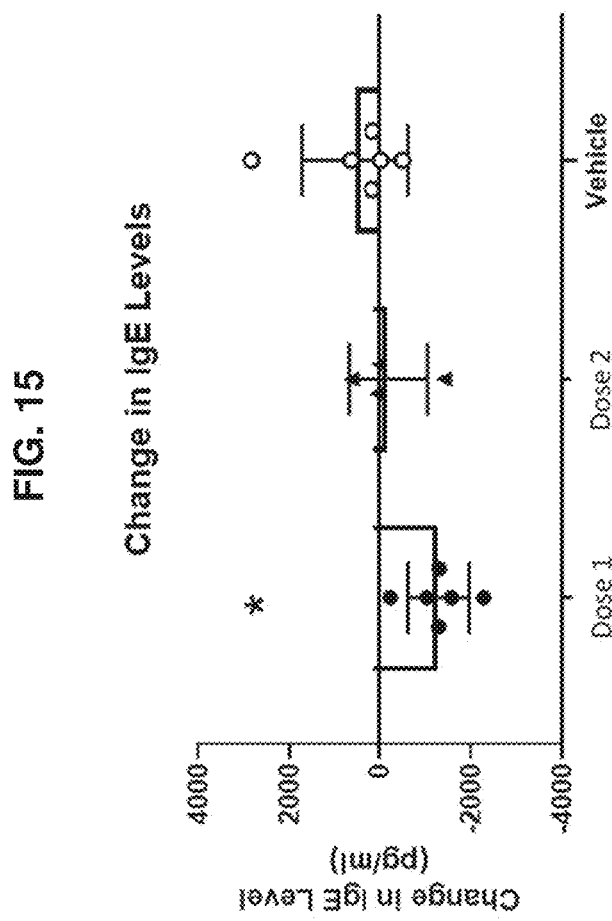

SEQUENCE LISTING

<160> NUMBER OF SEQ ID NOS: 149

<210> SEQ ID NO 1
<211> LENGTH: 509
<212> TYPE: PRT
<213> ORGANISM: Artificial Sequence
<220> FEATURE:
<223> OTHER INFORMATION: Nanobody sequence

<400> SEQUENCE: 1

```
Asp Val Gln Leu Val Glu Ser Gly Gly Gly Val Val Gln Pro Gly Gly
1               5                   10                  15

Ser Leu Arg Leu Ser Cys Ala Ala Ser Arg Ser Ile Gly Arg Tyr Asp
            20                  25                  30

Arg Met Gly Trp Tyr Arg His Arg Pro Gly Glu Pro Arg Glu Leu Val
        35                  40                  45

Ala Thr Ile Thr Gly Gly Ser Ser Ile Asn Tyr Gly Asp Ser Val Lys
    50                  55                  60

Gly Arg Phe Thr Ile Ser Ile Asp Asn Ser Lys Asn Thr Val Tyr Leu
65                  70                  75                  80

Gln Met Asn Ser Leu Arg Pro Glu Asp Thr Ala Leu Tyr Tyr Cys Asn
                85                  90                  95

Phe Asn Lys Tyr Gln Ile Ser Arg Asp Thr Trp Gly Gln Gly Thr Leu
            100                 105                 110

Val Thr Val Ser Ser Gly Gly Gly Gly Ser Gly Gly Gly Ser Glu Val
        115                 120                 125

Gln Leu Val Glu Ser Gly Gly Gly Val Val Gln Pro Gly Gly Ser Leu
    130                 135                 140

Arg Leu Ser Cys Ala Ala Ser Gly Arg Thr Phe Ser Ser Tyr Arg Met
145                 150                 155                 160

Gly Trp Phe Arg Gln Ala Pro Gly Lys Glu Arg Glu Phe Val Ala Ala
                165                 170                 175

Leu Ser Gly Asp Gly Tyr Ser Thr Tyr Thr Ala Asn Ser Val Lys Gly
            180                 185                 190

Arg Phe Thr Ile Ser Arg Asp Asn Ser Lys Asn Thr Val Tyr Leu Gln
        195                 200                 205

Met Asn Ser Leu Arg Pro Glu Asp Thr Ala Leu Tyr Tyr Cys Ala Ala
    210                 215                 220

Lys Leu Gln Tyr Val Ser Gly Trp Ser Tyr Asp Tyr Pro Tyr Trp Gly
225                 230                 235                 240

Gln Gly Thr Leu Val Thr Val Ser Ser Gly Gly Gly Gly Ser Gly Gly
                245                 250                 255

Gly Ser Glu Val Gln Leu Val Glu Ser Gly Gly Gly Val Val Gln Pro
            260                 265                 270

Gly Gly Ser Leu Arg Leu Ser Cys Ala Ala Ser Gly Phe Thr Phe Arg
        275                 280                 285

Ser Phe Gly Met Ser Trp Val Arg Gln Ala Pro Gly Lys Gly Pro Glu
    290                 295                 300

Trp Val Ser Ser Ile Ser Gly Ser Gly Ser Asp Thr Leu Tyr Ala Asp
305                 310                 315                 320

Ser Val Lys Gly Arg Phe Thr Ile Ser Arg Asp Asn Ser Lys Asn Thr
                325                 330                 335

Leu Tyr Leu Gln Met Asn Ser Leu Arg Pro Glu Asp Thr Ala Leu Tyr
            340                 345                 350

Tyr Cys Thr Ile Gly Gly Ser Leu Ser Arg Ser Ser Gln Gly Thr Leu
```

```
                355                 360                 365
Val Thr Val Ser Ser Gly Gly Gly Ser Gly Gly Ser Glu Val
    370                 375                 380
Gln Leu Val Glu Ser Gly Gly Val Val Gln Pro Gly Gly Ser Leu
385                 390                 395                 400
Arg Leu Ser Cys Ala Ala Ser Gly Phe Thr Phe Asn Asn Tyr Ala Met
                405                 410                 415
Lys Trp Val Arg Gln Ala Pro Gly Lys Gly Leu Glu Trp Val Ser Ser
                420                 425                 430
Ile Thr Thr Gly Gly Gly Ser Thr Asp Tyr Ala Asp Ser Val Lys Gly
                435                 440                 445
Arg Phe Thr Ile Ser Arg Asp Asn Ser Lys Asn Thr Leu Tyr Leu Gln
                450                 455                 460
Met Asn Ser Leu Arg Pro Glu Asp Thr Ala Leu Tyr Tyr Cys Ala Asn
465                 470                 475                 480
Val Pro Phe Gly Tyr Tyr Ser Glu His Phe Ser Gly Leu Ser Phe Asp
                485                 490                 495
Tyr Arg Gly Gln Gly Thr Leu Val Thr Val Ser Ser Ala
                500                 505

<210> SEQ ID NO 2
<211> LENGTH: 117
<212> TYPE: PRT
<213> ORGANISM: Artificial Sequence
<220> FEATURE:
<223> OTHER INFORMATION: Nanobody sequence

<400> SEQUENCE: 2

Asp Val Gln Leu Val Glu Ser Gly Gly Gly Val Val Gln Pro Gly Gly
1               5                   10                  15
Ser Leu Arg Leu Ser Cys Ala Ala Ser Arg Ser Ile Gly Arg Tyr Asp
                20                  25                  30
Arg Met Gly Trp Tyr Arg His Arg Pro Gly Glu Pro Arg Glu Leu Val
            35                  40                  45
Ala Thr Ile Thr Gly Gly Ser Ser Ile Asn Tyr Gly Asp Ser Val Lys
        50                  55                  60
Gly Arg Phe Thr Ile Ser Ile Asp Asn Ser Lys Asn Thr Val Tyr Leu
65                  70                  75                  80
Gln Met Asn Ser Leu Arg Pro Glu Asp Thr Ala Leu Tyr Tyr Cys Asn
                85                  90                  95
Phe Asn Lys Tyr Gln Ile Ser Arg Asp Thr Trp Gly Gln Gly Thr Leu
                100                 105                 110
Val Thr Val Ser Ser
            115

<210> SEQ ID NO 3
<211> LENGTH: 123
<212> TYPE: PRT
<213> ORGANISM: Artificial Sequence
<220> FEATURE:
<223> OTHER INFORMATION: Nanobody sequence

<400> SEQUENCE: 3

Glu Val Gln Leu Val Glu Ser Gly Gly Gly Val Val Gln Pro Gly Gly
1               5                   10                  15
Ser Leu Arg Leu Ser Cys Ala Ala Ser Gly Arg Thr Phe Ser Ser Tyr
                20                  25                  30
```

```
Arg Met Gly Trp Phe Arg Gln Ala Pro Gly Lys Glu Arg Glu Phe Val
            35                  40                  45

Ala Ala Leu Ser Gly Asp Gly Tyr Ser Thr Tyr Thr Ala Asn Ser Val
 50                  55                  60

Lys Gly Arg Phe Thr Ile Ser Arg Asp Asn Ser Lys Asn Thr Val Tyr
 65                  70                  75                  80

Leu Gln Met Asn Ser Leu Arg Pro Glu Asp Thr Ala Leu Tyr Tyr Cys
                 85                  90                  95

Ala Ala Lys Leu Gln Tyr Val Ser Gly Trp Ser Tyr Asp Tyr Pro Tyr
            100                 105                 110

Trp Gly Gln Gly Thr Leu Val Thr Val Ser Ser
            115                 120

<210> SEQ ID NO 4
<211> LENGTH: 115
<212> TYPE: PRT
<213> ORGANISM: Artificial Sequence
<220> FEATURE:
<223> OTHER INFORMATION: Nanobody sequence

<400> SEQUENCE: 4

Glu Val Gln Leu Val Glu Ser Gly Gly Gly Val Val Gln Pro Gly Gly
 1               5                  10                  15

Ser Leu Arg Leu Ser Cys Ala Ala Ser Gly Phe Thr Phe Arg Ser Phe
            20                  25                  30

Gly Met Ser Trp Val Arg Gln Ala Pro Gly Lys Gly Pro Glu Trp Val
            35                  40                  45

Ser Ser Ile Ser Gly Ser Gly Ser Asp Thr Leu Tyr Ala Asp Ser Val
 50                  55                  60

Lys Gly Arg Phe Thr Ile Ser Arg Asp Asn Ser Lys Asn Thr Leu Tyr
 65                  70                  75                  80

Leu Gln Met Asn Ser Leu Arg Pro Glu Asp Thr Ala Leu Tyr Tyr Cys
                 85                  90                  95

Thr Ile Gly Gly Ser Leu Ser Arg Ser Ser Gln Gly Thr Leu Val Thr
            100                 105                 110

Val Ser Ser
            115

<210> SEQ ID NO 5
<211> LENGTH: 127
<212> TYPE: PRT
<213> ORGANISM: Artificial Sequence
<220> FEATURE:
<223> OTHER INFORMATION: Nanobody sequence

<400> SEQUENCE: 5

Glu Val Gln Leu Val Glu Ser Gly Gly Gly Val Val Gln Pro Gly Gly
 1               5                  10                  15

Ser Leu Arg Leu Ser Cys Ala Ala Ser Gly Phe Thr Phe Asn Asn Tyr
            20                  25                  30

Ala Met Lys Trp Val Arg Gln Ala Pro Gly Lys Gly Leu Glu Trp Val
            35                  40                  45

Ser Ser Ile Thr Thr Gly Gly Ser Thr Asp Tyr Ala Asp Ser Val
 50                  55                  60

Lys Gly Arg Phe Thr Ile Ser Arg Asp Asn Ser Lys Asn Thr Leu Tyr
 65                  70                  75                  80

Leu Gln Met Asn Ser Leu Arg Pro Glu Asp Thr Ala Leu Tyr Tyr Cys
                 85                  90                  95
```

Ala Asn Val Pro Phe Gly Tyr Tyr Ser Glu His Phe Ser Gly Leu Ser
            100                 105                 110

Phe Asp Tyr Arg Gly Gln Gly Thr Leu Val Thr Val Ser Ser Ala
        115                 120                 125

<210> SEQ ID NO 6
<211> LENGTH: 10
<212> TYPE: PRT
<213> ORGANISM: Artificial Sequence
<220> FEATURE:
<223> OTHER INFORMATION: CDR1

<400> SEQUENCE: 6

Arg Ser Ile Gly Arg Tyr Asp Arg Met Gly
1               5                   10

<210> SEQ ID NO 7
<211> LENGTH: 10
<212> TYPE: PRT
<213> ORGANISM: Artificial Sequence
<220> FEATURE:
<223> OTHER INFORMATION: CDR1

<400> SEQUENCE: 7

Gly Arg Thr Phe Ser Ser Tyr Arg Met Gly
1               5                   10

<210> SEQ ID NO 8
<211> LENGTH: 10
<212> TYPE: PRT
<213> ORGANISM: Artificial Sequence
<220> FEATURE:
<223> OTHER INFORMATION: CDR1

<400> SEQUENCE: 8

Gly Phe Thr Phe Arg Ser Phe Gly Met Ser
1               5                   10

<210> SEQ ID NO 9
<211> LENGTH: 10
<212> TYPE: PRT
<213> ORGANISM: Artificial Sequence
<220> FEATURE:
<223> OTHER INFORMATION: CDR1

<400> SEQUENCE: 9

Gly Phe Thr Phe Asn Asn Tyr Ala Met Lys
1               5                   10

<210> SEQ ID NO 10
<211> LENGTH: 9
<212> TYPE: PRT
<213> ORGANISM: Artificial Sequence
<220> FEATURE:
<223> OTHER INFORMATION: CDR2

<400> SEQUENCE: 10

Thr Ile Thr Gly Gly Ser Ser Ile Asn
1               5

<210> SEQ ID NO 11
<211> LENGTH: 10
<212> TYPE: PRT
<213> ORGANISM: Artificial Sequence
<220> FEATURE:
<223> OTHER INFORMATION: CDR2

<400> SEQUENCE: 11

Ala Leu Ser Gly Asp Gly Tyr Ser Thr Tyr
1               5                   10

<210> SEQ ID NO 12
<211> LENGTH: 10
<212> TYPE: PRT
<213> ORGANISM: Artificial Sequence
<220> FEATURE:
<223> OTHER INFORMATION: CDR2

<400> SEQUENCE: 12

Ser Ile Ser Gly Ser Gly Ser Asp Thr Leu
1               5                   10

<210> SEQ ID NO 13
<211> LENGTH: 10
<212> TYPE: PRT
<213> ORGANISM: Artificial Sequence
<220> FEATURE:
<223> OTHER INFORMATION: CDR2

<400> SEQUENCE: 13

Ser Ile Thr Thr Gly Gly Gly Ser Thr Asp
1               5                   10

<210> SEQ ID NO 14
<211> LENGTH: 9
<212> TYPE: PRT
<213> ORGANISM: Artificial Sequence
<220> FEATURE:
<223> OTHER INFORMATION: CDR3

<400> SEQUENCE: 14

Asn Lys Tyr Gln Ile Ser Arg Asp Thr
1               5

<210> SEQ ID NO 15
<211> LENGTH: 14
<212> TYPE: PRT
<213> ORGANISM: Artificial Sequence
<220> FEATURE:
<223> OTHER INFORMATION: CDR3

<400> SEQUENCE: 15

Lys Leu Gln Tyr Val Ser Gly Trp Ser Tyr Asp Tyr Pro Tyr
1               5                   10

<210> SEQ ID NO 16
<211> LENGTH: 6
<212> TYPE: PRT
<213> ORGANISM: Artificial Sequence
<220> FEATURE:
<223> OTHER INFORMATION: CDR3

<400> SEQUENCE: 16

Gly Gly Ser Leu Ser Arg
1               5

<210> SEQ ID NO 17
<211> LENGTH: 17
<212> TYPE: PRT
<213> ORGANISM: Artificial Sequence
<220> FEATURE:
<223> OTHER INFORMATION: CDR3

```
<400> SEQUENCE: 17

Val Pro Phe Gly Tyr Tyr Ser Glu His Phe Ser Gly Leu Ser Phe Asp
1               5                   10                  15

Tyr

<210> SEQ ID NO 18
<211> LENGTH: 25
<212> TYPE: PRT
<213> ORGANISM: Artificial Sequence
<220> FEATURE:
<223> OTHER INFORMATION: FR1

<400> SEQUENCE: 18

Asp Val Gln Leu Val Glu Ser Gly Gly Gly Val Val Gln Pro Gly Gly
1               5                   10                  15

Ser Leu Arg Leu Ser Cys Ala Ala Ser
            20                  25

<210> SEQ ID NO 19
<211> LENGTH: 25
<212> TYPE: PRT
<213> ORGANISM: Artificial Sequence
<220> FEATURE:
<223> OTHER INFORMATION: FR1

<400> SEQUENCE: 19

Glu Val Gln Leu Val Glu Ser Gly Gly Gly Val Val Gln Pro Gly Gly
1               5                   10                  15

Ser Leu Arg Leu Ser Cys Ala Ala Ser
            20                  25

<210> SEQ ID NO 20
<211> LENGTH: 14
<212> TYPE: PRT
<213> ORGANISM: Artificial Sequence
<220> FEATURE:
<223> OTHER INFORMATION: FR2

<400> SEQUENCE: 20

Trp Tyr Arg His Arg Pro Gly Glu Pro Arg Glu Leu Val Ala
1               5                   10

<210> SEQ ID NO 21
<211> LENGTH: 14
<212> TYPE: PRT
<213> ORGANISM: Artificial Sequence
<220> FEATURE:
<223> OTHER INFORMATION: FR2

<400> SEQUENCE: 21

Trp Phe Arg Gln Ala Pro Gly Lys Glu Arg Glu Phe Val Ala
1               5                   10

<210> SEQ ID NO 22
<211> LENGTH: 14
<212> TYPE: PRT
<213> ORGANISM: Artificial Sequence
<220> FEATURE:
<223> OTHER INFORMATION: FR2

<400> SEQUENCE: 22

Trp Val Arg Gln Ala Pro Gly Lys Gly Pro Glu Trp Val Ser
1               5                   10
```

```
<210> SEQ ID NO 23
<211> LENGTH: 14
<212> TYPE: PRT
<213> ORGANISM: Artificial Sequence
<220> FEATURE:
<223> OTHER INFORMATION: FR2

<400> SEQUENCE: 23

Trp Val Arg Gln Ala Pro Gly Lys Gly Leu Glu Trp Val Ser
1               5                   10

<210> SEQ ID NO 24
<211> LENGTH: 39
<212> TYPE: PRT
<213> ORGANISM: Artificial Sequence
<220> FEATURE:
<223> OTHER INFORMATION: FR3

<400> SEQUENCE: 24

Tyr Gly Asp Ser Val Lys Gly Arg Phe Thr Ile Ser Ile Asp Asn Ser
1               5                   10                  15

Lys Asn Thr Val Tyr Leu Gln Met Asn Ser Leu Arg Pro Glu Asp Thr
            20                  25                  30

Ala Leu Tyr Tyr Cys Asn Phe
        35

<210> SEQ ID NO 25
<211> LENGTH: 39
<212> TYPE: PRT
<213> ORGANISM: Artificial Sequence
<220> FEATURE:
<223> OTHER INFORMATION: FR3

<400> SEQUENCE: 25

Thr Ala Asn Ser Val Lys Gly Arg Phe Thr Ile Ser Arg Asp Asn Ser
1               5                   10                  15

Lys Asn Thr Val Tyr Leu Gln Met Asn Ser Leu Arg Pro Glu Asp Thr
            20                  25                  30

Ala Leu Tyr Tyr Cys Ala Ala
        35

<210> SEQ ID NO 26
<211> LENGTH: 39
<212> TYPE: PRT
<213> ORGANISM: Artificial Sequence
<220> FEATURE:
<223> OTHER INFORMATION: FR3

<400> SEQUENCE: 26

Tyr Ala Asp Ser Val Lys Gly Arg Phe Thr Ile Ser Arg Asp Asn Ser
1               5                   10                  15

Lys Asn Thr Leu Tyr Leu Gln Met Asn Ser Leu Arg Pro Glu Asp Thr
            20                  25                  30

Ala Leu Tyr Tyr Cys Thr Ile
        35

<210> SEQ ID NO 27
<211> LENGTH: 39
<212> TYPE: PRT
<213> ORGANISM: Artificial Sequence
<220> FEATURE:
<223> OTHER INFORMATION: FR3

<400> SEQUENCE: 27
```

-continued

```
Tyr Ala Asp Ser Val Lys Gly Arg Phe Thr Ile Ser Arg Asp Asn Ser
1               5                   10                  15

Lys Asn Thr Leu Tyr Leu Gln Met Asn Ser Leu Arg Pro Glu Asp Thr
            20                  25                  30

Ala Leu Tyr Tyr Cys Ala Asn
            35

<210> SEQ ID NO 28
<211> LENGTH: 11
<212> TYPE: PRT
<213> ORGANISM: Artificial Sequence
<220> FEATURE:
<223> OTHER INFORMATION: FR4

<400> SEQUENCE: 28

Trp Gly Gln Gly Thr Leu Val Thr Val Ser Ser
1               5                   10

<210> SEQ ID NO 29
<211> LENGTH: 11
<212> TYPE: PRT
<213> ORGANISM: Artificial Sequence
<220> FEATURE:
<223> OTHER INFORMATION: FR4

<400> SEQUENCE: 29

Ser Ser Gln Gly Thr Leu Val Thr Val Ser Ser
1               5                   10

<210> SEQ ID NO 30
<211> LENGTH: 12
<212> TYPE: PRT
<213> ORGANISM: Artificial Sequence
<220> FEATURE:
<223> OTHER INFORMATION: FR4

<400> SEQUENCE: 30

Arg Gly Gln Gly Thr Leu Val Thr Val Ser Ser Ala
1               5                   10

<210> SEQ ID NO 31
<211> LENGTH: 10
<212> TYPE: PRT
<213> ORGANISM: Artificial Sequence
<220> FEATURE:
<223> OTHER INFORMATION: CDR1

<400> SEQUENCE: 31

Arg Ser Ile Gly Arg Tyr Asp Arg Met Gly
1               5                   10

<210> SEQ ID NO 32
<211> LENGTH: 5
<212> TYPE: PRT
<213> ORGANISM: Artificial Sequence
<220> FEATURE:
<223> OTHER INFORMATION: CDR1

<400> SEQUENCE: 32

Ser Tyr Arg Met Gly
1               5

<210> SEQ ID NO 33
<211> LENGTH: 5
<212> TYPE: PRT
<213> ORGANISM: Artificial Sequence
```

```
<220> FEATURE:
<223> OTHER INFORMATION: CDR1

<400> SEQUENCE: 33

Ser Phe Gly Met Ser
1               5

<210> SEQ ID NO 34
<211> LENGTH: 5
<212> TYPE: PRT
<213> ORGANISM: Artificial Sequence
<220> FEATURE:
<223> OTHER INFORMATION: CDR1

<400> SEQUENCE: 34

Asn Tyr Ala Met Lys
1               5

<210> SEQ ID NO 35
<211> LENGTH: 16
<212> TYPE: PRT
<213> ORGANISM: Artificial Sequence
<220> FEATURE:
<223> OTHER INFORMATION: CDR2

<400> SEQUENCE: 35

Thr Ile Thr Gly Gly Ser Ser Ile Asn Tyr Gly Asp Ser Val Lys Gly
1               5                   10                  15

<210> SEQ ID NO 36
<211> LENGTH: 17
<212> TYPE: PRT
<213> ORGANISM: Artificial Sequence
<220> FEATURE:
<223> OTHER INFORMATION: CDR2

<400> SEQUENCE: 36

Ala Leu Ser Gly Asp Gly Tyr Ser Thr Tyr Thr Ala Asn Ser Val Lys
1               5                   10                  15

Gly

<210> SEQ ID NO 37
<211> LENGTH: 17
<212> TYPE: PRT
<213> ORGANISM: Artificial Sequence
<220> FEATURE:
<223> OTHER INFORMATION: CDR2

<400> SEQUENCE: 37

Ser Ile Ser Gly Ser Gly Ser Asp Thr Leu Tyr Ala Asp Ser Val Lys
1               5                   10                  15

Gly

<210> SEQ ID NO 38
<211> LENGTH: 17
<212> TYPE: PRT
<213> ORGANISM: Artificial Sequence
<220> FEATURE:
<223> OTHER INFORMATION: CDR2

<400> SEQUENCE: 38

Ser Ile Thr Thr Gly Gly Gly Ser Thr Asp Tyr Ala Asp Ser Val Lys
1               5                   10                  15

Gly
```

<210> SEQ ID NO 39
<211> LENGTH: 25
<212> TYPE: PRT
<213> ORGANISM: Artificial Sequence
<220> FEATURE:
<223> OTHER INFORMATION: FR1

<400> SEQUENCE: 39

Asp Val Gln Leu Val Glu Ser Gly Gly Gly Val Val Gln Pro Gly Gly
1               5                   10                  15

Ser Leu Arg Leu Ser Cys Ala Ala Ser
            20                  25

<210> SEQ ID NO 40
<211> LENGTH: 30
<212> TYPE: PRT
<213> ORGANISM: Artificial Sequence
<220> FEATURE:
<223> OTHER INFORMATION: FR1

<400> SEQUENCE: 40

Glu Val Gln Leu Val Glu Ser Gly Gly Gly Val Val Gln Pro Gly Gly
1               5                   10                  15

Ser Leu Arg Leu Ser Cys Ala Ala Ser Gly Arg Thr Phe Ser
            20                  25                  30

<210> SEQ ID NO 41
<211> LENGTH: 30
<212> TYPE: PRT
<213> ORGANISM: Artificial Sequence
<220> FEATURE:
<223> OTHER INFORMATION: FR1

<400> SEQUENCE: 41

Glu Val Gln Leu Val Glu Ser Gly Gly Gly Val Val Gln Pro Gly Gly
1               5                   10                  15

Ser Leu Arg Leu Ser Cys Ala Ala Ser Gly Phe Thr Phe Arg
            20                  25                  30

<210> SEQ ID NO 42
<211> LENGTH: 30
<212> TYPE: PRT
<213> ORGANISM: Artificial Sequence
<220> FEATURE:
<223> OTHER INFORMATION: FR1

<400> SEQUENCE: 42

Glu Val Gln Leu Val Glu Ser Gly Gly Gly Val Val Gln Pro Gly Gly
1               5                   10                  15

Ser Leu Arg Leu Ser Cys Ala Ala Ser Gly Phe Thr Phe Asn
            20                  25                  30

<210> SEQ ID NO 43
<211> LENGTH: 14
<212> TYPE: PRT
<213> ORGANISM: Artificial Sequence
<220> FEATURE:
<223> OTHER INFORMATION: FR2

<400> SEQUENCE: 43

Trp Tyr Arg His Arg Pro Gly Glu Pro Arg Glu Leu Val Ala
1               5                   10

<210> SEQ ID NO 44

```
<211> LENGTH: 14
<212> TYPE: PRT
<213> ORGANISM: Artificial Sequence
<220> FEATURE:
<223> OTHER INFORMATION: FR2

<400> SEQUENCE: 44

Trp Phe Arg Gln Ala Pro Gly Lys Glu Arg Glu Phe Val Ala
1               5                   10

<210> SEQ ID NO 45
<211> LENGTH: 14
<212> TYPE: PRT
<213> ORGANISM: Artificial Sequence
<220> FEATURE:
<223> OTHER INFORMATION: FR2

<400> SEQUENCE: 45

Trp Val Arg Gln Ala Pro Gly Lys Gly Pro Glu Trp Val Ser
1               5                   10

<210> SEQ ID NO 46
<211> LENGTH: 32
<212> TYPE: PRT
<213> ORGANISM: Artificial Sequence
<220> FEATURE:
<223> OTHER INFORMATION: FR3

<400> SEQUENCE: 46

Arg Phe Thr Ile Ser Ile Asp Asn Ser Lys Asn Thr Val Tyr Leu Gln
1               5                   10                  15

Met Asn Ser Leu Arg Pro Glu Asp Thr Ala Leu Tyr Tyr Cys Asn Phe
            20                  25                  30

<210> SEQ ID NO 47
<211> LENGTH: 32
<212> TYPE: PRT
<213> ORGANISM: Artificial Sequence
<220> FEATURE:
<223> OTHER INFORMATION: FR3

<400> SEQUENCE: 47

Arg Phe Thr Ile Ser Arg Asp Asn Ser Lys Asn Thr Val Tyr Leu Gln
1               5                   10                  15

Met Asn Ser Leu Arg Pro Glu Asp Thr Ala Leu Tyr Tyr Cys Ala Ala
            20                  25                  30

<210> SEQ ID NO 48
<211> LENGTH: 32
<212> TYPE: PRT
<213> ORGANISM: Artificial Sequence
<220> FEATURE:
<223> OTHER INFORMATION: FR3

<400> SEQUENCE: 48

Arg Phe Thr Ile Ser Arg Asp Asn Ser Lys Asn Thr Leu Tyr Leu Gln
1               5                   10                  15

Met Asn Ser Leu Arg Pro Glu Asp Thr Ala Leu Tyr Tyr Cys Thr Ile
            20                  25                  30

<210> SEQ ID NO 49
<211> LENGTH: 32
<212> TYPE: PRT
<213> ORGANISM: Artificial Sequence
<220> FEATURE:
<223> OTHER INFORMATION: FR3
```

<400> SEQUENCE: 49

Arg Phe Thr Ile Ser Arg Asp Asn Ser Lys Asn Thr Leu Tyr Leu Gln
1               5                   10                  15

Met Asn Ser Leu Arg Pro Glu Asp Thr Ala Leu Tyr Tyr Cys Ala Asn
                20                  25                  30

<210> SEQ ID NO 50
<211> LENGTH: 115
<212> TYPE: PRT
<213> ORGANISM: Artificial Sequence
<220> FEATURE:
<223> OTHER INFORMATION: Nanobody sequence

<400> SEQUENCE: 50

Glu Val Gln Leu Val Glu Ser Gly Gly Gly Leu Val Gln Pro Gly Asn
1               5                   10                  15

Ser Leu Arg Leu Ser Cys Ala Ala Ser Gly Phe Thr Phe Ser Ser Phe
                20                  25                  30

Gly Met Ser Trp Val Arg Gln Ala Pro Gly Lys Gly Leu Glu Trp Val
            35                  40                  45

Ser Ser Ile Ser Gly Ser Gly Ser Asp Thr Leu Tyr Ala Asp Ser Val
        50                  55                  60

Lys Gly Arg Phe Thr Ile Ser Arg Asp Asn Ala Lys Thr Thr Leu Tyr
65                  70                  75                  80

Leu Gln Met Asn Ser Leu Arg Pro Glu Asp Thr Ala Val Tyr Tyr Cys
                85                  90                  95

Thr Ile Gly Gly Ser Leu Ser Arg Ser Ser Gln Gly Thr Leu Val Thr
            100                 105                 110

Val Ser Ser
        115

<210> SEQ ID NO 51
<211> LENGTH: 115
<212> TYPE: PRT
<213> ORGANISM: Artificial Sequence
<220> FEATURE:
<223> OTHER INFORMATION: Nanobody sequence

<400> SEQUENCE: 51

Glu Val Gln Leu Leu Glu Ser Gly Gly Gly Leu Val Gln Pro Gly Gly
1               5                   10                  15

Ser Leu Arg Leu Ser Cys Ala Ala Ser Gly Phe Thr Phe Arg Ser Phe
                20                  25                  30

Gly Met Ser Trp Val Arg Gln Ala Pro Gly Lys Gly Pro Glu Trp Val
            35                  40                  45

Ser Ser Ile Ser Gly Ser Gly Ser Asp Thr Leu Tyr Ala Asp Ser Val
        50                  55                  60

Lys Gly Arg Phe Thr Ile Ser Arg Asp Asn Ser Lys Asn Thr Leu Tyr
65                  70                  75                  80

Leu Gln Met Asn Ser Leu Arg Pro Glu Asp Thr Ala Val Tyr Tyr Cys
                85                  90                  95

Thr Ile Gly Gly Ser Leu Ser Arg Ser Ser Gln Gly Thr Leu Val Thr
            100                 105                 110

Val Ser Ser
        115

<210> SEQ ID NO 52

```
<211> LENGTH: 116
<212> TYPE: PRT
<213> ORGANISM: Artificial Sequence
<220> FEATURE:
<223> OTHER INFORMATION: Nanobody sequence

<400> SEQUENCE: 52

Glu Val Gln Leu Val Glu Ser Gly Gly Gly Val Val Gln Pro Gly Asn
1               5                   10                  15

Ser Leu Arg Leu Ser Cys Ala Ala Ser Gly Phe Thr Phe Ser Ser Phe
            20                  25                  30

Gly Met Ser Trp Val Arg Gln Ala Pro Gly Lys Gly Leu Glu Trp Val
        35                  40                  45

Ser Ser Ile Ser Gly Ser Gly Ser Asp Thr Leu Tyr Ala Asp Ser Val
    50                  55                  60

Lys Gly Arg Phe Thr Ile Ser Arg Asp Asn Ala Lys Thr Thr Leu Tyr
65                  70                  75                  80

Leu Gln Met Asn Ser Leu Arg Pro Glu Asp Thr Ala Thr Tyr Tyr Cys
                85                  90                  95

Thr Ile Gly Gly Ser Leu Ser Arg Ser Ser Gln Gly Thr Leu Val Thr
            100                 105                 110

Val Ser Ser Ala
        115

<210> SEQ ID NO 53
<211> LENGTH: 116
<212> TYPE: PRT
<213> ORGANISM: Artificial Sequence
<220> FEATURE:
<223> OTHER INFORMATION: Nanobody sequence

<400> SEQUENCE: 53

Glu Val Gln Leu Val Glu Ser Gly Gly Gly Val Val Gln Pro Gly Gly
1               5                   10                  15

Ser Leu Arg Leu Ser Cys Ala Ala Ser Gly Phe Thr Phe Arg Ser Phe
            20                  25                  30

Gly Met Ser Trp Val Arg Gln Ala Pro Gly Lys Gly Pro Glu Trp Val
        35                  40                  45

Ser Ser Ile Ser Gly Ser Gly Ser Asp Thr Leu Tyr Ala Asp Ser Val
    50                  55                  60

Lys Gly Arg Phe Thr Ile Ser Arg Asp Asn Ser Lys Asn Thr Leu Tyr
65                  70                  75                  80

Leu Gln Met Asn Ser Leu Arg Pro Glu Asp Thr Ala Thr Tyr Tyr Cys
                85                  90                  95

Thr Ile Gly Gly Ser Leu Ser Arg Ser Ser Gln Gly Thr Leu Val Thr
            100                 105                 110

Val Ser Ser Ala
        115

<210> SEQ ID NO 54
<211> LENGTH: 115
<212> TYPE: PRT
<213> ORGANISM: Artificial Sequence
<220> FEATURE:
<223> OTHER INFORMATION: Nanobody sequence

<400> SEQUENCE: 54

Glu Val Gln Leu Val Glu Ser Gly Gly Gly Leu Val Gln Pro Gly Asn
1               5                   10                  15
```

Ser Leu Arg Leu Ser Cys Ala Ala Ser Gly Phe Thr Phe Ser Ser Phe
            20                  25                  30

Gly Met Ser Trp Val Arg Gln Ala Pro Gly Lys Gly Leu Glu Trp Val
            35                  40                  45

Ser Ser Ile Ser Gly Ser Gly Ser Asp Thr Leu Tyr Ala Asp Ser Val
        50                  55                  60

Lys Gly Arg Phe Thr Ile Ser Arg Asp Asn Ala Lys Thr Thr Leu Tyr
65                  70                  75                  80

Leu Gln Met Asn Ser Leu Arg Pro Glu Asp Thr Ala Val Tyr Tyr Cys
                85                  90                  95

Thr Ile Gly Gly Ser Leu Ser Arg Ser Ser Gln Gly Thr Leu Val Thr
            100                 105                 110

Val Ser Ser
    115

<210> SEQ ID NO 55
<211> LENGTH: 116
<212> TYPE: PRT
<213> ORGANISM: Artificial Sequence
<220> FEATURE:
<223> OTHER INFORMATION: Nanobody sequence

<400> SEQUENCE: 55

Glu Val Gln Leu Val Glu Ser Gly Gly Gly Leu Val Gln Pro Gly Asn
1               5                   10                  15

Ser Leu Arg Leu Ser Cys Ala Ala Ser Gly Phe Thr Phe Ser Ser Phe
            20                  25                  30

Gly Met Ser Trp Val Arg Gln Ala Pro Gly Lys Gly Leu Glu Trp Val
            35                  40                  45

Ser Ser Ile Ser Gly Ser Gly Ser Asp Thr Leu Tyr Ala Asp Ser Val
        50                  55                  60

Lys Gly Arg Phe Thr Ile Ser Arg Asp Asn Ala Lys Thr Thr Leu Tyr
65                  70                  75                  80

Leu Gln Met Asn Ser Leu Arg Pro Glu Asp Thr Ala Val Tyr Tyr Cys
                85                  90                  95

Thr Ile Gly Gly Ser Leu Ser Arg Ser Ser Gln Gly Thr Leu Val Lys
            100                 105                 110

Val Ser Ser Ala
    115

<210> SEQ ID NO 56
<211> LENGTH: 115
<212> TYPE: PRT
<213> ORGANISM: Artificial Sequence
<220> FEATURE:
<223> OTHER INFORMATION: Nanobody sequence

<400> SEQUENCE: 56

Glu Val Gln Leu Val Glu Ser Gly Gly Gly Val Val Gln Pro Gly Asn
1               5                   10                  15

Ser Leu Arg Leu Ser Cys Ala Ala Ser Gly Phe Thr Phe Ser Ser Phe
            20                  25                  30

Gly Met Ser Trp Val Arg Gln Ala Pro Gly Lys Gly Leu Glu Trp Val
            35                  40                  45

Ser Ser Ile Ser Gly Ser Gly Ser Asp Thr Leu Tyr Ala Asp Ser Val
        50                  55                  60

Lys Gly Arg Phe Thr Ile Ser Arg Asp Asn Ala Lys Thr Thr Leu Tyr
65                  70                  75                  80

Leu Gln Met Asn Ser Leu Arg Pro Glu Asp Thr Ala Leu Tyr Tyr Cys
                85                  90                  95

Thr Ile Gly Gly Ser Leu Ser Arg Ser Ser Gln Gly Thr Leu Val Thr
            100                 105                 110

Val Ser Ser
        115

<210> SEQ ID NO 57
<211> LENGTH: 116
<212> TYPE: PRT
<213> ORGANISM: Artificial Sequence
<220> FEATURE:
<223> OTHER INFORMATION: Nanobody sequence

<400> SEQUENCE: 57

Glu Val Gln Leu Val Glu Ser Gly Gly Gly Val Val Gln Pro Gly Asn
1               5                   10                  15

Ser Leu Arg Leu Ser Cys Ala Ala Ser Gly Phe Thr Phe Ser Ser Phe
            20                  25                  30

Gly Met Ser Trp Val Arg Gln Ala Pro Gly Lys Gly Leu Glu Trp Val
        35                  40                  45

Ser Ser Ile Ser Gly Ser Gly Ser Asp Thr Leu Tyr Ala Asp Ser Val
    50                  55                  60

Lys Gly Arg Phe Thr Ile Ser Arg Asp Asn Ala Lys Thr Thr Leu Tyr
65                  70                  75                  80

Leu Gln Met Asn Ser Leu Arg Pro Glu Asp Thr Ala Leu Tyr Tyr Cys
                85                  90                  95

Thr Ile Gly Gly Ser Leu Ser Arg Ser Ser Gln Gly Thr Leu Val Thr
            100                 105                 110

Val Ser Ser Ala
        115

<210> SEQ ID NO 58
<211> LENGTH: 117
<212> TYPE: PRT
<213> ORGANISM: Artificial Sequence
<220> FEATURE:
<223> OTHER INFORMATION: Nanobody sequence

<400> SEQUENCE: 58

Glu Val Gln Leu Val Glu Ser Gly Gly Gly Val Val Gln Pro Gly Asn
1               5                   10                  15

Ser Leu Arg Leu Ser Cys Ala Ala Ser Gly Phe Thr Phe Ser Ser Phe
            20                  25                  30

Gly Met Ser Trp Val Arg Gln Ala Pro Gly Lys Gly Leu Glu Trp Val
        35                  40                  45

Ser Ser Ile Ser Gly Ser Gly Ser Asp Thr Leu Tyr Ala Asp Ser Val
    50                  55                  60

Lys Gly Arg Phe Thr Ile Ser Arg Asp Asn Ala Lys Thr Thr Leu Tyr
65                  70                  75                  80

Leu Gln Met Asn Ser Leu Arg Pro Glu Asp Thr Ala Leu Tyr Tyr Cys
                85                  90                  95

Thr Ile Gly Gly Ser Leu Ser Arg Ser Ser Gln Gly Thr Leu Val Thr
            100                 105                 110

Val Ser Ser Ala Ala
        115

```
<210> SEQ ID NO 59
<211> LENGTH: 118
<212> TYPE: PRT
<213> ORGANISM: Artificial Sequence
<220> FEATURE:
<223> OTHER INFORMATION: Nanobody sequence

<400> SEQUENCE: 59

Glu Val Gln Leu Val Glu Ser Gly Gly Gly Val Val Gln Pro Gly Asn
1               5                   10                  15

Ser Leu Arg Leu Ser Cys Ala Ala Ser Gly Phe Thr Phe Ser Ser Phe
            20                  25                  30

Gly Met Ser Trp Val Arg Gln Ala Pro Gly Lys Gly Leu Glu Trp Val
        35                  40                  45

Ser Ser Ile Ser Gly Ser Gly Ser Asp Thr Leu Tyr Ala Asp Ser Val
    50                  55                  60

Lys Gly Arg Phe Thr Ile Ser Arg Asp Asn Ala Lys Thr Thr Leu Tyr
65                  70                  75                  80

Leu Gln Met Asn Ser Leu Arg Pro Glu Asp Thr Ala Leu Tyr Tyr Cys
                85                  90                  95

Thr Ile Gly Gly Ser Leu Ser Arg Ser Ser Gln Gly Thr Leu Val Thr
            100                 105                 110

Val Ser Ser Ala Ala Ala
        115

<210> SEQ ID NO 60
<211> LENGTH: 116
<212> TYPE: PRT
<213> ORGANISM: Artificial Sequence
<220> FEATURE:
<223> OTHER INFORMATION: Nanobody sequence

<400> SEQUENCE: 60

Glu Val Gln Leu Val Glu Ser Gly Gly Gly Val Val Gln Pro Gly Asn
1               5                   10                  15

Ser Leu Arg Leu Ser Cys Ala Ala Ser Gly Phe Thr Phe Ser Ser Phe
            20                  25                  30

Gly Met Ser Trp Val Arg Gln Ala Pro Gly Lys Gly Leu Glu Trp Val
        35                  40                  45

Ser Ser Ile Ser Gly Ser Gly Ser Asp Thr Leu Tyr Ala Asp Ser Val
    50                  55                  60

Lys Gly Arg Phe Thr Ile Ser Arg Asp Asn Ala Lys Thr Thr Leu Tyr
65                  70                  75                  80

Leu Gln Met Asn Ser Leu Arg Pro Glu Asp Thr Ala Leu Tyr Tyr Cys
                85                  90                  95

Thr Ile Gly Gly Ser Leu Ser Arg Ser Ser Gln Gly Thr Leu Val Thr
            100                 105                 110

Val Ser Ser Gly
        115

<210> SEQ ID NO 61
<211> LENGTH: 117
<212> TYPE: PRT
<213> ORGANISM: Artificial Sequence
<220> FEATURE:
<223> OTHER INFORMATION: Nanobody sequence

<400> SEQUENCE: 61

Glu Val Gln Leu Val Glu Ser Gly Gly Gly Val Val Gln Pro Gly Asn
1               5                   10                  15
```

-continued

```
Ser Leu Arg Leu Ser Cys Ala Ala Ser Gly Phe Thr Phe Ser Ser Phe
            20                  25                  30

Gly Met Ser Trp Val Arg Gln Ala Pro Gly Lys Gly Leu Glu Trp Val
        35                  40                  45

Ser Ser Ile Ser Gly Ser Gly Ser Asp Thr Leu Tyr Ala Asp Ser Val
    50                  55                  60

Lys Gly Arg Phe Thr Ile Ser Arg Asp Asn Ala Lys Thr Thr Leu Tyr
65                  70                  75                  80

Leu Gln Met Asn Ser Leu Arg Pro Glu Asp Thr Ala Leu Tyr Tyr Cys
                85                  90                  95

Thr Ile Gly Gly Ser Leu Ser Arg Ser Ser Gln Gly Thr Leu Val Thr
            100                 105                 110

Val Ser Ser Gly Gly
            115
```

<210> SEQ ID NO 62
<211> LENGTH: 118
<212> TYPE: PRT
<213> ORGANISM: Artificial Sequence
<220> FEATURE:
<223> OTHER INFORMATION: Nanobody sequence

<400> SEQUENCE: 62

```
Glu Val Gln Leu Val Glu Ser Gly Gly Gly Val Val Gln Pro Gly Asn
1               5                   10                  15

Ser Leu Arg Leu Ser Cys Ala Ala Ser Gly Phe Thr Phe Ser Ser Phe
            20                  25                  30

Gly Met Ser Trp Val Arg Gln Ala Pro Gly Lys Gly Leu Glu Trp Val
        35                  40                  45

Ser Ser Ile Ser Gly Ser Gly Ser Asp Thr Leu Tyr Ala Asp Ser Val
    50                  55                  60

Lys Gly Arg Phe Thr Ile Ser Arg Asp Asn Ala Lys Thr Thr Leu Tyr
65                  70                  75                  80

Leu Gln Met Asn Ser Leu Arg Pro Glu Asp Thr Ala Leu Tyr Tyr Cys
                85                  90                  95

Thr Ile Gly Gly Ser Leu Ser Arg Ser Ser Gln Gly Thr Leu Val Thr
            100                 105                 110

Val Ser Ser Gly Gly Gly
            115
```

<210> SEQ ID NO 63
<211> LENGTH: 116
<212> TYPE: PRT
<213> ORGANISM: Artificial Sequence
<220> FEATURE:
<223> OTHER INFORMATION: Nanobody sequence

<400> SEQUENCE: 63

```
Glu Val Gln Leu Val Glu Ser Gly Gly Gly Val Val Gln Pro Gly Gly
1               5                   10                  15

Ser Leu Arg Leu Ser Cys Ala Ala Ser Gly Phe Thr Phe Arg Ser Phe
            20                  25                  30

Gly Met Ser Trp Val Arg Gln Ala Pro Gly Lys Gly Pro Glu Trp Val
        35                  40                  45

Ser Ser Ile Ser Gly Ser Gly Ser Asp Thr Leu Tyr Ala Asp Ser Val
    50                  55                  60

Lys Gly Arg Phe Thr Ile Ser Arg Asp Asn Ser Lys Asn Thr Leu Tyr
```

```
                65                  70                  75                  80
Leu Gln Met Asn Ser Leu Arg Pro Glu Asp Thr Ala Leu Tyr Tyr Cys
                    85                  90                  95

Thr Ile Gly Gly Ser Leu Ser Arg Ser Ser Gln Gly Thr Leu Val Thr
            100                 105                 110

Val Ser Ser Ala
        115

<210> SEQ ID NO 64
<211> LENGTH: 3
<212> TYPE: PRT
<213> ORGANISM: Artificial Sequence
<220> FEATURE:
<223> OTHER INFORMATION: Linker sequence

<400> SEQUENCE: 64

Ala Ala Ala
1

<210> SEQ ID NO 65
<211> LENGTH: 5
<212> TYPE: PRT
<213> ORGANISM: Artificial Sequence
<220> FEATURE:
<223> OTHER INFORMATION: Linker sequence

<400> SEQUENCE: 65

Gly Gly Gly Gly Ser
1               5

<210> SEQ ID NO 66
<211> LENGTH: 7
<212> TYPE: PRT
<213> ORGANISM: Artificial Sequence
<220> FEATURE:
<223> OTHER INFORMATION: Linker sequence

<400> SEQUENCE: 66

Ser Gly Gly Ser Gly Gly Ser
1               5

<210> SEQ ID NO 67
<211> LENGTH: 8
<212> TYPE: PRT
<213> ORGANISM: Artificial Sequence
<220> FEATURE:
<223> OTHER INFORMATION: Linker sequence

<400> SEQUENCE: 67

Gly Gly Gly Gly Ser Gly Gly Ser
1               5

<210> SEQ ID NO 68
<211> LENGTH: 9
<212> TYPE: PRT
<213> ORGANISM: Artificial Sequence
<220> FEATURE:
<223> OTHER INFORMATION: Linker sequence

<400> SEQUENCE: 68

Gly Gly Gly Gly Ser Gly Gly Gly Ser
1               5

<210> SEQ ID NO 69
<211> LENGTH: 10
```

```
<212> TYPE: PRT
<213> ORGANISM: Artificial Sequence
<220> FEATURE:
<223> OTHER INFORMATION: Linker sequence

<400> SEQUENCE: 69

Gly Gly Gly Gly Ser Gly Gly Gly Gly Ser
1               5                   10

<210> SEQ ID NO 70
<211> LENGTH: 15
<212> TYPE: PRT
<213> ORGANISM: Artificial Sequence
<220> FEATURE:
<223> OTHER INFORMATION: Linker sequence

<400> SEQUENCE: 70

Gly Gly Gly Gly Ser Gly Gly Gly Gly Ser Gly Gly Gly Gly Ser
1               5                   10                  15

<210> SEQ ID NO 71
<211> LENGTH: 18
<212> TYPE: PRT
<213> ORGANISM: Artificial Sequence
<220> FEATURE:
<223> OTHER INFORMATION: Linker sequence

<400> SEQUENCE: 71

Gly Gly Gly Gly Ser Gly Gly Gly Gly Ser Gly Gly Gly Gly Ser Gly
1               5                   10                  15

Gly Ser

<210> SEQ ID NO 72
<211> LENGTH: 20
<212> TYPE: PRT
<213> ORGANISM: Artificial Sequence
<220> FEATURE:
<223> OTHER INFORMATION: Linker sequence

<400> SEQUENCE: 72

Gly Gly Gly Gly Ser Gly Gly Gly Gly Ser Gly Gly Gly Gly Ser Gly
1               5                   10                  15

Gly Gly Gly Ser
            20

<210> SEQ ID NO 73
<211> LENGTH: 25
<212> TYPE: PRT
<213> ORGANISM: Artificial Sequence
<220> FEATURE:
<223> OTHER INFORMATION: Linker sequence

<400> SEQUENCE: 73

Gly Gly Gly Gly Ser Gly Gly Gly Gly Ser Gly Gly Gly Gly Ser Gly
1               5                   10                  15

Gly Gly Gly Ser Gly Gly Gly Gly Ser
            20                  25

<210> SEQ ID NO 74
<211> LENGTH: 30
<212> TYPE: PRT
<213> ORGANISM: Artificial Sequence
<220> FEATURE:
<223> OTHER INFORMATION: Linker sequence

<400> SEQUENCE: 74
```

```
Gly Gly Gly Gly Ser Gly Gly Gly Ser Gly Gly Gly Ser Gly
1               5                   10                  15

Gly Gly Gly Ser Gly Gly Gly Ser Gly Gly Gly Ser
            20                  25              30
```

<210> SEQ ID NO 75
<211> LENGTH: 35
<212> TYPE: PRT
<213> ORGANISM: Artificial Sequence
<220> FEATURE:
<223> OTHER INFORMATION: Linker sequence

<400> SEQUENCE: 75

```
Gly Gly Gly Gly Ser Gly Gly Gly Ser Gly Gly Gly Ser Gly
1               5                   10                  15

Gly Gly Gly Ser Gly Gly Gly Ser Gly Gly Gly Ser Gly Gly
            20                  25                  30

Gly Gly Ser
        35
```

<210> SEQ ID NO 76
<211> LENGTH: 40
<212> TYPE: PRT
<213> ORGANISM: Artificial Sequence
<220> FEATURE:
<223> OTHER INFORMATION: Linker sequence

<400> SEQUENCE: 76

```
Gly Gly Gly Gly Ser Gly Gly Gly Ser Gly Gly Gly Ser Gly
1               5                   10                  15

Gly Gly Gly Ser Gly Gly Gly Ser Gly Gly Gly Ser Gly Gly
            20                  25                  30

Gly Gly Ser Gly Gly Gly Gly Ser
        35                  40
```

<210> SEQ ID NO 77
<211> LENGTH: 15
<212> TYPE: PRT
<213> ORGANISM: Artificial Sequence
<220> FEATURE:
<223> OTHER INFORMATION: Linker sequence

<400> SEQUENCE: 77

```
Glu Pro Lys Ser Cys Asp Lys Thr His Thr Cys Pro Pro Cys Pro
1               5                   10                  15
```

<210> SEQ ID NO 78
<211> LENGTH: 24
<212> TYPE: PRT
<213> ORGANISM: Artificial Sequence
<220> FEATURE:
<223> OTHER INFORMATION: Linker sequence

<400> SEQUENCE: 78

```
Gly Gly Gly Gly Ser Gly Gly Gly Ser Glu Pro Lys Ser Cys Asp Lys
1               5                   10                  15

Thr His Thr Cys Pro Pro Cys Pro
            20
```

<210> SEQ ID NO 79
<211> LENGTH: 12
<212> TYPE: PRT
<213> ORGANISM: Artificial Sequence

```
<220> FEATURE:
<223> OTHER INFORMATION: Linker sequence

<400> SEQUENCE: 79

Glu Pro Lys Thr Pro Lys Pro Gln Pro Ala Ala Ala
1               5                   10

<210> SEQ ID NO 80
<211> LENGTH: 62
<212> TYPE: PRT
<213> ORGANISM: Artificial Sequence
<220> FEATURE:
<223> OTHER INFORMATION: Linker sequence

<400> SEQUENCE: 80

Glu Leu Lys Thr Pro Leu Gly Asp Thr Thr His Thr Cys Pro Arg Cys
1               5                   10                  15

Pro Glu Pro Lys Ser Cys Asp Thr Pro Pro Cys Pro Arg Cys Pro
            20                  25                  30

Glu Pro Lys Ser Cys Asp Thr Pro Pro Cys Pro Arg Cys Pro Glu
        35                  40                  45

Pro Lys Ser Cys Asp Thr Pro Pro Cys Pro Arg Cys Pro
    50                  55                  60

<210> SEQ ID NO 81
<211> LENGTH: 5
<212> TYPE: PRT
<213> ORGANISM: Artificial Sequence
<220> FEATURE:
<223> OTHER INFORMATION: c-Terminus

<400> SEQUENCE: 81

Val Thr Val Ser Ser
1               5

<210> SEQ ID NO 82
<211> LENGTH: 5
<212> TYPE: PRT
<213> ORGANISM: Artificial Sequence
<220> FEATURE:
<223> OTHER INFORMATION: c-Terminus

<400> SEQUENCE: 82

Val Lys Val Ser Ser
1               5

<210> SEQ ID NO 83
<211> LENGTH: 5
<212> TYPE: PRT
<213> ORGANISM: Artificial Sequence
<220> FEATURE:
<223> OTHER INFORMATION: c-Terminus

<400> SEQUENCE: 83

Val Gln Val Ser Ser
1               5

<210> SEQ ID NO 84
<211> LENGTH: 5
<212> TYPE: PRT
<213> ORGANISM: Artificial Sequence
<220> FEATURE:
<223> OTHER INFORMATION: c-Terminus

<400> SEQUENCE: 84
```

```
Val Thr Val Lys Ser
1               5

<210> SEQ ID NO 85
<211> LENGTH: 5
<212> TYPE: PRT
<213> ORGANISM: Artificial Sequence
<220> FEATURE:
<223> OTHER INFORMATION: c-Terminus

<400> SEQUENCE: 85

Val Thr Val Gln Ser
1               5

<210> SEQ ID NO 86
<211> LENGTH: 5
<212> TYPE: PRT
<213> ORGANISM: Artificial Sequence
<220> FEATURE:
<223> OTHER INFORMATION: c-Terminus

<400> SEQUENCE: 86

Val Lys Val Lys Ser
1               5

<210> SEQ ID NO 87
<211> LENGTH: 5
<212> TYPE: PRT
<213> ORGANISM: Artificial Sequence
<220> FEATURE:
<223> OTHER INFORMATION: c-Terminus

<400> SEQUENCE: 87

Val Lys Val Gln Ser
1               5

<210> SEQ ID NO 88
<211> LENGTH: 5
<212> TYPE: PRT
<213> ORGANISM: Artificial Sequence
<220> FEATURE:
<223> OTHER INFORMATION: c-Terminus

<400> SEQUENCE: 88

Val Gln Val Lys Ser
1               5

<210> SEQ ID NO 89
<211> LENGTH: 5
<212> TYPE: PRT
<213> ORGANISM: Artificial Sequence
<220> FEATURE:
<223> OTHER INFORMATION: c-Terminus

<400> SEQUENCE: 89

Val Gln Val Gln Ser
1               5

<210> SEQ ID NO 90
<211> LENGTH: 6
<212> TYPE: PRT
<213> ORGANISM: Artificial Sequence
<220> FEATURE:
<223> OTHER INFORMATION: c-Terminus

<400> SEQUENCE: 90

Val Thr Val Ser Ser Ala
```

```
1               5

<210> SEQ ID NO 91
<211> LENGTH: 6
<212> TYPE: PRT
<213> ORGANISM: Artificial Sequence
<220> FEATURE:
<223> OTHER INFORMATION: c-Terminus

<400> SEQUENCE: 91

Val Lys Val Ser Ser Ala
1               5

<210> SEQ ID NO 92
<211> LENGTH: 6
<212> TYPE: PRT
<213> ORGANISM: Artificial Sequence
<220> FEATURE:
<223> OTHER INFORMATION: c-Terminus

<400> SEQUENCE: 92

Val Gln Val Ser Ser Ala
1               5

<210> SEQ ID NO 93
<211> LENGTH: 6
<212> TYPE: PRT
<213> ORGANISM: Artificial Sequence
<220> FEATURE:
<223> OTHER INFORMATION: c-Terminus

<400> SEQUENCE: 93

Val Thr Val Lys Ser Ala
1               5

<210> SEQ ID NO 94
<211> LENGTH: 6
<212> TYPE: PRT
<213> ORGANISM: Artificial Sequence
<220> FEATURE:
<223> OTHER INFORMATION: c-Terminus

<400> SEQUENCE: 94

Val Thr Val Gln Ser Ala
1               5

<210> SEQ ID NO 95
<211> LENGTH: 6
<212> TYPE: PRT
<213> ORGANISM: Artificial Sequence
<220> FEATURE:
<223> OTHER INFORMATION: c-Terminus

<400> SEQUENCE: 95

Val Lys Val Lys Ser Ala
1               5

<210> SEQ ID NO 96
<211> LENGTH: 6
<212> TYPE: PRT
<213> ORGANISM: Artificial Sequence
<220> FEATURE:
<223> OTHER INFORMATION: c-Terminus

<400> SEQUENCE: 96

Val Lys Val Gln Ser Ala
1               5
```

<210> SEQ ID NO 97
<211> LENGTH: 6
<212> TYPE: PRT
<213> ORGANISM: Artificial Sequence
<220> FEATURE:
<223> OTHER INFORMATION: c-Terminus

<400> SEQUENCE: 97

Val Gln Val Lys Ser Ala
1               5

<210> SEQ ID NO 98
<211> LENGTH: 6
<212> TYPE: PRT
<213> ORGANISM: Artificial Sequence
<220> FEATURE:
<223> OTHER INFORMATION: c-Terminus

<400> SEQUENCE: 98

Val Gln Val Gln Ser Ala
1               5

<210> SEQ ID NO 99
<211> LENGTH: 635
<212> TYPE: PRT
<213> ORGANISM: Artificial Sequence
<220> FEATURE:
<223> OTHER INFORMATION: Nanobody sequence

<400> SEQUENCE: 99

Asp Val Gln Leu Val Glu Ser Gly Gly Gly Val Gln Pro Gly Gly
1               5                   10                  15

Ser Leu Arg Leu Ser Cys Ala Ala Ser Arg Ser Ile Gly Arg Tyr Asp
            20                  25                  30

Arg Met Gly Trp Tyr Arg His Arg Pro Gly Glu Pro Arg Glu Leu Val
        35                  40                  45

Ala Thr Ile Thr Gly Gly Ser Ser Ile Asn Tyr Gly Asp Ser Val Lys
    50                  55                  60

Gly Arg Phe Thr Ile Ser Ile Asp Asn Ser Lys Asn Thr Val Tyr Leu
65                  70                  75                  80

Gln Met Asn Ser Leu Arg Pro Glu Asp Thr Ala Leu Tyr Tyr Cys Asn
                85                  90                  95

Phe Asn Lys Tyr Gln Ile Ser Arg Asp Thr Trp Gly Gln Gly Thr Leu
            100                 105                 110

Val Thr Val Ser Ser Gly Gly Gly Gly Ser Gly Gly Gly Ser Glu Val
        115                 120                 125

Gln Leu Val Glu Ser Gly Gly Gly Val Val Gln Pro Gly Gly Ser Leu
    130                 135                 140

Arg Leu Ser Cys Ala Ala Ser Gly Arg Thr Phe Ser Ser Tyr Arg Met
145                 150                 155                 160

Gly Trp Phe Arg Gln Ala Pro Gly Lys Glu Arg Glu Phe Val Ala Ala
                165                 170                 175

Leu Ser Gly Asp Gly Tyr Ser Thr Tyr Thr Ala Asn Ser Val Lys Gly
            180                 185                 190

Arg Phe Thr Ile Ser Arg Asp Asn Ser Lys Asn Thr Val Tyr Leu Gln
        195                 200                 205

Met Asn Ser Leu Arg Pro Glu Asp Thr Ala Leu Tyr Tyr Cys Ala Ala
    210                 215                 220

-continued

Lys Leu Gln Tyr Val Ser Gly Trp Ser Tyr Asp Tyr Pro Tyr Trp Gly
225                 230                 235                 240

Gln Gly Thr Leu Val Thr Val Ser Ser Gly Gly Gly Ser Gly Gly
                245                 250                 255

Gly Ser Glu Val Gln Leu Val Glu Ser Gly Gly Val Val Gln Pro
        260                 265                 270

Gly Gly Ser Leu Arg Leu Ser Cys Ala Ala Ser Arg Ser Ile Gly Arg
        275                 280                 285

Tyr Asp Arg Met Gly Trp Tyr Arg His Arg Pro Gly Glu Pro Arg Glu
        290                 295                 300

Leu Val Ala Thr Ile Thr Gly Ser Ser Ile Asn Tyr Gly Asp Ser
305                 310                 315                 320

Val Lys Gly Arg Phe Thr Ile Ser Ile Asp Asn Ser Lys Asn Thr Val
                325                 330                 335

Tyr Leu Gln Met Asn Ser Leu Arg Pro Glu Asp Thr Ala Leu Tyr Tyr
                340                 345                 350

Cys Asn Phe Asn Lys Tyr Gln Ile Ser Arg Asp Thr Trp Gly Gln Gly
        355                 360                 365

Thr Leu Val Thr Val Ser Ser Gly Gly Gly Ser Gly Gly Gly Ser
370                 375                 380

Glu Val Gln Leu Val Glu Ser Gly Gly Val Val Gln Pro Gly Gly
385                 390                 395                 400

Ser Leu Arg Leu Ser Cys Ala Ala Ser Gly Phe Thr Phe Asn Asn Tyr
                405                 410                 415

Ala Met Lys Trp Val Arg Gln Ala Pro Gly Lys Gly Leu Glu Trp Val
                420                 425                 430

Ser Ser Ile Thr Thr Gly Gly Gly Ser Thr Asp Tyr Ala Asp Ser Val
                435                 440                 445

Lys Gly Arg Phe Thr Ile Ser Arg Asp Asn Ser Lys Asn Thr Leu Tyr
                450                 455                 460

Leu Gln Met Asn Ser Leu Arg Pro Glu Asp Thr Ala Leu Tyr Tyr Cys
465                 470                 475                 480

Ala Asn Val Pro Phe Gly Tyr Tyr Ser Glu His Phe Ser Gly Leu Ser
                485                 490                 495

Phe Asp Tyr Arg Gly Gln Gly Thr Leu Val Thr Val Ser Ser Gly Gly
                500                 505                 510

Gly Ser Gly Gly Gly Ser Glu Val Gln Leu Val Glu Ser Gly Gly
        515                 520                 525

Gly Val Val Gln Pro Gly Gly Ser Leu Arg Leu Ser Cys Ala Ala Ser
        530                 535                 540

Gly Phe Thr Phe Arg Ser Phe Gly Met Ser Trp Val Arg Gln Ala Pro
545                 550                 555                 560

Gly Lys Gly Pro Glu Trp Val Ser Ser Ile Ser Gly Ser Gly Ser Asp
                565                 570                 575

Thr Leu Tyr Ala Asp Ser Val Lys Gly Arg Phe Thr Ile Ser Arg Asp
                580                 585                 590

Asn Ser Lys Asn Thr Leu Tyr Leu Gln Met Asn Ser Leu Arg Pro Glu
                595                 600                 605

Asp Thr Ala Leu Tyr Tyr Cys Thr Ile Gly Gly Ser Leu Ser Arg Ser
                610                 615                 620

Ser Gln Gly Thr Leu Val Thr Val Ser Ser Ala
625                 630                 635

```
<210> SEQ ID NO 100
<211> LENGTH: 649
<212> TYPE: PRT
<213> ORGANISM: Artificial Sequence
<220> FEATURE:
<223> OTHER INFORMATION: Nanobody sequence

<400> SEQUENCE: 100
```

Asp Val Gln Leu Val Glu Ser Gly Gly Gly Val Val Gln Pro Gly Gly
1               5                   10                  15

Ser Leu Arg Leu Ser Cys Ala Ala Ser Gly Arg Thr Phe Ser Ser Ile
            20                  25                  30

Tyr Ala Lys Gly Trp Phe Arg Gln Ala Pro Gly Lys Glu Arg Glu Phe
        35                  40                  45

Val Ala Ala Ile Ser Arg Ser Gly Arg Ser Thr Ser Tyr Ala Asp Ser
    50                  55                  60

Val Lys Gly Arg Phe Thr Ile Ser Arg Asp Asn Ser Lys Asn Thr Val
65                  70                  75                  80

Tyr Leu Gln Met Asn Ser Leu Arg Pro Glu Asp Thr Ala Leu Tyr Tyr
                85                  90                  95

Cys Ala Ala Val Gly Gly Ala Thr Thr Val Thr Ala Ser Glu Trp Asp
            100                 105                 110

Tyr Trp Gly Gln Gly Thr Leu Val Thr Val Ser Ser Gly Gly Gly Gly
        115                 120                 125

Ser Gly Gly Gly Ser Glu Val Gln Leu Val Glu Ser Gly Gly Gly Val
    130                 135                 140

Val Gln Pro Gly Gly Ser Leu Arg Leu Ser Cys Ala Ala Ser Gly Arg
145                 150                 155                 160

Thr Phe Ser Ser Ile Tyr Ala Lys Gly Trp Phe Arg Gln Ala Pro Gly
                165                 170                 175

Lys Glu Arg Glu Phe Val Ala Ala Ile Ser Arg Ser Gly Arg Ser Thr
            180                 185                 190

Ser Tyr Ala Asp Ser Val Lys Gly Arg Phe Thr Ile Ser Arg Asp Asn
        195                 200                 205

Ser Lys Asn Thr Val Tyr Leu Gln Met Asn Ser Leu Arg Pro Glu Asp
    210                 215                 220

Thr Ala Leu Tyr Tyr Cys Ala Ala Val Gly Gly Ala Thr Thr Val Thr
225                 230                 235                 240

Ala Ser Glu Trp Asp Tyr Trp Gly Gln Gly Thr Leu Val Thr Val Ser
                245                 250                 255

Ser Gly Gly Gly Gly Ser Gly Gly Gly Ser Glu Val Gln Leu Val Glu
            260                 265                 270

Ser Gly Gly Gly Val Val Gln Pro Gly Gly Ser Leu Arg Leu Ser Cys
        275                 280                 285

Ala Ala Ser Gly Arg Thr Phe Ser Ser Tyr Arg Met Gly Trp Phe Arg
    290                 295                 300

Gln Ala Pro Gly Lys Glu Arg Glu Phe Val Ala Ala Leu Ser Gly Asp
305                 310                 315                 320

Gly Tyr Ser Thr Tyr Thr Ala Asn Ser Val Lys Gly Arg Phe Thr Ile
                325                 330                 335

Ser Arg Asp Asn Ser Lys Asn Thr Val Tyr Leu Gln Met Asn Ser Leu
            340                 345                 350

Arg Pro Glu Asp Thr Ala Leu Tyr Tyr Cys Ala Ala Lys Leu Gln Tyr
        355                 360                 365

Val Ser Gly Trp Ser Tyr Asp Tyr Pro Tyr Trp Gly Gln Gly Thr Leu

```
                370                 375                 380
Val Thr Val Ser Ser Gly Gly Gly Ser Gly Gly Ser Glu Val
385                 390                 395                 400

Gln Leu Val Glu Ser Gly Gly Val Val Gln Pro Gly Gly Ser Leu
                405                 410                 415

Arg Leu Ser Cys Ala Ala Ser Gly Phe Thr Phe Arg Ser Phe Gly Met
                420                 425                 430

Ser Trp Val Arg Gln Ala Pro Gly Lys Gly Pro Glu Trp Val Ser Ser
                435                 440                 445

Ile Ser Gly Ser Gly Ser Asp Thr Leu Tyr Ala Asp Ser Val Lys Gly
                450                 455                 460

Arg Phe Thr Ile Ser Arg Asp Asn Ser Lys Asn Thr Leu Tyr Leu Gln
465                 470                 475                 480

Met Asn Ser Leu Arg Pro Glu Asp Thr Ala Leu Tyr Tyr Cys Thr Ile
                485                 490                 495

Gly Gly Ser Leu Ser Arg Ser Ser Gln Gly Thr Leu Val Thr Val Ser
                500                 505                 510

Ser Gly Gly Gly Gly Ser Gly Gly Gly Ser Glu Val Gln Leu Val Glu
                515                 520                 525

Ser Gly Gly Val Val Gln Pro Gly Gly Ser Leu Arg Leu Ser Cys
530                 535                 540

Ala Ala Ser Gly Phe Thr Phe Asn Asn Tyr Ala Met Lys Trp Val Arg
545                 550                 555                 560

Gln Ala Pro Gly Lys Gly Leu Glu Trp Val Ser Ser Ile Thr Thr Gly
                565                 570                 575

Gly Gly Ser Thr Asp Tyr Ala Asp Ser Val Lys Gly Arg Phe Thr Ile
                580                 585                 590

Ser Arg Asp Asn Ser Lys Asn Thr Leu Tyr Leu Gln Met Asn Ser Leu
                595                 600                 605

Arg Pro Glu Asp Thr Ala Leu Tyr Tyr Cys Ala Asn Val Pro Phe Gly
                610                 615                 620

Tyr Tyr Ser Glu His Phe Ser Gly Leu Ser Phe Asp Tyr Arg Gly Gln
625                 630                 635                 640

Gly Thr Leu Val Thr Val Ser Ser Ala
                645
```

<210> SEQ ID NO 101
<211> LENGTH: 4
<212> TYPE: PRT
<213> ORGANISM: Artificial Sequence
<220> FEATURE:
<223> OTHER INFORMATION: Motif

<400> SEQUENCE: 101

Lys Glu Arg Glu
1

<210> SEQ ID NO 102
<211> LENGTH: 4
<212> TYPE: PRT
<213> ORGANISM: Artificial Sequence
<220> FEATURE:
<223> OTHER INFORMATION: Motif

<400> SEQUENCE: 102

Lys Gln Arg Glu
1

```
<210> SEQ ID NO 103
<211> LENGTH: 4
<212> TYPE: PRT
<213> ORGANISM: Artificial Sequence
<220> FEATURE:
<223> OTHER INFORMATION: Motif

<400> SEQUENCE: 103

Gly Leu Glu Trp
1

<210> SEQ ID NO 104
<211> LENGTH: 5
<212> TYPE: PRT
<213> ORGANISM: Artificial Sequence
<220> FEATURE:
<223> OTHER INFORMATION: Motif

<400> SEQUENCE: 104

Lys Glu Arg Glu Leu
1               5

<210> SEQ ID NO 105
<211> LENGTH: 5
<212> TYPE: PRT
<213> ORGANISM: Artificial Sequence
<220> FEATURE:
<223> OTHER INFORMATION: Motif

<400> SEQUENCE: 105

Lys Glu Arg Glu Phe
1               5

<210> SEQ ID NO 106
<211> LENGTH: 5
<212> TYPE: PRT
<213> ORGANISM: Artificial Sequence
<220> FEATURE:
<223> OTHER INFORMATION: Motif

<400> SEQUENCE: 106

Lys Gln Arg Glu Leu
1               5

<210> SEQ ID NO 107
<211> LENGTH: 5
<212> TYPE: PRT
<213> ORGANISM: Artificial Sequence
<220> FEATURE:
<223> OTHER INFORMATION: Motif

<400> SEQUENCE: 107

Lys Gln Arg Glu Phe
1               5

<210> SEQ ID NO 108
<211> LENGTH: 5
<212> TYPE: PRT
<213> ORGANISM: Artificial Sequence
<220> FEATURE:
<223> OTHER INFORMATION: Motif

<400> SEQUENCE: 108

Lys Glu Arg Glu Gly
1               5
```

```
<210> SEQ ID NO 109
<211> LENGTH: 5
<212> TYPE: PRT
<213> ORGANISM: Artificial Sequence
<220> FEATURE:
<223> OTHER INFORMATION: Motif

<400> SEQUENCE: 109

Lys Gln Arg Glu Trp
1               5

<210> SEQ ID NO 110
<211> LENGTH: 5
<212> TYPE: PRT
<213> ORGANISM: Artificial Sequence
<220> FEATURE:
<223> OTHER INFORMATION: Motif

<400> SEQUENCE: 110

Lys Gln Arg Glu Gly
1               5

<210> SEQ ID NO 111
<211> LENGTH: 4
<212> TYPE: PRT
<213> ORGANISM: Artificial Sequence
<220> FEATURE:
<223> OTHER INFORMATION: Motif

<400> SEQUENCE: 111

Thr Glu Arg Glu
1

<210> SEQ ID NO 112
<211> LENGTH: 5
<212> TYPE: PRT
<213> ORGANISM: Artificial Sequence
<220> FEATURE:
<223> OTHER INFORMATION: Motif

<400> SEQUENCE: 112

Thr Glu Arg Glu Leu
1               5

<210> SEQ ID NO 113
<211> LENGTH: 4
<212> TYPE: PRT
<213> ORGANISM: Artificial Sequence
<220> FEATURE:
<223> OTHER INFORMATION: Motif

<400> SEQUENCE: 113

Thr Gln Arg Glu
1

<210> SEQ ID NO 114
<211> LENGTH: 5
<212> TYPE: PRT
<213> ORGANISM: Artificial Sequence
<220> FEATURE:
<223> OTHER INFORMATION: Motif

<400> SEQUENCE: 114

Thr Gln Arg Glu Leu
1               5

<210> SEQ ID NO 115
```

```
<211> LENGTH: 4
<212> TYPE: PRT
<213> ORGANISM: Artificial Sequence
<220> FEATURE:
<223> OTHER INFORMATION: Motif

<400> SEQUENCE: 115

Lys Glu Cys Glu
1

<210> SEQ ID NO 116
<211> LENGTH: 5
<212> TYPE: PRT
<213> ORGANISM: Artificial Sequence
<220> FEATURE:
<223> OTHER INFORMATION: Motif

<400> SEQUENCE: 116

Lys Glu Cys Glu Leu
1               5

<210> SEQ ID NO 117
<211> LENGTH: 5
<212> TYPE: PRT
<213> ORGANISM: Artificial Sequence
<220> FEATURE:
<223> OTHER INFORMATION: Motif

<400> SEQUENCE: 117

Lys Glu Cys Glu Arg
1               5

<210> SEQ ID NO 118
<211> LENGTH: 4
<212> TYPE: PRT
<213> ORGANISM: Artificial Sequence
<220> FEATURE:
<223> OTHER INFORMATION: Motif

<400> SEQUENCE: 118

Lys Gln Cys Glu
1

<210> SEQ ID NO 119
<211> LENGTH: 5
<212> TYPE: PRT
<213> ORGANISM: Artificial Sequence
<220> FEATURE:
<223> OTHER INFORMATION: Motif

<400> SEQUENCE: 119

Lys Gln Cys Glu Leu
1               5

<210> SEQ ID NO 120
<211> LENGTH: 4
<212> TYPE: PRT
<213> ORGANISM: Artificial Sequence
<220> FEATURE:
<223> OTHER INFORMATION: Motif

<400> SEQUENCE: 120

Arg Glu Arg Glu
1

<210> SEQ ID NO 121
<211> LENGTH: 5
```

```
<212> TYPE: PRT
<213> ORGANISM: Artificial Sequence
<220> FEATURE:
<223> OTHER INFORMATION: Motif

<400> SEQUENCE: 121

Arg Glu Arg Glu Gly
1               5

<210> SEQ ID NO 122
<211> LENGTH: 4
<212> TYPE: PRT
<213> ORGANISM: Artificial Sequence
<220> FEATURE:
<223> OTHER INFORMATION: Motif

<400> SEQUENCE: 122

Arg Gln Arg Glu
1

<210> SEQ ID NO 123
<211> LENGTH: 5
<212> TYPE: PRT
<213> ORGANISM: Artificial Sequence
<220> FEATURE:
<223> OTHER INFORMATION: Motif

<400> SEQUENCE: 123

Arg Gln Arg Glu Leu
1               5

<210> SEQ ID NO 124
<211> LENGTH: 5
<212> TYPE: PRT
<213> ORGANISM: Artificial Sequence
<220> FEATURE:
<223> OTHER INFORMATION: Motif

<400> SEQUENCE: 124

Arg Gln Arg Glu Phe
1               5

<210> SEQ ID NO 125
<211> LENGTH: 5
<212> TYPE: PRT
<213> ORGANISM: Artificial Sequence
<220> FEATURE:
<223> OTHER INFORMATION: Motif

<400> SEQUENCE: 125

Arg Gln Arg Glu Trp
1               5

<210> SEQ ID NO 126
<211> LENGTH: 4
<212> TYPE: PRT
<213> ORGANISM: Artificial Sequence
<220> FEATURE:
<223> OTHER INFORMATION: Motif

<400> SEQUENCE: 126

Gln Glu Arg Glu
1

<210> SEQ ID NO 127
<211> LENGTH: 5
<212> TYPE: PRT
```

```
<213> ORGANISM: Artificial Sequence
<220> FEATURE:
<223> OTHER INFORMATION: Motif

<400> SEQUENCE: 127

Gln Glu Arg Glu Gly
1               5

<210> SEQ ID NO 128
<211> LENGTH: 4
<212> TYPE: PRT
<213> ORGANISM: Artificial Sequence
<220> FEATURE:
<223> OTHER INFORMATION: Motif

<400> SEQUENCE: 128

Gln Gln Arg Glu
1

<210> SEQ ID NO 129
<211> LENGTH: 5
<212> TYPE: PRT
<213> ORGANISM: Artificial Sequence
<220> FEATURE:
<223> OTHER INFORMATION: Motif

<400> SEQUENCE: 129

Gln Gln Arg Glu Trp
1               5

<210> SEQ ID NO 130
<211> LENGTH: 5
<212> TYPE: PRT
<213> ORGANISM: Artificial Sequence
<220> FEATURE:
<223> OTHER INFORMATION: Motif

<400> SEQUENCE: 130

Gln Gln Arg Glu Leu
1               5

<210> SEQ ID NO 131
<211> LENGTH: 5
<212> TYPE: PRT
<213> ORGANISM: Artificial Sequence
<220> FEATURE:
<223> OTHER INFORMATION: Motif

<400> SEQUENCE: 131

Gln Gln Arg Glu Phe
1               5

<210> SEQ ID NO 132
<211> LENGTH: 4
<212> TYPE: PRT
<213> ORGANISM: Artificial Sequence
<220> FEATURE:
<223> OTHER INFORMATION: Motif

<400> SEQUENCE: 132

Lys Gly Arg Glu
1

<210> SEQ ID NO 133
<211> LENGTH: 5
<212> TYPE: PRT
<213> ORGANISM: Artificial Sequence
```

```
<220> FEATURE:
<223> OTHER INFORMATION: Motif

<400> SEQUENCE: 133

Lys Gly Arg Glu Gly
1               5

<210> SEQ ID NO 134
<211> LENGTH: 4
<212> TYPE: PRT
<213> ORGANISM: Artificial Sequence
<220> FEATURE:
<223> OTHER INFORMATION: Motif

<400> SEQUENCE: 134

Lys Asp Arg Glu
1

<210> SEQ ID NO 135
<211> LENGTH: 5
<212> TYPE: PRT
<213> ORGANISM: Artificial Sequence
<220> FEATURE:
<223> OTHER INFORMATION: Motif

<400> SEQUENCE: 135

Lys Asp Arg Glu Val
1               5

<210> SEQ ID NO 136
<211> LENGTH: 5
<212> TYPE: PRT
<213> ORGANISM: Artificial Sequence
<220> FEATURE:
<223> OTHER INFORMATION: Motif

<400> SEQUENCE: 136

Asp Glu Cys Lys Leu
1               5

<210> SEQ ID NO 137
<211> LENGTH: 5
<212> TYPE: PRT
<213> ORGANISM: Artificial Sequence
<220> FEATURE:
<223> OTHER INFORMATION: Motif

<400> SEQUENCE: 137

Asn Val Cys Glu Leu
1               5

<210> SEQ ID NO 138
<211> LENGTH: 4
<212> TYPE: PRT
<213> ORGANISM: Artificial Sequence
<220> FEATURE:
<223> OTHER INFORMATION: Motif

<400> SEQUENCE: 138

Gly Val Glu Trp
1

<210> SEQ ID NO 139
<211> LENGTH: 4
<212> TYPE: PRT
<213> ORGANISM: Artificial Sequence
<220> FEATURE:
```

```
<223> OTHER INFORMATION: Motif

<400> SEQUENCE: 139

Glu Pro Glu Trp
1

<210> SEQ ID NO 140
<211> LENGTH: 4
<212> TYPE: PRT
<213> ORGANISM: Artificial Sequence
<220> FEATURE:
<223> OTHER INFORMATION: Motif

<400> SEQUENCE: 140

Gly Leu Glu Arg
1

<210> SEQ ID NO 141
<211> LENGTH: 4
<212> TYPE: PRT
<213> ORGANISM: Artificial Sequence
<220> FEATURE:
<223> OTHER INFORMATION: Motif

<400> SEQUENCE: 141

Asp Gln Glu Trp
1

<210> SEQ ID NO 142
<211> LENGTH: 4
<212> TYPE: PRT
<213> ORGANISM: Artificial Sequence
<220> FEATURE:
<223> OTHER INFORMATION: Motif

<400> SEQUENCE: 142

Asp Leu Glu Trp
1

<210> SEQ ID NO 143
<211> LENGTH: 4
<212> TYPE: PRT
<213> ORGANISM: Artificial Sequence
<220> FEATURE:
<223> OTHER INFORMATION: Motif

<400> SEQUENCE: 143

Gly Ile Glu Trp
1

<210> SEQ ID NO 144
<211> LENGTH: 4
<212> TYPE: PRT
<213> ORGANISM: Artificial Sequence
<220> FEATURE:
<223> OTHER INFORMATION: Motif

<400> SEQUENCE: 144

Glu Leu Glu Trp
1

<210> SEQ ID NO 145
<211> LENGTH: 4
<212> TYPE: PRT
<213> ORGANISM: Artificial Sequence
<220> FEATURE:
<223> OTHER INFORMATION: Motif
```

```
<400> SEQUENCE: 145

Gly Pro Glu Trp
1

<210> SEQ ID NO 146
<211> LENGTH: 4
<212> TYPE: PRT
<213> ORGANISM: Artificial Sequence
<220> FEATURE:
<223> OTHER INFORMATION: Motif

<400> SEQUENCE: 146

Glu Trp Leu Pro
1

<210> SEQ ID NO 147
<211> LENGTH: 4
<212> TYPE: PRT
<213> ORGANISM: Artificial Sequence
<220> FEATURE:
<223> OTHER INFORMATION: Motif

<400> SEQUENCE: 147

Gly Pro Glu Arg
1

<210> SEQ ID NO 148
<211> LENGTH: 4
<212> TYPE: PRT
<213> ORGANISM: Artificial Sequence
<220> FEATURE:
<223> OTHER INFORMATION: Motif

<400> SEQUENCE: 148

Gly Leu Glu Arg
1

<210> SEQ ID NO 149
<211> LENGTH: 4
<212> TYPE: PRT
<213> ORGANISM: Artificial Sequence
<220> FEATURE:
<223> OTHER INFORMATION: Motif

<400> SEQUENCE: 149

Glu Leu Glu Trp
1
```

POLYPEPTIDES COMPRISING IMMUNOGLOBULIN SINGLE VARIABLE DOMAINS TARGETING IL-13 AND OX40L

RELATED APPLICATIONS

This application claims the benefit under 35 U.S.C. 119(e) of U.S. provisional application No. 63/083,222, filed Sep. 25, 2020, and U.S. provisional application No. 63/093,804, filed Oct. 20, 2020, each of which is incorporated by reference herein in its entirety.

REFERENCE TO A SEQUENCE LISTING SUBMITTED AS A TEXT FILE VIA EFS-WEB

The instant application contains a Sequence Listing which has been submitted in ASCII format via EFS-Web and is hereby incorporated by reference in its entirety. Said ASCII copy, created on Sep. 24, 2021, is named A084870219US02-SEQ-JRV and is 61,658 bytes in size.

1 FIELD

The present disclosure relates to polypeptides targeting interleukin-13 (IL-13) and OX40L. It also relates to nucleic acid molecules encoding the polypeptide and vectors comprising the nucleic acids, and to compositions comprising the polypeptide, nucleic acid or vector. The disclosure further relates to these products for use in a method of treating a subject suffering from an autoimmune and/or inflammatory disease and/or a fibrotic disease. Moreover, the disclosure relates to a method of producing these products.

2 TECHNOLOGICAL BACKGROUND

While necessary for host-defense, unrestrained immune responses can lead to a range of autoimmune and/or inflammatory diseases such as for example asthma and atopic dermatitis. A cascade of immune responses mediated by the innate and adaptive arms of the immune system (e.g., antigen recognition, antigen processing, antigen presentation, cytokine production, antibody production, target cell killing) drive the initiation and propagation of a range of immunological diseases. Autoimmune and inflammatory diseases are often chronic and can even be life-threatening. Allergic and atopic diseases such as asthma and atopic dermatitis are driven predominantly by type 2 immune responses and characterized by salient features of type 2 immunity such as high IgE production and eosinophilia.

Currently, patients with moderate to severe asthma are inadequately responding to the presently available standard of care treatments.

In particular in asthma patients with a low-eosinophilic phenotype, the current standard therapies include treatment with biologicals, such as anti-IL4Rα monoclonal antibody Dupilumab (marketed under the name Dupixent®, a registered trademark of Sanofi Biotechnology)), monoclonal anti-IL5 antibodies Mepolizumab (marketed under the name Nucala®, a registered trademark of GSK Group) or Reslizumab (marketed under the name Cinqair®, a registered trade mark of Teva Pharmaceutical Industries Ltd), or anti-IgE monoclonal antibody Omalizumab (marketed under the name of Xolair® a registered trade mark of Novartis AG).

While treatment of patients with conventional monoclonal antibodies, as described above, has shown the effectiveness in blocking the type 2 pathway and in significantly reducing the symptoms of and/or treating asthma, there is still a subpopulation of patients that is not fully and optimally responding to these treatments.

For atopic dermatitis, a number of antagonistic antibodies are demonstrating early clinical efficacy.

KY1005 (by Kymab) is a fully human monoclonal antibody, which binds to OX40L and blocks it from activating OX40 and thereby may address an underlying immune system imbalance in patients with inflammatory and/or autoimmune conditions.

ISB 830 (previously GBR 830, by Glenmark Pharmaceuticals) is a humanized monoclonal antibody against OX40. OX40 inhibition might have a therapeutic role in T cell-mediated diseases, including atopic dermatitis.

KHK 4083 is an immunomodulating anti-OX40 monoclonal antibody (by Kyowa Kirin) for the treatment of atopic dermatitis and ulcerative colitis. Early stage clinical development of subcutaneous and intravenous formulation is underway in several countries.

Tralokinumab is an IL-13-neutralising human IgG4 monoclonal antibody being developed by Leo Pharma for the treatment for atopic dermatitis (AD) and alopecia areata. Tralokinumab binds to IL-13 helices A and D, thus preventing IL-13 from interacting with IL-13Rα1 and IL-13Rα2. Tralokinumab is under regulatory review in Europe and the US, for atopic dermatitis. Clinical development is underway for atopic dermatitis in multiple countries and for alopecia areata in the US.

While some of the above-mentioned antagonistic antibodies against OX40, OX40L or IL-13 are demonstrating early clinical efficacy in atopic dermatitis, there remains an unmet medical need for improved agents for the treatment of this type 2 inflammatory disease.

3 SUMMARY

The present inventors have developed novel and improved agents for treating autoimmune diseases and/or inflammatory diseases, such as in particular asthma and atopic dermatitis, and/or fibrotic diseases. These agents target two or multiple disease factors, including IL-13 and OX40L, which factors mediate the biological mechanisms related to autoimmune or inflammatory or fibrotic diseases.

Interleukin-13 (IL-13) is a cytokine secreted by T helper type 2 (Th2) cells, CD4 cells, natural killer T cells, mast cells, basophil cells, eosinophil cells and nuocytes. IL-13 is a central regulator in IgE synthesis, goblet cell hyperplasia, mucus hypersecretion, airway hyperresponsiveness, and fibrosis. It is a key mediator of allergic inflammation and different diseases, including asthma. Signaling of IL-13 is mediated through a shared multi-subunit receptor with IL-4. This receptor is a heterodimer receptor complex consisting of IL-4 receptor alpha (IL-4Rα) and IL-13 receptor alpha 1 (IL-13Rα1). The high affinity of IL-13 to the IL-13Rα1 leads to their bond formation which further increases the probability of a heterodimer formation to IL-4Rα and the production of the type 2 IL-4 receptor. Data from human and mouse studies show the important role IL-13 has in type 2 immune diseases, including asthma and atopic dermatitis.

OX40L (also known as CD252 or TNFSF4) is a member of the TNF superfamily and is the inducible co-stimulatory ligand for the OX40 receptor (also known as CD134 or TNFRSF4). It is expressed mainly on activated antigen-presenting cells (APCs) including dendritic cells, macrophages, and B cells. OX40 on the other hand is largely expressed on activated T cells and natural killer T cells. OX40L is mostly expressed as membrane-bound molecule but can also be detected in a cleaved soluble form. OX40L/OX40 has been recognized as an immune co-stimulatory regulator in a number of diseases that are characterized by activated T-cells which orchestrate the immune response. It triggers signalling through OX40, resulting in a range of activities including production and release of inflammatory cytokines, expansion and accumulation of effector T cells (e.g. TH1, TH2, TH17) and cytotoxic T cells. Data from human and mouse studies suggest that the OX40/OX40L axis has an important role in multiple type 2 immune diseases, including asthma and atopic dermatitis. Blockade of OX40L or OX40 has been shown to reduce disease in mouse models of asthma, and skin samples of patients with atopic dermatitis could be shown to contain elevated OX40-expressing T cells.

Not wishing to be bound by any particularly theory, the above-described biological mechanisms play a central role in the initiation and propagation of the type 2 inflammatory response and lie at the basis of a range of immunopathological pathways causing diseases, such as atopic dermatitis and asthma.

Up to now, there are no active clinical development programs that target both IL-13 and OX40L.

The inventors have now surprisingly found that dual targeting of OX40L and IL-13 with a single agent has the potential to confer full efficacy in both low-type 2 and high-type 2 asthma as well as atopic dermatitis in subpopulations, where a single monospecific agent therapy for the same indications may not be sufficiently efficacious.

It is described that targeting multiple disease factors may be achieved for example by co-administration or combinatorial use of two separate biologicals, e.g. antibodies binding to different therapeutic targets. However, co-administration or combinatorial use of separate biologicals can be challenging, both from a practical and a commercial point of view. For example, two injections of separate products result in a more inconvenient and more painful treatment regime to the patients, which may negatively affect compliance. With regard to a single injection of two separate products, it can be difficult or impossible to provide formulations that allow for acceptable viscosity at the required concentrations and suitable stability and non-interference of both products. Additionally, co-administration and co-formulation requires production of two separate drugs which can increase overall costs.

Accordingly, there is also a need for improved anti-autoimmune and/or anti-inflammatory and/or anti-fibrotic disease agents, which can be conveniently administered to the patient. Bispecific antibodies that are able to bind to two different antigens have been suggested as one strategy for addressing the above limitations associated with co-administration or combinatorial use of separate biologicals, such as antibodies.

Bispecific antibody constructs have been proposed in multiple formats. For example, bispecific antibody formats may involve the chemical conjugation of two antibodies or fragments thereof (Brennan, M, et al., Science, 1985. 229 (4708): p. 81-83; Glennie. M. J., et al., J Immunol, 1987. 139(7): p. 2367-2375).

Disadvantages of such bispecific antibody formats may include, however, high viscosity at high concentration, making e.g. subcutaneous administration challenging. Furthermore, each binding unit requires the interaction with a different target with specific and high affinity, having implications on polypeptide stability and efficiency of production. For example, production of bispecific antibody formats may potentially lead to CMC (Chemistry Manufacturing and Control) issues related to mispairing of the light chains or mispairing of the heavy chains.

Therefore, there is a need for improved bi- or multispecific antibody constructs that bind both to OX40L and IL-13 with sufficient affinity for two or more targets so as to modulate an auto-immune and/or inflammatory response. At the same time, it is desirable that such constructs can be efficiently produced, e.g. in microbial hosts, and can be conveniently administered to the patient. Such constructs should ideally also have a half-life in the subject to be treated that is long enough such that the number of consecutive treatments can be limited and thus sufficiently spaced apart in timing. Furthermore, it is desirable to limit the reactivity of such constructs to pre-existing antibodies in the subject to be treated (i.e. antibodies present in the subject before the first treatment with the antibody construct).

The present inventors found that bi- or multi-specific polypeptides (also termed immunoglobulin single variable domain (ISVD) constructs in the context of the present disclosure) targeting specifically OX40L and IL-13 at the same time have an increased efficiency of modulating a type 2 inflammatory response as compared to monospecific anti-OX40L and/or mono-specific anti-IL-13 polypeptides. Said polypeptides or ISVD constructs could be efficiently produced (e.g. in microbial hosts) and conveniently administered. Furthermore, such polypeptides or ISVD constructs could be shown to have limited reactivity to pre-existing antibodies in the subject to be treated (i.e., antibodies present in the subject before the first treatment with the antibody construct). In some embodiments such polypeptides or ISVD constructs exhibit a half-life in the subject to be treated that is long enough such that the number of consecutive treatments can be limited and thus can be sufficiently spaced apart in timing.

The polypeptides of the present disclosure (also termed immunoglobulin single variable domain (ISVD) constructs in the context of the present disclosure) comprise or consist of at least three immunoglobulin single variable domains (ISVDs), wherein at least one ISVD specifically binds to OX40L and at least two ISVDs specifically bind to IL-13. According to some embodiments, the at least one ISVD binding to OX40L specifically binds to human OX40L and the at least two ISVDs binding to IL-13 specifically bind to human IL-13.

According to some embodiments, the polypeptides of the present disclosure further comprises one or more other groups, residues, moieties or binding units, optionally linked via one or more peptidic linkers, in which said one or more other groups, residues, moieties or binding units provide the polypeptide with increased half-life, compared to the corresponding polypeptides without said one or more other groups, residues, moieties or binding units. For example, the binding unit can be an ISVD that binds to a serum protein, for instance to a human serum protein such as human serum albumin.

Also provided are nucleic acid molecules capable of expressing the polypeptides of the present disclosure, nucleic acids or vectors comprising the nucleic acids, and compositions comprising the polypeptides, the nucleic acids or the vectors. In some embodiments, the compositions are pharmaceutical compositions.

Also provided are hosts or host cells comprising the nucleic acids or vectors that encode the polypeptides according to the disclosure.

Further provided is a method for producing the polypeptides according to the disclosure, said method at least comprising the steps of:

a. expressing, in a suitable host cell or host organism or in another suitable expression system, a nucleic acid sequence; optionally followed by:
b. isolating and/or purifying the polypeptides according to the disclosure.

Moreover, the present disclosure provides the polypeptides, the compositions comprising the polypeptides, or the compositions comprising the nucleic acids or vectors comprising the nucleotide sequences that encode the polypeptides, for use as a medicament. In some embodiments, the polypeptides or compositions are for use in the treatment of an autoimmune and/or inflammatory disease, such as a type 2 inflammatory disease. In some embodiments, the type 2 inflammatory disease is selected from the group consisting of atopic dermatitis and asthma. In some embodiments, the polypeptides or compositions are for use in the treatment of a fibrotic disease.

In addition, provided is a method of treating an autoimmune disease and/or an inflammatory disease, such as a type 2 inflammatory disease, wherein said method comprises administering, to a subject in need thereof, a pharmaceutically active amount of the polypeptide or a composition according to the disclosure. In some embodiments, the type 2 inflammatory disease is atopic dermatitis and/or asthma. In addition, provided is a method of treating a fibrotic disease, wherein said method comprises administering, to a subject in need thereof, a pharmaceutically active amount of the polypeptide or a composition according to the disclosure. In some embodiments, the method further comprises administering one or more additional therapeutic agents.

Further provided is the use of the polypeptides or compositions of the present disclosure in the preparation of pharmaceutical compositions for treating an autoimmune and/or inflammatory disease, such as a type 2 inflammatory disease. In some embodiments, the type 2 inflammatory disease is atopic dermatitis and/or asthma, also provided is the use of the polypeptides or compositions of the present disclosure in the preparation of pharmaceutical compositions for treating a fibrotic disease.

In particular, the present disclosure provides the following embodiments: Embodiment 1. A polypeptide, a composition comprising the polypeptide, or a composition comprising a nucleic acid comprising a nucleotide sequence that encodes the polypeptide, for use as a medicament, wherein the polypeptide comprises or consists of at least three immunoglobulin single variable domains (ISVDs), wherein each of said ISVDs comprises three complementarity determining regions (CDR1 to CDR3, respectively), optionally linked via one or more peptidic linkers; and wherein:
a) a first ISVD comprises
  i. a CDR1 which has the amino acid sequence of SEQ ID NO: 6 or has 2 or 1 amino acid difference(s) with SEQ ID NO: 6;
  ii. a CDR2 which has the amino acid sequence of SEQ ID NO: 10 or has 2 or 1 amino acid difference(s) with SEQ ID NO: 10; and
  iii. a CDR3 which has the amino acid sequence of SEQ ID NO: 14 or has 2 or 1 amino acid difference(s) with SEQ ID NO: 14;
b) a second ISVD comprises
  iv. a CDR1 which has the amino acid sequence of SEQ ID NO: 7 or has 2 or 1 amino acid difference(s) with SEQ ID NO: 7;
  v. a CDR2 which has the amino acid sequence of SEQ ID NO: 11 or has 2 or 1 amino acid difference(s) with SEQ ID NO: 11; and
  vi. a CDR3 which has the amino acid sequence of SEQ ID NO: 15 or has 2 or 1 amino acid difference(s) with SEQ ID NO: 15; and
c) a third ISVD comprises
  vii. a CDR1 which has the amino acid sequence of SEQ ID NO: 9 or has 2 or 1 amino acid difference(s) with SEQ ID NO: 9;
  viii. a CDR2 which has the amino acid sequence of SEQ ID NO: 13 or has 2 or 1 amino acid difference(s) with SEQ ID NO: 13; and
  ix. a CDR3 which has the amino acid sequence of SEQ ID NO: 17 or has 2 or 1 amino acid difference(s) with SEQ ID NO: 17,
wherein the ISVDs are in the order starting from the N-terminus.

Embodiment 2. The composition for use according to embodiment 1, which is a pharmaceutical composition which further comprises at least one pharmaceutically acceptable carrier, diluent or excipient and/or adjuvant, and optionally comprises one or more further pharmaceutically active polypeptides and/or compounds.

Embodiment 3. The polypeptide or composition for use according to embodiment 1 or 2, wherein:
a) said first ISVD comprises a CDR1 having the amino acid sequence of SEQ ID NO:6, a CDR2 having the amino acid sequence of SEQ ID NO: 10 and a CDR3 having the amino acid sequence of SEQ ID NO: 14;
b) said second ISVD comprises a CDR1 having the amino acid sequence of SEQ ID NO:7, a CDR2 having the amino acid sequence of SEQ ID NO: 11 and a CDR3 having the amino acid sequence of SEQ ID NO: 15; and
c) said third ISVD comprises a CDR1 having the amino acid sequence of SEQ ID NO:9, a CDR2 having the amino acid sequence of SEQ ID NO: 13 and a CDR3 having the amino acid sequence of SEQ ID NO: 17.

Embodiment 4. The polypeptide or composition for use according to any of embodiment s 1 to 3, wherein:
a) the amino acid sequence of said first ISVD has a sequence identity of more than 90% with SEQ ID NO: 2;
b) the amino acid sequence of said second ISVD has a sequence identity of more than 90% with SEQ ID NO: 3; and
c) the amino acid sequence of said third ISVD has a sequence identity of more than 90% identity with SEQ ID NO: 5.

Embodiment 5. The polypeptide or composition for use according to any of embodiments 1 to 4, wherein:
a) said first ISVD has the amino acid sequence of SEQ ID NO: 2;
b) said second ISVD has the amino acid sequence of SEQ ID NO: 3; and
c) said third ISVD has the amino acid sequence of SEQ ID NO: 5.

Embodiment 6. The polypeptide or composition for use according to any of embodiments 1 to 5, wherein said polypeptide further comprises one or more other groups, residues, moieties or binding units, optionally linked via one or more peptidic linkers, in which said one or more other groups, residues, moieties or binding units provide the polypeptide with increased half-life, compared to the corresponding polypeptide without said one or more other groups, residues, moieties or binding units.

Embodiment 7. The polypeptide or composition for use according to embodiment 6, in which said one or more other groups, residues, moieties or binding units that provide the polypeptide with increased half-life is chosen from the group consisting of a polyethylene glycol molecule, serum proteins or fragments thereof, binding units that can bind to serum proteins, an Fc portion, and small proteins or peptides that can bind to serum proteins.

Embodiment 8. The polypeptide or composition for use according to any one of embodiments 6 to 7, in which said one or more other groups, residues, moieties or binding units that provide the polypeptide with increased half-life is chosen from the group consisting of binding units that can bind to serum albumin (such as human serum albumin) or a serum immunoglobulin (such as IgG).

Embodiment 9. The polypeptide or composition for use according to embodiment 8, in which said binding unit that provides the polypeptide with increased half-life is an ISVD that can bind to human serum albumin.

Embodiment 10. The polypeptide or composition for use according to embodiment 9, wherein the ISVD binding to human serum albumin comprises
  i. a CDR1 which has the amino acid sequence of SEQ ID NO: 8 or has 2 or 1 amino acid difference(s) with SEQ ID NO: 8;
  ii. a CDR2 which has the amino acid sequence of SEQ ID NO: 12 or has 2 or 1 amino acid difference(s) with SEQ ID NO: 12; and
  iii. a CDR3 which has the amino acid sequence of SEQ ID NO: 16 or has 2 or 1 amino acid difference(s) with SEQ ID NO: 16.

Embodiment 11. The polypeptide or composition for use according to any of embodiments 9 to 10, wherein the ISVD binding to human serum albumin comprises a CDR1 having the amino acid sequence of SEQ ID NO:8, a CDR2 having the amino acid sequence of SEQ ID NO: 12 and a CDR3 having the amino acid sequence of SEQ ID NO: 16.

Embodiment 12. The polypeptide or composition for use according to any of embodiments 9 to 11, wherein the amino acid sequence of said ISVD binding to human serum albumin has a sequence identity of more than 90% with SEQ ID NO: 4.

Embodiment 13. The polypeptide or composition for use according to any of embodiments 9 to 12, wherein said ISVD binding to human serum albumin has the amino acid sequence of SEQ ID NO: 4.

Embodiment 14. The polypeptide or composition for use according to any of embodiments 1 to 13, wherein the amino acid sequence of the polypeptide has a sequence identity of more than 90% with SEQ ID NO: 1.

Embodiment 15. The polypeptide or composition for use according to any of embodiments 1 to 14, wherein the polypeptide comprises or consists of the amino acid sequence of SEQ ID NO: 1.

Embodiment 16. The polypeptide or composition for use according to any of claims 1 to 15, for use in the treatment of an inflammatory disease, such as a type 2 inflammatory disease.

Embodiment 17. The polypeptide or composition for use according to claim 16, wherein the type 2 inflammatory disease is selected from the group consisting of asthma and atopic dermatitis.

Embodiment 18. A polypeptide that comprises or consists of at least three immunoglobulin single variable domains (ISVDs), wherein each of said ISVDs comprises three complementarity determining regions (CDR1 to CDR3, respectively), optionally linked via one or more peptidic linkers; and wherein:

a) a first ISVD binds to OX40L and comprises
  i. a CDR1 which has the amino acid sequence of SEQ ID NO: 6 or has 2 or 1 amino acid difference(s) with SEQ ID NO: 6;
  ii. a CDR2 which has the amino acid sequence of SEQ ID NO: 10 or has 2 or 1 amino acid difference(s) with SEQ ID NO: 10; and
  iii. a CDR3 which has the amino acid sequence of SEQ ID NO: 14 or has 2 or 1 amino acid difference(s) with SEQ ID NO: 14;
b) a second ISVD binds to IL-13 and comprises
  iv. a CDR1 which has the amino acid sequence of SEQ ID NO: 7 or has 2 or 1 amino acid difference(s) with SEQ ID NO: 7;
  v. a CDR2 which has the amino acid sequence of SEQ ID NO: 11 or has 2 or 1 amino acid difference(s) with SEQ ID NO: 11; and
  vi. a CDR3 which has the amino acid sequence of SEQ ID NO: 15 or has 2 or 1 amino acid difference(s) with SEQ ID NO: 15; and
c) a third ISVD binds to IL-13 and comprises
  vii. a CDR1 which has the amino acid sequence of SEQ ID NO: 9 or has 2 or 1 amino acid difference(s) with SEQ ID NO: 9;
  viii. a CDR2 which has the amino acid sequence of SEQ ID NO: 13 or has 2 or 1 amino acid difference(s) with SEQ ID NO: 13; and
  ix. a CDR3 which has the amino acid sequence of SEQ ID NO: 17 or has 2 or 1 amino acid difference(s) with SEQ ID NO: 17, wherein the ISVDs are in the order starting from the N-terminus.

Embodiment 19. The polypeptide according to embodiment 18, wherein:
  a) said first ISVD comprises a CDR1 having the amino acid sequence of SEQ ID NO:6, a CDR2 having the amino acid sequence of SEQ ID NO: 10 and a CDR3 having the amino acid sequence of SEQ ID NO: 14;
  b) said second ISVD comprises a CDR1 having the amino acid sequence of SEQ ID NO:7, a CDR2 having the amino acid sequence of SEQ ID NO: 11 and a CDR3 having the amino acid sequence of SEQ ID NO: 15; and
  c) said third ISVD comprises a CDR1 having the amino acid sequence of SEQ ID NO:9, a CDR2 having the amino acid sequence of SEQ ID NO: 13 and a CDR3 having the amino acid sequence of SEQ ID NO: 17.

Embodiment 20. The polypeptide according to any of embodiments 18 or 19, wherein:
  a) the amino acid sequence of said first ISVD has a sequence identity of more than 90% with SEQ ID NO: 2;
  b) the amino acid sequence of said second ISVD has a sequence identity of more than 90% with SEQ ID NO: 3; and
  c) the amino acid sequence of said third ISVD has a sequence identity of more than 90% identity with SEQ ID NO: 5.

Embodiment 21. The polypeptide according to any of embodiments 18 to 20, wherein:
  a) said first ISVD has the amino acid sequence of SEQ ID NO: 2;
  b) said second ISVD has the amino acid sequence of SEQ ID NO: 3; and
  c) said third ISVD has the amino acid sequence of SEQ ID NO: 5.

Embodiment 22. The polypeptide according to any of embodiments 18 to 21, wherein said polypeptide further comprises one or more other groups, residues, moieties or binding units, optionally linked via one or more peptidic linkers, in which said one or more other groups, residues, moieties or binding units provide the polypeptide with increased half-life, compared to the corresponding polypeptide without said one or more other groups, residues, moieties or binding units.

Embodiment 23. The polypeptide according to embodiment 22, in which said one or more other groups, residues, moieties or binding units that provide the polypeptide with increased half-life is chosen from the group consisting of a polyethylene glycol molecule, serum proteins or fragments thereof, binding units that can bind to serum proteins, an Fc portion, and small proteins or peptides that can bind to serum proteins.

Embodiment 24. The polypeptide according to any one of embodiments 22 to 23, in which said one or more other groups, residues, moieties or binding units that provide the polypeptide with increased half-life is chosen from the group consisting of binding units that can bind to serum albumin (such as human serum albumin) or a serum immunoglobulin (such as IgG).

Embodiment 25. The polypeptide according to embodiment 24, in which said binding unit that provides the polypeptide with increased half-life is an ISVD that can bind to human serum albumin.

Embodiment 26. The polypeptide according to embodiment 25, wherein the ISVD binding to human serum albumin comprises
  i. a CDR1 which has the amino acid sequence of SEQ ID NO: 8 or has 2 or 1 amino acid difference(s) with SEQ ID NO: 8;
  ii. a CDR2 which has the amino acid sequence of SEQ ID NO: 12 or has 2 or 1 amino acid difference(s) with SEQ ID NO: 12; and
  iii. a CDR3 which has the amino acid sequence of SEQ ID NO: 16 or has 2 or 1 amino acid difference(s) with SEQ ID NO: 16.

Embodiment 27. The polypeptide according to any of embodiments 25 to 26, wherein the ISVD binding to human serum albumin comprises a CDR1 having the amino acid sequence of SEQ ID NO:8, a CDR2 having the amino acid sequence of SEQ ID NO: 12 and a CDR3 having the amino acid sequence of SEQ ID NO: 16.

Embodiment 28. The polypeptide according to any of embodiments 25 to 27, wherein the amino acid sequence of said ISVD binding to human serum albumin has a sequence identity of more than 90% with SEQ ID NO: 4.

Embodiment 29. The polypeptide according to any of embodiments 25 to 28, wherein said ISVD binding to human serum albumin has the amino acid sequence of SEQ ID NO: 4.

Embodiment 30. The polypeptide according to any of embodiments 18 to 29, wherein the amino acid sequence of the polypeptide has a sequence identity of more than 90% with SEQ ID NO: 1.

Embodiment 31. The polypeptide according to any of embodiments 18 to 29, wherein the polypeptide comprises or consists of the amino acid sequence of SEQ ID NO: 1.

Embodiment 32. A nucleic acid comprising a nucleotide sequence that encodes a polypeptide according to any of embodiments 18 to 31.

Embodiment 33. A host or host cell comprising a nucleic acid according to embodiment 32.

Embodiment 34. A method for producing a polypeptide according to any of embodiments 18-31, said method at least comprising the steps of:

a) expressing, in a suitable host cell or host organism or in another suitable expression system, a nucleic acid according to embodiment 32; optionally followed by:
  b) isolating and/or purifying the polypeptide according to any of embodiments 18 to 31.

Embodiment 35. A composition comprising at least one polypeptide according to any of embodiments 18 to 31, or a nucleic acid according to embodiment 32.

Embodiment 36. The composition according to embodiment 35, which is a pharmaceutical composition which further comprises at least one pharmaceutically acceptable carrier, diluent or excipient and/or adjuvant, and optionally comprises one or more further pharmaceutically active polypeptides and/or compounds.

Embodiment 37. A method of treating an inflammatory disease, such as a type 2 inflammatory disease, wherein said method comprises administering, to a subject in need thereof, a pharmaceutically active amount of a polypeptide according to any of claims 18 to 31 or a composition according to any of claims 35 to 36.

Embodiment 38. The method according to claim 37, wherein the type 2 inflammatory disease is selected from the group consisting of asthma and atopic dermatitis.

Embodiment 39. Use of a polypeptide according to any of claims 18 to 31 or a composition according to any of claims 35 to 36, in the preparation of a pharmaceutical composition for treating an inflammatory disease, such as a type 2 inflammatory disease.

Embodiment 40. Use of the polypeptide or a composition according to claim 39, wherein the type 2 inflammatory disease is selected from asthma and atopic dermatitis.

Embodiment 41. A polypeptide that comprises or consists of at least three immunoglobulin single variable domains (ISVDs), wherein each of said ISVDs comprises three complementarity determining regions (CDR1 to CDR3, respectively), optionally linked via one or more peptidic linkers; and wherein:
  a) a first ISVD comprises
    i. a CDR1 which has the amino acid sequence of SEQ ID NO: 6 or has 2 or 1 amino acid difference(s) with SEQ ID NO: 6;
    ii. a CDR2 which has the amino acid sequence of SEQ ID NO: 10 or has 2 or 1 amino acid difference(s) with SEQ ID NO: 10; and
    iii. a CDR3 which has the amino acid sequence of SEQ ID NO: 14 or has 2 or 1 amino acid difference(s) with SEQ ID NO: 14;
  b) a second ISVD comprises
    iv. a CDR1 which has the amino acid sequence of SEQ ID NO: 7 or has 2 or 1 amino acid difference(s) with SEQ ID NO: 7;
    v. a CDR2 which has the amino acid sequence of SEQ ID NO: 11 or has 2 or 1 amino acid difference(s) with SEQ ID NO: 11; and
    vi. a CDR3 which has the amino acid sequence of SEQ ID NO: 15 or has 2 or 1 amino acid difference(s) with SEQ ID NO: 15; and
  c) a third ISVD comprises
    vii. a CDR1 which has the amino acid sequence of SEQ ID NO: 9 or has 2 or 1 amino acid difference(s) with SEQ ID NO: 9;
    viii. a CDR2 which has the amino acid sequence of SEQ ID NO: 13 or has 2 or 1 amino acid difference(s) with SEQ ID NO: 13; and
    ix. a CDR3 which has the amino acid sequence of SEQ ID NO: 17 or has 2 or 1 amino acid difference(s) with SEQ ID NO: 17, wherein the ISVDs are in the order starting from the N-terminus.

4 BRIEF DESCRIPTION OF THE DRAWINGS

FIG. 1: Simultaneous binding of soluble IL-13 and membrane bound hOX40L to ISV construct F027100187 as shown by flow cytometry on CHO-Ki cells expressing human OX40L. IRR00096 is a negative control $V_{HH}$.

Figure 2:
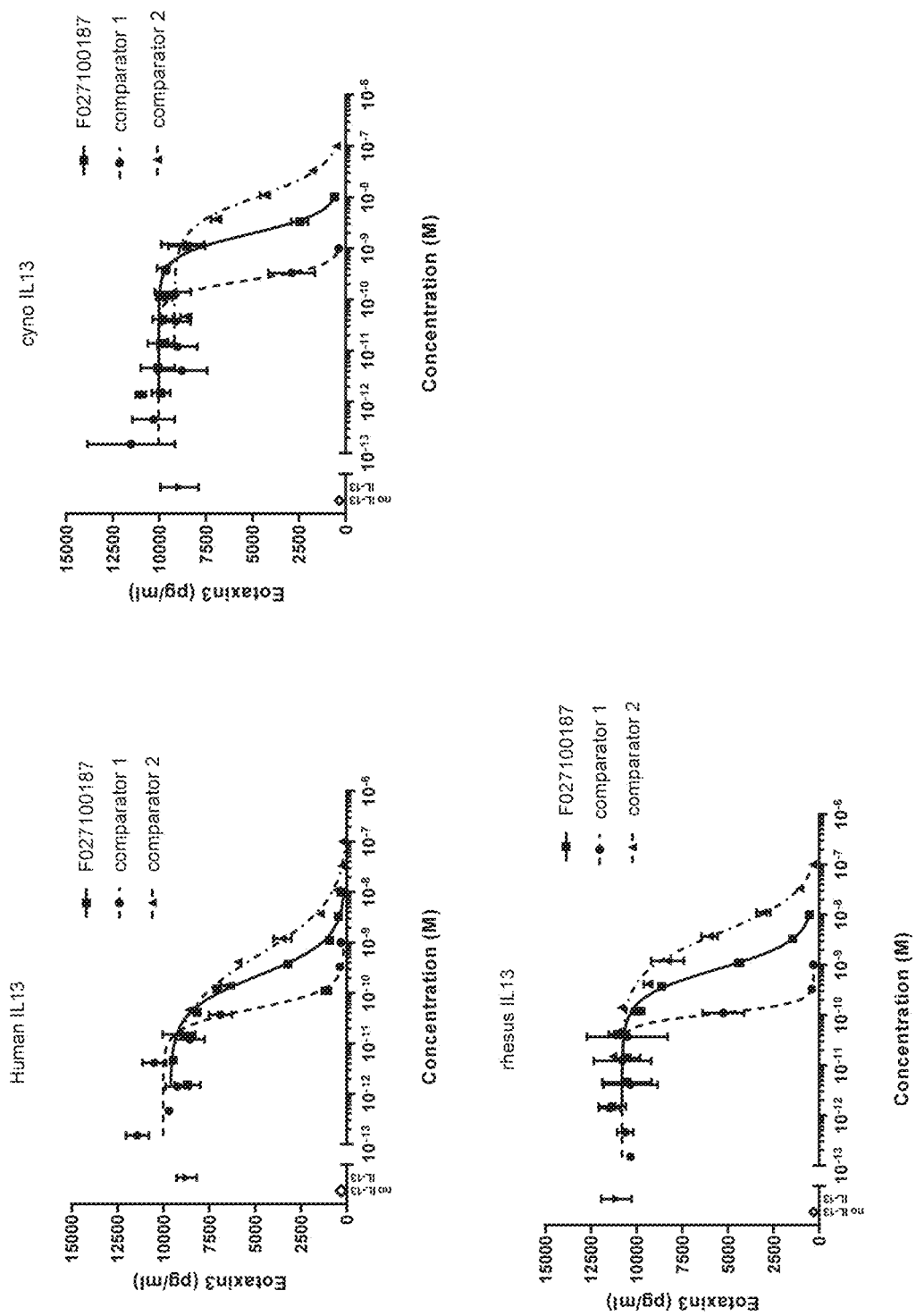

FIG. 2: Inhibition of human, cyno and rhesus IL-13 in the eotaxin release assay by ISVD F027100187 and the reference anti-hIL-13 mAbs, named Comparator 1 and Comparator 2. Both Comparator 1 and Comparator 2 are standard conventional monoclonal antibodies directed against human IL-13. Datapoints are global mean values (n=2), error bars represent +/−SD.

Figure 3:
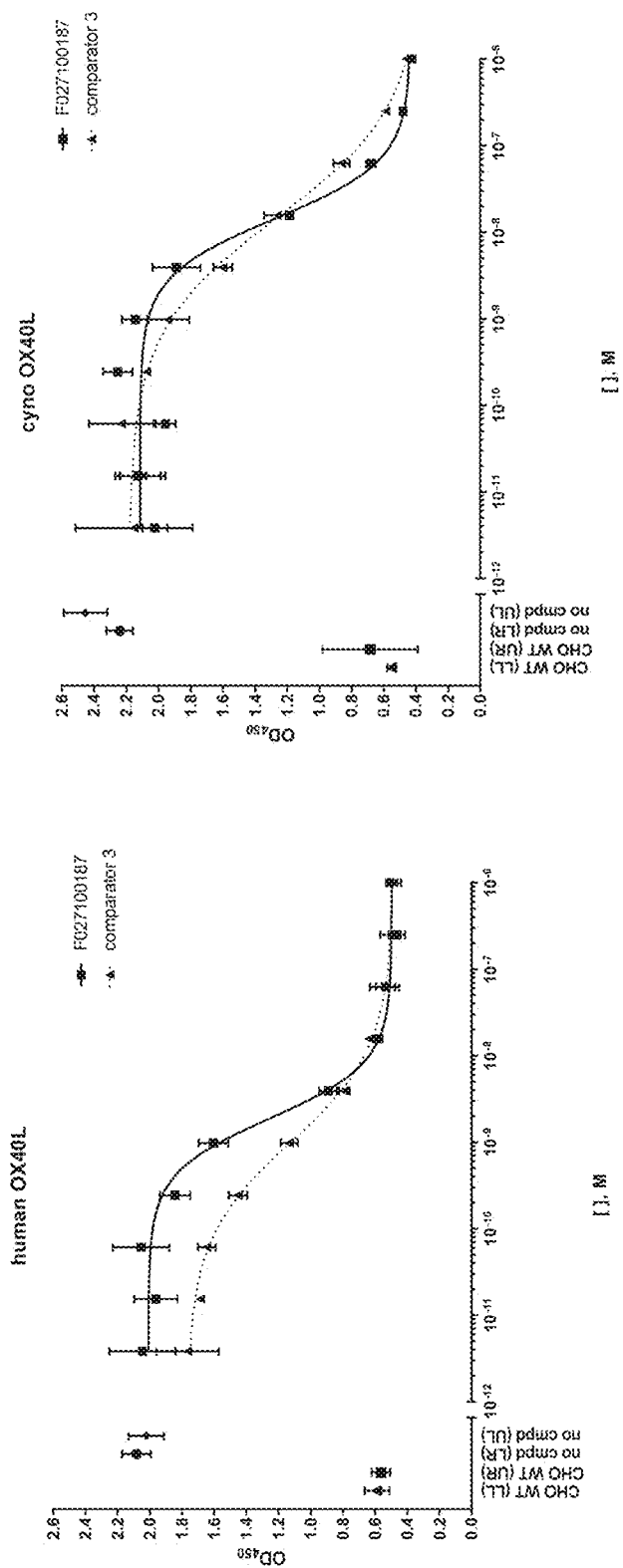

FIG. 3: Inhibition of membrane bound OX40L by ISVD construct F027100187 and the reference compound anti-hOX40L mAb, named Comparator 3, as determined in the PBMC activity assay. Comparator 3 is a standard conventional monoclonal antibody directed against human OX40L. Datapoints are global mean values (n=2), error bars represent +/−SD.

Figure 4:
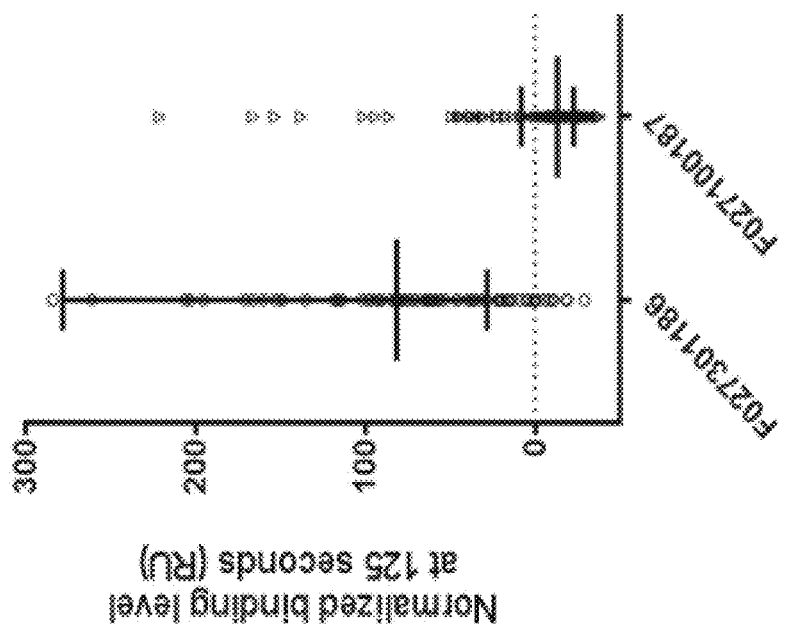

FIG. 4: Box plot (with median and interquartile range) showing the binding of pre-existing antibodies present in 96 human serum samples to ISVD construct F027100187 compared to control ISVD construct F027301186.

Figure 5:
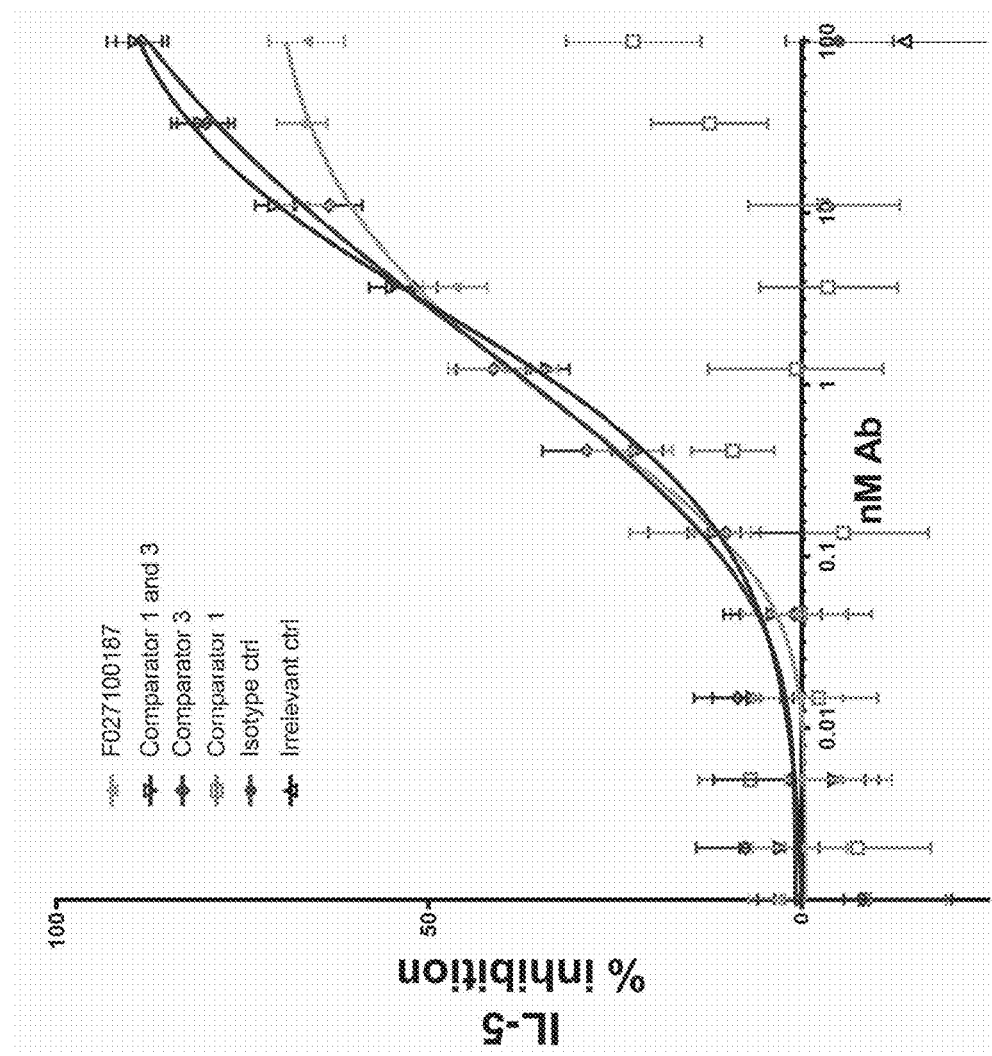
Figure 6:
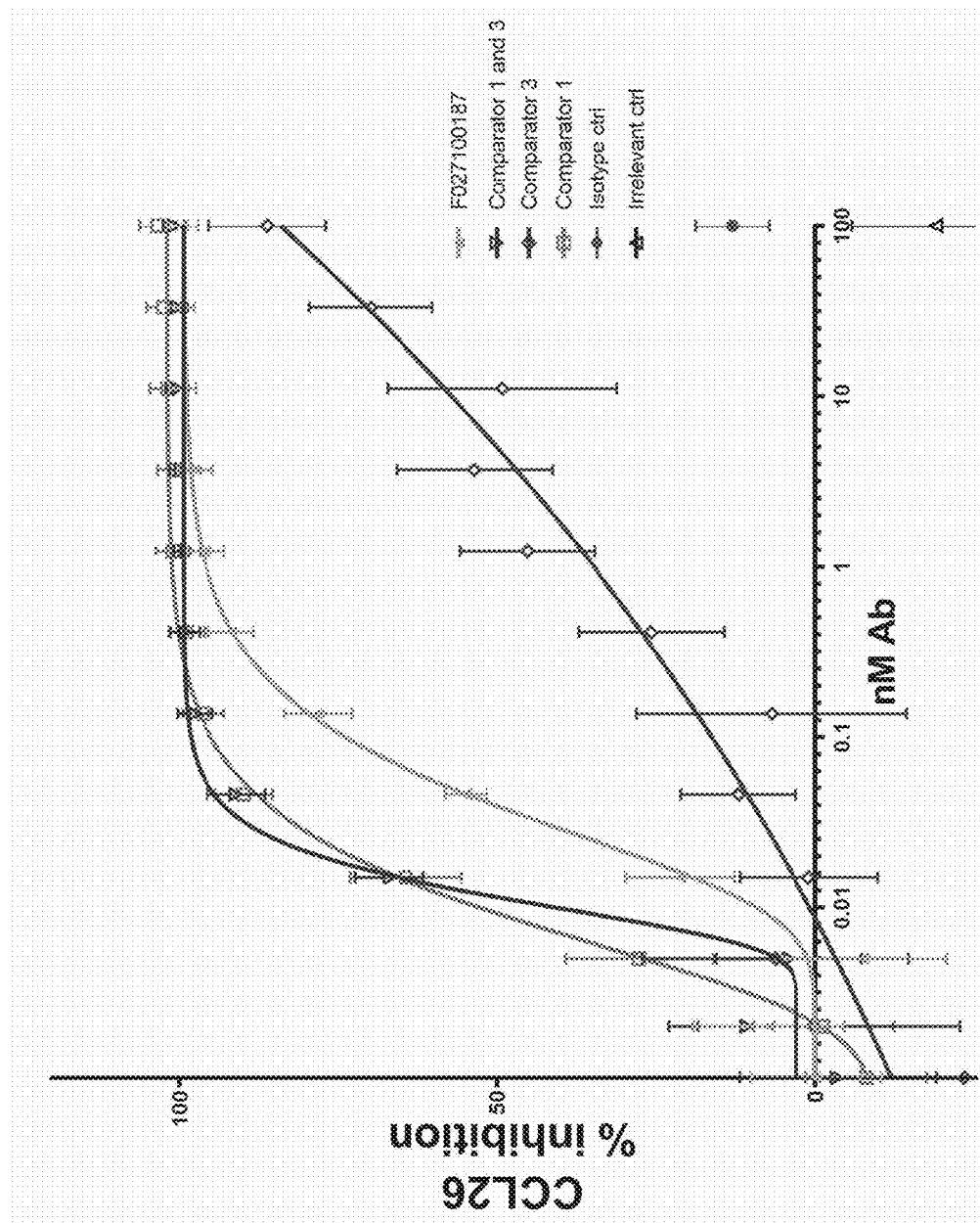

FIGS. 5 and 6: Inhibition profiles of ISVD construct F027100187 and reference antibodies anti-hIL-13 mAb, named Comparator 1, and anti-hOX40L mAb, named Comparator 3, on allergen Der P-induced IL-5 and CCL26 production by human PBMCs in a triculture assay. Normal donor PBMCs cocultured with MRC5 fibroblasts and A549 epithelial cells were stimulated with 3 mg/mL of Der P, and incubated with 11.1 nM of the ISVD, anti-hIL-13 reference mAb, named Comparator 1, or anti-hOX40L reference mAb Comparator 3 in a 24-well plate for 6 days in a 37° C. cell-culture incubator. IL-5 and CCL26 concentration in freshly collected supernatant was measured by Human Magnetic Luminex Assays. Percentage of inhibition were calculated relative to unstimulated (min) and stimulated (max) control samples which did not receive either ISVD polypeptides or antibodies. All calculations were performed using GraphPad Prism 8.0. Data are represented as mean t standard error of mean (SEM) of all donors combined from 3 independent experiments according to the settings described above. FIG. 5; IL-5 inhibition in the triculture assay at day 7. Results from 4 PBMC donors. FIG. 6: CCL26 inhibition in the triculture assay at day 7. Results from 4 PBMC donors.

Figure 7B:
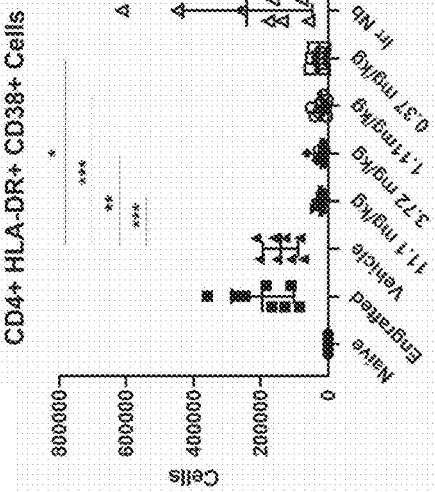
Figure 7A:
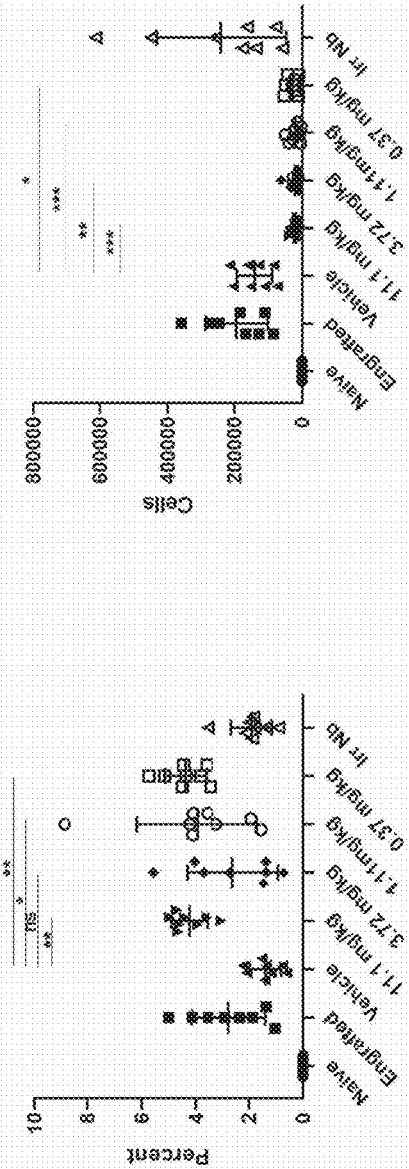
Figure 7D:
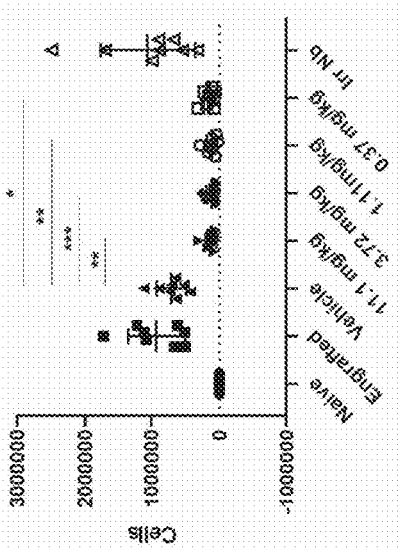
Figure 7C:
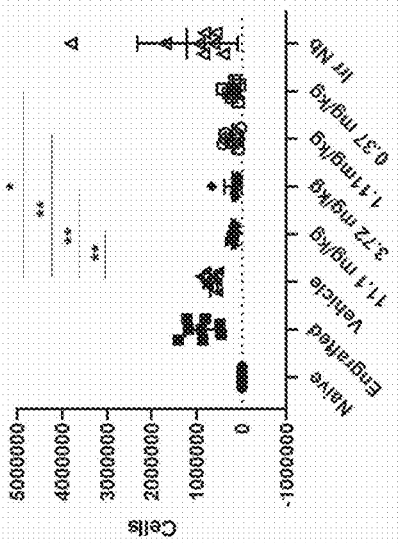

FIGS. 7A-7D: F27100187 significantly reduced the cellularity of human activated, effector and central memory T-cells in the lungs of NSG mice. FIG. 7A) When compared to vehicle treated mice, activated cells (CD4+CD45RA-Cells) were not significantly reduced with F27100187 in any of the doses 11.1 mg/kg, 3.72 mg/kg, 1.11 mg/kg or 0.37 mg/kg. FIG. 7B) When compared to vehicle treated mice (132,035 Cells) activated cells (CD4+ HLA-DR+CD38+ Cells), were reduced with the 11.1 mg/kg F27100187 dose (16,609 cells), 3.72 mg/kg F27100187 dose (17,779 cells), 1.11 mg/kg F27100187 dose (14,808 cells) and 0.37 mg/kg F27100187 dose (23.568 cells). FIG. 7C) When compared to vehicle treated mice (685,726 Cells) effector memory cells were reduced with the 11.1 mg/kg F27100187 dose (151,974 cells), 3.72 mg/kg F27100187 dose (164,639 cells), 1.11 mg/kg F27100187 dose (156,677 cells) and 0.37 mg/kg F27100187 dose (176,243 cells) FIG. 7D) When compared to vehicle treated mice (681,508 Cells) central memory cells were reduced with the 11.1 mg/kg F27100187 dose (106,497 cells), 3.72 mg/kg F27100187 dose (97,465 cells), 1.11 mg/kg F27100187 dose (95,135 cells) and 0.37 mg/kg F27100187 dose (135,098 cells).

Figure 8A:
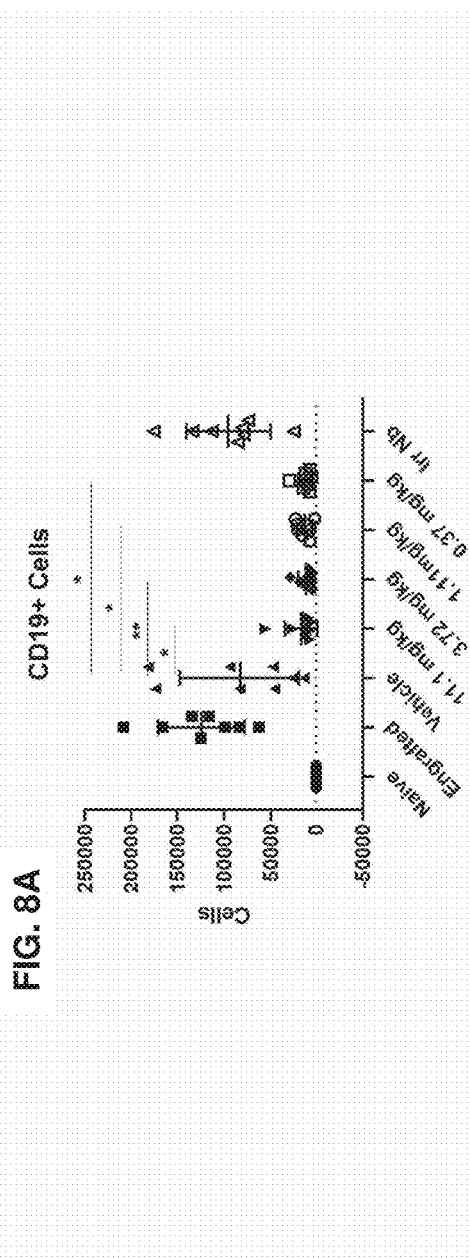
Figure 8C:
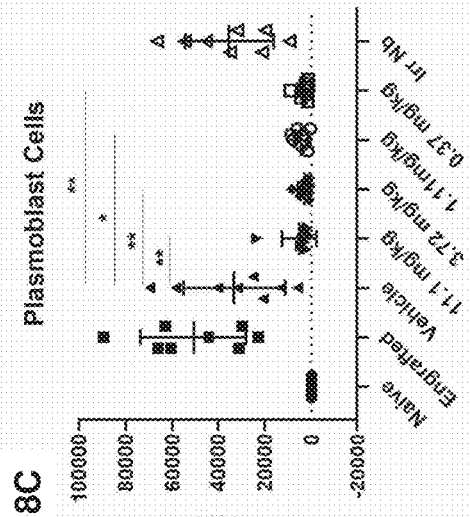
Figure 8B:
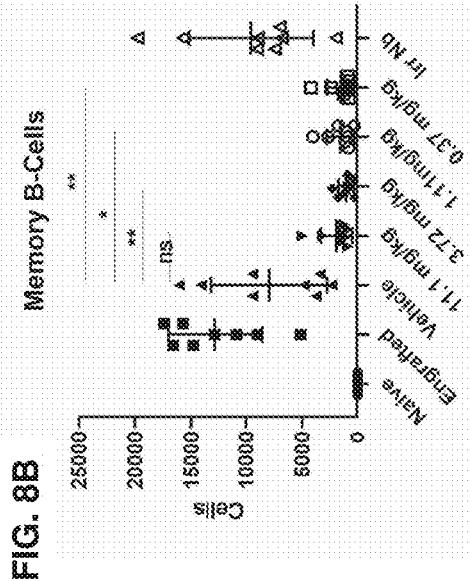

FIGS. 8A-8C: F27100187 significantly reduced the cellularity of human activated (CD19+), memory B-cells, and Plasmablast cells in the lungs of NSG mice. FIG. 8A) When compared to vehicle treated mice (60,393 Cells) activated cells (CD19+), were reduced with the 11.1 mg/kg F27100187 dose (11,581 cells), 3.72 mg/kg F27100187 dose (8,236 cells), 1.11 mg/kg F27100187 dose (9.948 cells) and 0.37 mg/kg F27100187 dose (10,248 cells). FIG. 8B) When compared to vehicle treated mice (6,467 Cells) memory B-cells were reduced with the 11.1 mg/kg F27100187 dose (1,636 cells), 3.72 mg/kg F27100187 dose (914 cells), 1.11 mg/kg F27100187 dose (1,243 cells) and 0.37 mg/kg F27100187 dose (11,268 3 cells) FIG. 8C) When compared to vehicle treated mice (26,148 Cells) Plasmoblasts were reduced with the 11.1 mg/kg F27100187 dose (3,270 cells), 3.72 mg/kg F27100187 dose (2,216 cells), 1.11 mg/kg F27100187 dose (3,314 cells) and 0.37 mg/kg F27100187 dose (2,559 cells).

Figure 9:
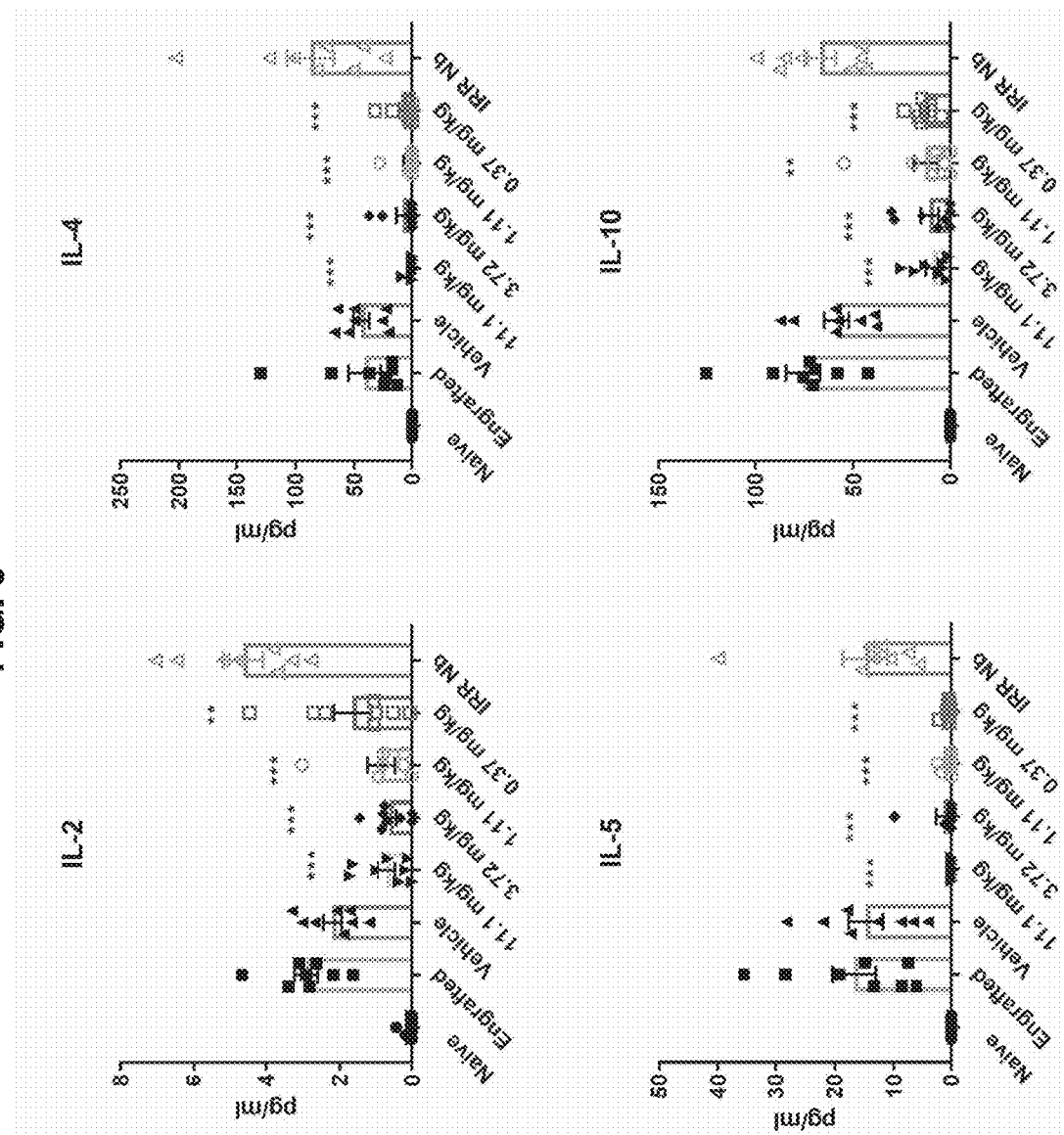

FIG. 9: F27100187, at all doses, significantly reduced detectable levels of human type 2 key cytokines IL-2, IL-4, IL-5, and IL-10 in the plasma of NSG mice. When compared to vehicle treated mice (2.203 pg/ml) human IL-2, was reduced with the 11.1 mg/kg F27100187 dose (0.7115 pg/ml), 3.72 mg/kg F27100187 dose (0.689 pg/ml), 1.11 mg/kg F27100187 dose (0.8593 pg/ml) and 0.37 mg/kg F27100187 dose (1.659 pg/ml). When compared to vehicle treated mice (44.42 pg/ml) human IL-4, was reduced with the 11.1 mg/kg F27100187 dose (1.074 pg/ml), 3.72 mg/kg F27100187 dose (7.859 pg/ml), 1.11 mg/kg F27100187 dose (3.920 pg/ml) and 0.37 mg/kg F27100187 dose (7.415 pg/ml). When compared to vehicle treated mice (14.74 pg/ml) human IL-5, was reduced with the 11.1 mg/kg F27100187 dose (0 pg/ml), 3.72 mg/kg F27100187 dose (1.388 pg/ml), 1.11 mg/kg F27100187 dose (0.6192 pg/ml) and 0.37 mg/kg F27100187 dose (0.6517 pg/ml). When compared to vehicle treated mice (58.74 pg/ml) human IL-10, was reduced with the 11.1 mg/kg F27100187 dose (9.324 pg/ml), 3.72 mg/kg F27100187 dose (10.51 pg/ml), 1.11 mg/kg F27100187 dose (12.94 pg/ml) and 0.37 mg/kg F27100187 dose (13.47 pg/ml).

Figure 10:
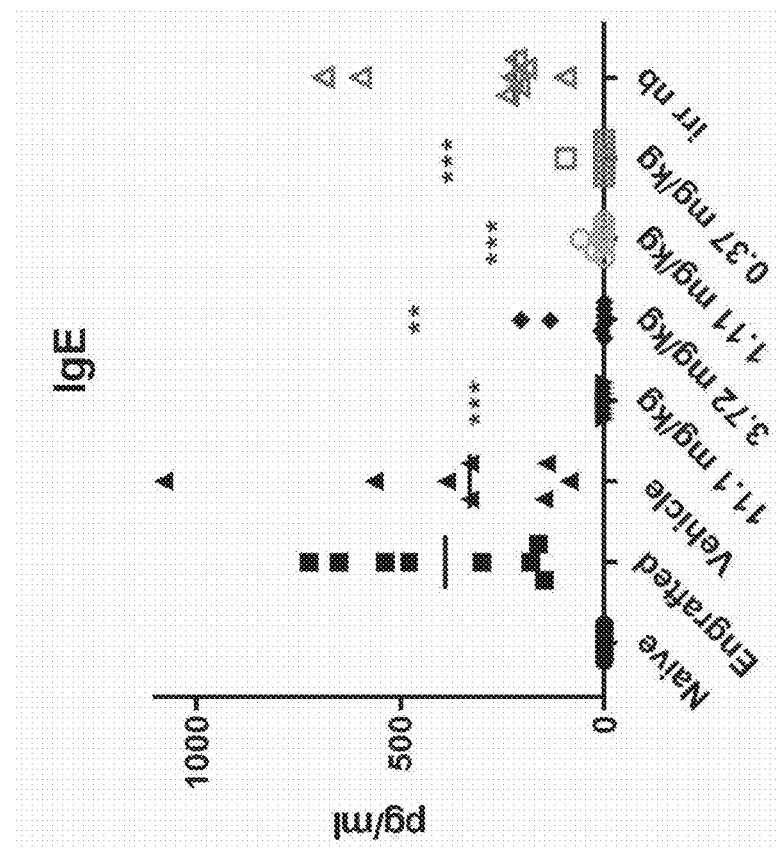

FIG. 10: F27100187, at all doses, significantly reduced detectable levels of human IgE in the plasma of NSG mice. When compared to vehicle treated mice (383.2 pg/ml) human IgE, was reduced with the 11.1 mg/kg F27100187 dose (0 pg/ml), 3.72 mg/kg F27100187 dose (42.95 pg/ml), 1.11 mg/kg F27100187 dose (11.55 pg/ml) and 0.37 mg/kg F27100187 dose (11.91 pg/ml).

Figure 11:
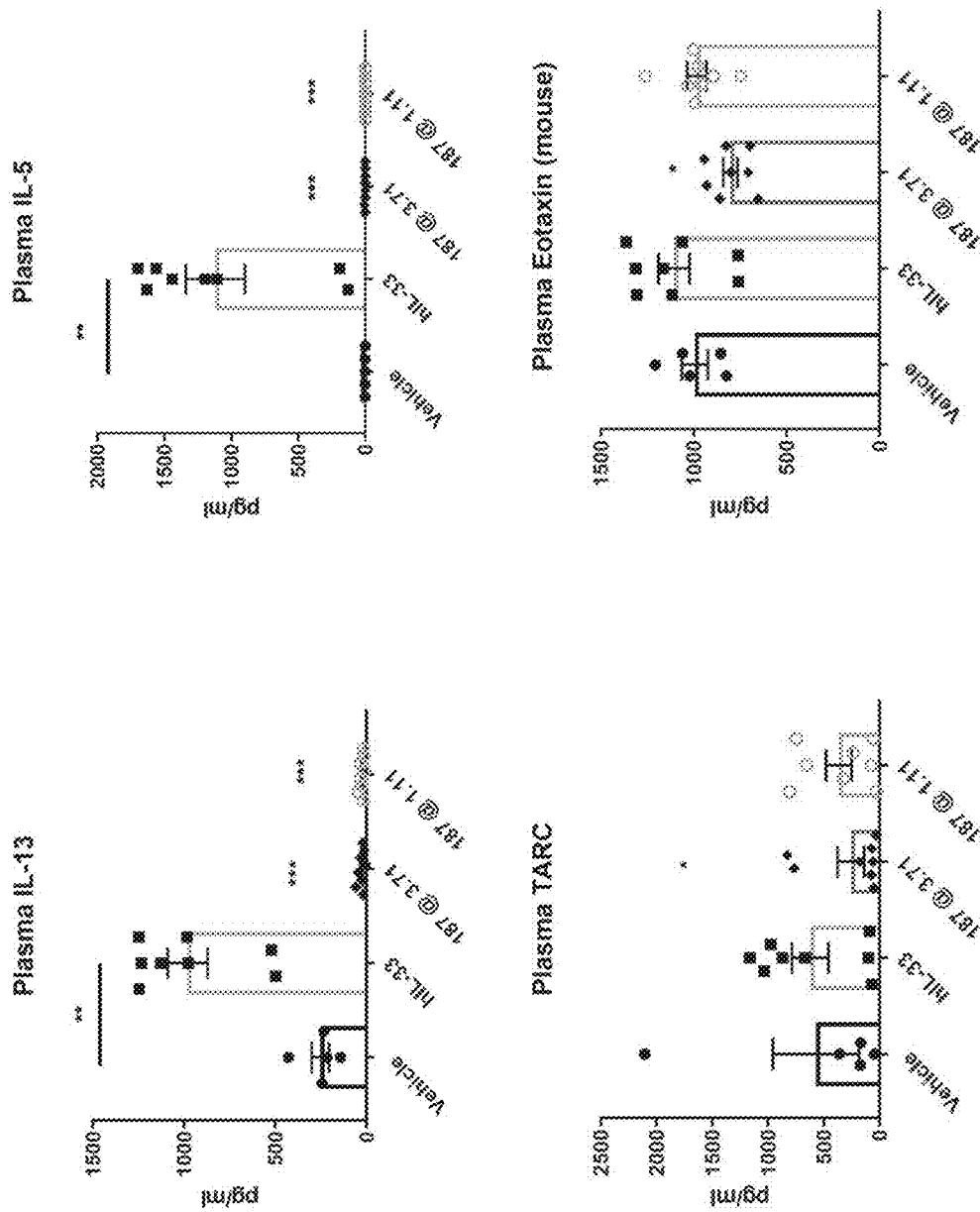

FIG. 11: F27100187 significantly reduced detectable levels of human IL-13, IL-5, TARC, and mouse Eotaxin in the plasma of NSG-SGM3 mice. When compared to vehicle treated mice (981.7 pg/ml) human IL-13, was reduced with the 3.72 mg/kg F27100187 dose (28.94 pg/ml) and 1.11 mg/kg F27100187 dose (25.89 pg/ml). When compared to vehicle treated mice (1121 pg/ml) human IL-5, was reduced with the 3.72 mg/kg F27100187 dose (1.158 pg/ml) and 1.11 mg/kg F27100187 dose (1.079 pg/ml). When compared to vehicle treated mice (623.9 pg/ml) human TARC, was reduced with the 3.72 mg/kg F27100187 dose (259.7 pg/ml) and 1.11 mg/kg F27100187 dose (368.5 pg/ml). When compared to vehicle treated mice (1107 pg/ml) mouse eoxatxin, was reduced with the 3.72 mg/kg F27100187 dose (803.2 pg/ml) and 1.11 mg/kg F27100187 dose (984.4 pg/ml).

Figure 12:
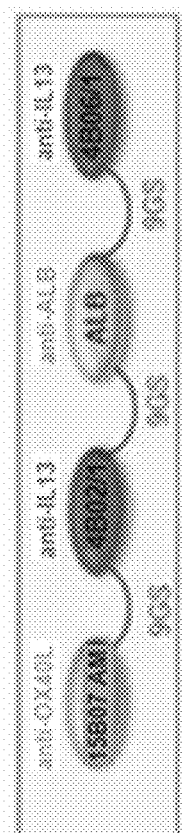

FIG. 12: Schematic presentation of ISVD construct F027100187 showing from the N-terminus to the C-terminus the monovalent building blocks/ISVDs 15B07AM, 4B02/1, ALB23002, and 4B06/1 connected via 9GS linkers.

Figure 13A:
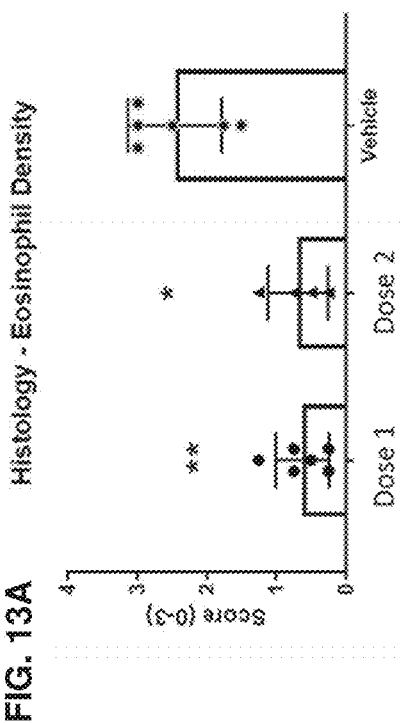
Figure 13C:
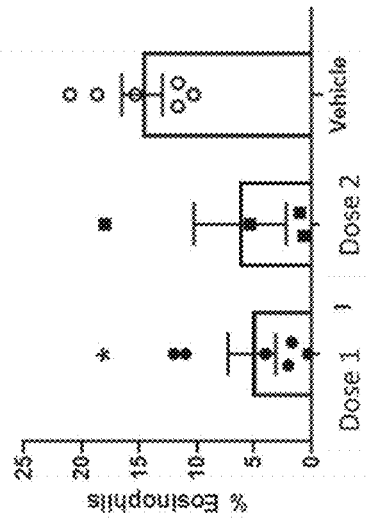
Figure 13B:
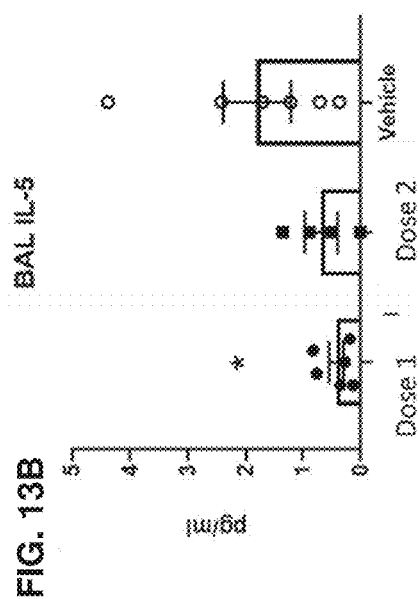

FIGS. 13A-13C. F27100187 significantly reduced the lung eosinophils, BAL IL-5 and percent eosinophils following HDM challenge. FIG. 13A) When compared to vehicle treated mice (2.37 score) lung eosinophils were reduced with the 5.2 mg/kg F27100187 dose (0.529 score) and 1.0 mg/kg F27100187 dose (0.585 score). FIG. 13B) When compared to vehicle treated mice (1.798 pg/ml) BAL IL-5 was reduced with the 5.2 mg/kg F27100187 dose (0.4178 pg/ml) and 1.0 mg/kg F27100187 dose (0.6825 pg/ml). FIG. 13C) When compared to vehicle treated mice (14.27 percent) BAL percent eosinophils where reduced with the 5.2 mg/kg F27100187 dose (2.897 percent) and 1.0 mg/kg F27100187 dose (2.836 percent).

Figure 14:
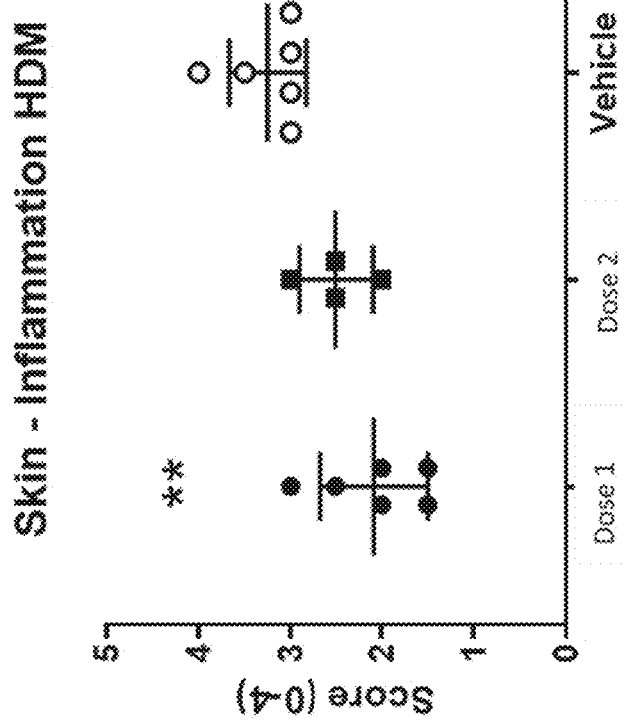

FIG. 14. F27100187 significantly reduced skin inflammation following HDM challenge. When compared to vehicle treated mice (3.25 score) skin inflammation was reduced with the 5.2 mg/kg F27100187 dose (2.018 score) and 1.0 mg/kg F27100187 dose (2.475 score).

FIG. 15. F27100187 significantly reduced IgE levels in serum. When compared to vehicle treated mice (548.7 pg/ml) serum IgE levels were reduced with the 5.2 mg/kg F27100187 dose (−1291 pg/ml) and 1.0 mg/kg F27100187 dose (−180.2 pg/ml).

5 DETAILED DESCRIPTION

The present disclosure provides a novel type of drug for treating autoimmune and/or inflammatory diseases, such as atopic dermatitis and asthma, and/or fibrotic diseases.

The present inventors found that a polypeptide targeting OX40L and IL-13 at the same time leads to an increased efficiency of modulating a type 2 inflammatory response as compared to monospecific anti-OX-40L or anti-IL-13 polypeptides in vitro and/or in vivo. Said polypeptides could be efficiently produced (e.g. in microbial hosts). Furthermore, such polypeptides could be shown to have limited reactivity to pre-existing antibodies in the subject to be treated (i.e. antibodies present in the subject before the first treatment with the antibody construct). In some embodiments such polypeptides can be conveniently administered and exhibit a half-life in the subject to be treated that is long enough such that the number of consecutive treatments remains limited and thus these treatments can be conveniently spaced apart in time.

The polypeptide is at least bispecific, but can also be e.g., trispecific, tetraspecific or pentaspecific. Moreover, the polypeptide is at least tetravalent, but can also be e.g. pentavalent or hexavalent, etc.

The terms "bispecific", "trispecific", "tetraspecific", or "pentaspecifc" all fall under the term "multispecific" and refer to binding to two, three, four or five different target molecules, respectively. The terms "bivalent", "trivalent", "tetravalent", "pentavalent", or "hexavalent" all fall under the term "multivalent" and indicate the presence of two, three, four or five binding units (such as ISVDs), respectively. For example, the polypeptide may be trispecific-tetravalent, such as a polypeptide comprising or consisting of four ISVDs, wherein one ISVD binds to human OX40L, two ISVDs bind to human IL-13 and one ISVD binds to human serum albumin (Such as ISVD construct F027100187). Such a polypeptide may at the same time be biparatopic, for example if two ISVDs bind two different epitopes on human OX40L or human IL-13. The term "biparatopic" refers to binding to two different parts (e.g., epitopes) of the same target molecule.

The terms "first ISVD", "second ISVD", "third ISVD", etc., as used herein only indicate the relative position of the ISVDs to each other, wherein the numbering is started from the N-terminus of the polypeptide of the present disclosure. The "first ISVD" is thus closer to the N-terminus than the "second ISVD", whereas the "second ISVD" is closer to the N-terminus than the "third ISVD", etc. Accordingly, the ISVD arrangement is inverse when considered from the C-terminus. Since the numbering is not absolute and only indicates the relative position of the at least three ISVDs it is not excluded that other binding units/building blocks such as additional ISVDs binding to OX40L or IL-13, or ISVDs binding to another target may be present in the polypeptide. Moreover, it does not exclude the possibility that other binding units/building blocks such as ISVDs can be placed in between. For instance, as described further below (see in particular, section 5.3 "(In vivo) half-life extension"), the polypeptide can further comprise another ISVD binding to human serum albumin that can even be located between e.g., the "second ISVD" and "third ISVD".

In light of the above, the disclosure provides a polypeptide comprising or consisting of at least three ISVDs, wherein at least one ISVD specifically binds to OX40L and at least two ISVDs specifically bind to the IL-13.

The components, such as ISVDs, of the polypeptide may be linked to each other by one or more suitable linkers, such as peptidic linkers.

The use of linkers to connect two or more (poly)peptides is well known in the art. Exemplary peptidic linkers are shown in Table A-5. One often used class of peptidic linker are known as the "Gly-Ser" or "GS" linkers. These are linkers that essentially consist of glycine (G) and serine (S) residues, and usually comprise one or more repeats of a peptide motif such as the GGGGS (SEQ ID NO: 65) motif (for example, having the formula (Gly-Gly-Gly-Gly-Ser)~ in which n may be 1, 2, 3, 4, 5, 6, 7 or more). Some often used examples of such GS linkers are 9GS linkers (GGGGSGGGS, SEQ ID NO: 68) 15GS linkers (n=3) and 35GS linkers (n=7). Reference is for example made to Chen et al., Adv. Drug Deliv. Rev. 2013 Oct. 15; 65(10): 1357-1369; and Klein et al., Protein Eng. Des. Sel. (2014) 27 (10): 325-330.

In the polypeptide of the present disclosure, in some embodiments, the use of 9GS linkers to link the components of the polypeptide to each other can be chosen.

In one embodiment, the ISVD specifically binding to OX40L is positioned at the N-terminus of the polypeptide. The inventors surprisingly found that such a configuration can increase the production yield of the polypeptide.

Also in one embodiment, one of the ISVDs specifically binding to IL-13 is positioned at the C-terminus of the polypeptide.

Accordingly, in some embodiments, the polypeptide comprises or consists of the following, in the order starting from the N-terminus of the polypeptide: a first ISVD specifically binding to OX40L, a first ISVD specifically binding to IL-13, an optional binding unit providing the polypeptide with increased half-life as defined herein, and a second ISVD specifically binding to IL-13. In some embodiments, the binding unit providing the polypeptide with increased half-life is an ISVD.

It is provided that in some embodiments the polypeptide comprises or consists of the following, in the order starting from the N-terminus of the polypeptide: an ISVD specifically binding to OX40L, a linker, a first ISVD specifically binding to IL-13, a linker, an ISVD binding to human serum albumin, a linker, and a second ISVD specifically binding to IL-13. In some embodiments, the linker is a 9GS linker.

Such configurations of the polypeptide can provide for increased production yield, good CMC characteristics as well as optimized functionality and stronger potency with regard to modulation of an immune response.

In some embodiments, the polypeptide of the present disclosure exhibits reduced binding by pre-existing antibodies in human serum. To this end, in one embodiment, the polypeptide has a valine (V) at amino acid position 11 and a leucine (L) at amino acid position 89 (according to Kabat numbering) in at least one ISVD, or in each ISVD. In another embodiment, the polypeptide has an extension of 1 to 5 amino acids, either naturally occurring, non-naturally occurring, or a mixture thereof, such as a single alanine (A) extension, at the C-terminus of the C-terminal ISVD. The C-terminus of an ISVD can be VTVSS (SEQ ID NO: 81). In another embodiment the polypeptide has a lysine (K) or glutamine (Q) at position 110 (according to Kabat numbering) in at least one ISVD, or in each ISVD. In another embodiment, the ISVD has a lysine (K) or glutamine (Q) at position 112 (according to Kabat numbering) in at least one ISVD, or in each ISVD. In some embodiments, the C-terminus of the ISVD is VKVSS (SEQ ID NO: 82), VQVSS (SEQ ID NO: 83), VTVKS (SEQ ID NO:84), VTVQS (SEQ ID NO:85), VKVKS (SEQ ID NO:86), VKVQS (SEQ ID NO:87), VQVKS (SEQ ID NO:88), or VQVQS (SEQ ID NO:89) such that after addition of a single alanine the C-terminus of the polypeptide for example has the sequence VTVSSA (SEQ ID NO: 90), VKVSSA (SEQ ID NO: 91), VQVSSA (SEQ ID NO: 92). VTVKSA (SEQ ID NO: 93), VTVQSA (SEQ ID NO: 94), VKVKSA (SEQ ID NO: 95), VKVQSA (SEQ ID NO: 96), VQVKSA (SEQ ID NO: 97), or VQVQSA (SEQ ID NO: 98). In one embodiment, the sequence is VKVSSA (SEQ ID NO: 91). In another embodiment, the polypeptide has a valine (V) at amino acid position 11 and a leucine (L) at amino acid position 89 (according to Kabat numbering) in each ISVD, optionally a lysine (K) or glutamine (Q) at position 110 (according to Kabat numbering) in at least one ISVD, and has an extension of 1 to 5 amino acids, either naturally occurring, non-naturally occurring, or a mixture thereof, such as a single alanine (A) extension, at the C-terminus of the C-terminal ISVD (such that the C-terminus of the polypeptide for example has the sequence VTVSSA (SEQ ID NO: 90). VKVSSA (SEQ ID NO: 91), or VQVSSA (SEQ ID NO: 92). See e.g. WO2012/175741 and WO2015/173325 for further information in this regard, each of which is hereby incorporated by reference in its entirety.

In one embodiment, the polypeptide of the present disclosure comprises or consists of an amino acid sequence having a sequence identity of more than 90%, such as more than 95% or more than 99%, with SEQ ID NO: 1, wherein the CDRs of the four ISVDs are as defined in items A to D (or A' to D' if using the Kabat definition) set forth in sections "0 Immunoglobulin single variable domains" and "5.3 (In vivo) half-life extension" below, respectively, wherein in particular:

- the ISVD specifically binding to OX40L has a CDR1 having the amino acid sequence of SEQ ID NO: 6, a CDR2 having the amino acid sequence of SEQ ID NO: 10 and a CDR3 having the amino acid sequence of SEQ ID NO: 14;
- the first ISVD specifically binding to IL-13 has a CDR1 having the amino acid sequence of SEQ ID NO: 7, a CDR2 having the amino acid sequence of SEQ ID NO: 11 and a CDR3 having the amino acid sequence of SEQ ID NO: 15;
- the second ISVD specifically binding to IL-13 has a CDR1 having the amino acid sequence of SEQ ID NO: 9, a CDR2 having the amino acid sequence of SEQ ID NO: 13 and a CDR3 having the amino acid sequence of SEQ ID NO: 17; and
- the ISVD binding to human serum albumin has a CDR1 having the amino acid sequence of SEQ ID NO: 8, a CDR2 having the amino acid sequence of SEQ ID NO: 12 and a CDR3 having the amino acid sequence of SEQ ID NO: 16, or alternatively if using the Kabat definition:

- the ISVD specifically binding to OX40L has a CDR1 having the amino acid sequence of SEQ ID NO: 31, a CDR2 having the amino acid sequence of SEQ ID NO: 35 and a CDR3 having the amino acid sequence of SEQ ID NO: 14;
- the first ISVD specifically binding to IL-13 has a CDR1 having the amino acid sequence of SEQ ID NO: 32, a CDR2 having the amino acid sequence of SEQ ID NO: 36 and a CDR3 having the amino acid sequence of SEQ ID NO: 15;
- the second specifically ISVD binding to IL-13 has a CDR1 having the amino acid sequence of SEQ ID NO: 34, a CDR2 having the amino acid sequence of SEQ ID NO: 38 and a CDR3 having the amino acid sequence of SEQ ID NO: 17; and
- the ISVD binding to human serum albumin has a CDR1 having the amino acid sequence of SEQ ID NO: 33, a CDR2 having the amino acid sequence of SEQ ID NO: 37 and a CDR3 having the amino acid sequence of SEQ ID NO: 16.

In some embodiments, the polypeptide comprises or consists of the amino acid sequence of SEQ ID NO: 1. In one embodiment, the polypeptide consists of the amino acid sequence of SEQ ID NO: 1.

The polypeptide of the present disclosure in some embodiments has at least half the binding affinity, at least the same binding affinity, or even more binding affinity to human 040L and to human IL-13 as compared to a polypeptide consisting of the amino acid of SEQ ID NO: 1 wherein the binding affinity is measured using the same method, such as SPR.

5.1 Immunoglobulin Single Variable Domains

The term "immunoglobulin single variable domain" (ISVD), interchangeably used with "single variable domain", defines immunoglobulin molecules wherein the antigen binding site is present on, and formed by, a single immunoglobulin domain. This sets immunoglobulin single variable domains apart from "conventional" immunoglobulins (e.g. monoclonal antibodies) or their fragments (such as Fab, Fab', $F(ab')_2$, scFv, di-scFv), wherein two immunoglobulin domains, in particular two variable domains, interact to form an antigen binding site. Typically, in conventional immunoglobulins, a heavy chain variable domain ($V_H$) and a light chain variable domain ($V_L$) interact to form an antigen binding site. In this case, the complementarity determining regions (CDRs) of both $V_H$ and $V_L$ will contribute to the antigen binding site, i.e. a total of 6 CDRs will be involved in antigen binding site formation.

In view of the above definition, the antigen-binding domain of a conventional 4-chain antibody (such as an IgG, IgM, IgA, IgD or IgE molecule; known in the art) or of a Fab fragment, a F(ab')$_2$ fragment, an Fv fragment such as a disulphide linked Fv or a scFv fragment, or a diabody (all known in the art) derived from such conventional 4-chain antibody, would normally not be regarded as an immunoglobulin single variable domain, as, in these cases, binding to the respective epitope of an antigen would normally not occur by one (single) immunoglobulin domain but by a pair of (associating) immunoglobulin domains such as light and heavy chain variable domains, i.e., by a $V_H$-$V_L$ pair of immunoglobulin domains, which jointly bind to an epitope of the respective antigen.

In contrast, immunoglobulin single variable domains are capable of specifically binding to an epitope of the antigen without pairing with an additional immunoglobulin variable domain. The binding site of an immunoglobulin single variable domain is formed by a single $V_H$, a single $V_{HH}$ or single VW domain.

As such, the single variable domain may be a light chain variable domain sequence (e.g., a $V_L$-sequence) or a suitable fragment thereof; or a heavy chain variable domain sequence (e.g., a $V_H$-sequence or $V_{HH}$ sequence) or a suitable fragment thereof; as long as it is capable of forming a single antigen binding unit (i.e., a functional antigen binding unit that essentially consists of the single variable domain, such that the single antigen binding domain does not need to interact with another variable domain to form a functional antigen binding unit).

An immunoglobulin single variable domain (ISVD) can for example be a heavy chain ISVD, such as a $V_H$, $V_{HH}$, including a camelized $V_H$ or humanized $V_{HH}$. According to some embodiments, an immunoglobulin single variable domain (ISVD) is a $V_{HH}$, including a camelized $V_H$ or humanized Vim. Heavy chain ISVDs can be derived from a conventional four-chain antibody or from a heavy chain antibody.

For example, the immunoglobulin single variable domain may be a single domain antibody (or an amino acid sequence that is suitable for use as a single domain antibody), a "dAb" or dAb (or an amino acid sequence that is suitable for use as a dAb) or a Nanobody® (as defined herein, and including but not limited to a $V_{HH}$); other single variable domains, or any suitable fragment of any one thereof.

In particular, the immunoglobulin single variable domain may be a Nanobody® (such as a $V_{HH}$, including a humanized $V_{HH}$ or camelized $V_H$) or a suitable fragment thereof. Nanobody®, Nanobodies@ and Nanoclone® are registered trademarks of Ablynx N.V.

"$V_{HH}$ domains", also known as $V_{HH}$s, $V_{HH}$ antibody fragments, and $V_{HH}$ antibodies, have originally been described as the antigen binding immunoglobulin variable domain of "heavy chain antibodies" (i.e., of "antibodies devoid of light chains": Hamers-Casterman et al. Nature 363: 446-448, 1993). The term "$V_{HH}$ domain" has been chosen in order to distinguish these variable domains from the heavy chain variable domains that are present in conventional 4-chain antibodies (which are referred to herein as "$V_H$ domains") and from the light chain variable domains that are present in conventional 4-chain antibodies (which are referred to herein as "$V_L$ domains"). For a further description of $V_{HH}$'s, reference is made to the review article by Muyldermans (Reviews in Molecular Biotechnology 74: 277-302, 2001), as well as to the following patent applications, which are mentioned as general background art: WO 94/04678, WO 95/04079 and WO 96/34103 of the Vrije Universiteit Brussel; WO 94/25591, WO 99/37681, WO 00/40968, WO 00/43507, WO 00/65057, WO 01/40310, WO 01/44301, EP 1134231 and WO 02/48193 of Unilever; WO 97/49805, WO 01/21817, WO 03/035694, WO 03/054016 and WO 03/055527 of the Vlaams Instituut voor Biotechnologie (VIB); WO 03/050531 of Algonomics N.V. and Ablynx N.V.; WO 01/90190 by the National Research Council of Canada; WO 03/025020 (=EP 1433793) by the Institute of Antibodies; as well as WO 04/041867, WO 04/041862, WO 04/041865, WO 04/041863, WO 04/062551, WO 05/044858, WO 06/40153, WO 06/079372, WO 06/122786, WO 06/122787 and WO 06/122825, by Ablynx N.V., each of which is hereby incorporated by reference in its entirety.

Typically, the generation of immunoglobulins involves the immunization of experimental animals, fusion of immunoglobulin producing cells to create hybridomas and screening for the desired specificities. Alternatively, immunoglobulins can be generated by screening of naïve or synthetic libraries e.g. by phage display.

The generation of immunoglobulin sequences, such as Nanobodies@, has been described extensively in various publications, among which WO 94/04678, Hamers-Casterman et al. 1993 and Muyldermans et al. 2001 (Reviews in Molecular Biotechnology 74: 277-302, 2001) can be exemplified, each of which is hereby incorporated by reference in its entirety. In these methods, camelids are immunized with the target antigen in order to induce an immune response against said target antigen. The repertoire of Nanobodies obtained from said immunization is further screened for Nanobodies that bind the target antigen.

In these instances, the generation of antibodies requires purified antigen for immunization and/or screening. Antigens can be purified from natural sources, or in the course of recombinant production.

Immunization and/or screening for immunoglobulin sequences can be performed using peptide fragments of such antigens.

Immunoglobulin sequences of different origin may be used, comprising mouse, rat, rabbit, donkey, human and camelid immunoglobulin sequences. The disclosure also includes fully human, humanized or chimeric sequences. For example, the disclosure comprises camelid immunoglobulin sequences and humanized camelid immunoglobulin sequences, or camelized domain antibodies, e.g. camelized dAb as described by Ward et al (see for example WO 94/04678 and Riechmann, Febs Lett., 339:285-290, 1994 and Prot. Eng., 9:531-537, 1996, each of which is hereby incorporated by reference in its entirety). Moreover, the disclosure also uses fused immunoglobulin sequences, e.g. forming a multivalent and/or multispecific construct (for multivalent and multispecific polypeptides containing one or more ViiH domains and their preparation, reference is also made to Conrath et al., J. Biol. Chem., Vol. 276, 10. 7346-7350, 2001, as well as to for example WO 96/34103 and WO 99/23221, each of which is hereby incorporated by reference in its entirety), and immunoglobulin sequences comprising tags or other functional moieties, e.g. toxins, labels, radiochemicals, etc., which are derivable from the immunoglobulin sequences of the present disclosure.

A "humanized $V_{HH}$" comprises an amino acid sequence that corresponds to the amino acid sequence of a naturally occurring Vim domain, but that has been "humanized", i.e. by replacing one or more amino acid residues in the amino acid sequence of said naturally occurring $V_{HH}$ sequence (and in particular in the framework sequences) by one or more of the amino acid residues that occur at the corresponding position(s) in a $V_H$ domain from a conventional 4-chain antibody from a human being (e.g. indicated above). This can be performed in a manner known per se, which will be clear to the skilled person, for example on the basis of the further description herein and in the literature (e.g. WO 2008/020079, incorporated by reference in its entirety). Again, it should be noted that such humanized $V_{HH}$s can be obtained in any suitable manner known per se and thus are not strictly limited to polypeptides that have been obtained using a polypeptide that comprises a naturally occurring $V_{HH}$ domain as a starting material.

A "camelized $V_H$" comprises an amino acid sequence that corresponds to the amino acid sequence of a naturally occurring $V_H$ domain, but that has been "camelized", i.e. by replacing one or more amino acid residues in the amino acid sequence of a naturally occurring $V_H$ domain from a conventional 4-chain antibody by one or more of the amino acid residues that occur at the corresponding position(s) in a $V_{HH}$ domain of a heavy chain antibody. This can be performed in a manner known per se, which will be clear to the skilled person, for example on the basis of the further description herein and the literature (e.g. WO 2008/020079). Such "camelizing" substitutions can be inserted at amino acid positions that form and/or are present at the $V_H$-$V_L$ interface, and/or at the so-called Camelidae hallmark residues, as defined herein (see for example WO 94/04678 and Davies and Riechmann (1994 and 1996), supra). In some embodiments, the $V_H$ sequence that is used as a starting material or starting point for generating or designing the camelized $V_H$ is a $V_H$ sequence from a mammal, or the $V_H$ sequence of a human being, such as a $V_H3$ sequence. However, it should be noted that such camelized $V_H$ can be obtained in any suitable manner known per se and thus are not strictly limited to polypeptides that have been obtained using a polypeptide that comprises a naturally occurring $V_H$ domain as a starting material.

It should be noted that one or more immunoglobulin sequences may be linked to each other and/or to other amino acid sequences (e.g. via disulphide bridges) to provide peptide constructs that may also be useful (for example Fab' fragments, F(ab')2 fragments, scFv constructs, "diabodies" and other multispecific constructs). Reference is for example made to the review by Holliger and Hudson, Nat Biotechnol. 2005 September; 23(9):1126-36)). Generally, when a polypeptide is intended for administration to a subject (for example for prophylactic, therapeutic and/or diagnostic purposes), it may comprise an immunoglobulin sequence that does not occur naturally in said subject.

A non-limiting example of structure of an immunoglobulin single variable domain sequence can be considered to be comprised of four framework regions ("FRs"), which are referred to in the art and herein as "Framework region 1" ("FR1"); as "Framework region 2" ("FR2"); as "Framework region 3" ("FR3"); and as "Framework region 4" ("FR4"), respectively; which framework regions are interrupted by three complementary determining regions ("CDRs"), which are referred to in the art and herein as "Complementarity Determining Region 1" ("CDR1"); as "Complementarity Determining Region 2" ("CDR2"); and as "Complementarity Determining Region 3" ("CDR3"), respectively.

As further described in paragraph q) on pages 58 and 59 of WO 08/020079 (incorporated herein by reference), the amino acid residues of an immunoglobulin single variable domain can be numbered according to the general numbering for $V_H$ domains given by Kabat et al. ("Sequence of proteins of immunological interest", US Public Health Services, NIH Bethesda, MD, Publication No. 91), as applied to $V_{HH}$ domains from Camelids in the article of Riechmann and Muyldermans, 2000 (J. Immunol. Methods 240 (1-2): 185-195; see for example FIG. 2 of this publication). It should be noted that—as is well known in the art for $V_H$ domains and for $V_{HH}$ domains—the total number of amino acid residues in each of the CDRs may vary and may not correspond to the total number of amino acid residues indicated by the Kabat numbering (that is, one or more positions according to the Kabat numbering may not be occupied in the actual sequence, or the actual sequence may contain more amino acid residues than the number allowed for by the Kabat numbering). This means that, generally, the numbering according to Kabat may or may not correspond to the actual numbering of the amino acid residues in the actual sequence. The total number of amino acid residues in a $V_H$ domain and a $V_{HH}$ domain will usually be in the range of from 110 to 120, often between 112 and 115. It should however be noted that smaller and longer sequences may also be suitable for the purposes described herein.

In the present application, unless indicated otherwise, CDR sequences were determined according to the AbM numbering as described in Kontermann and Dubel (Eds. 2010, Antibody Engineering, vol 2, Springer Verlag Heidelberg Berlin, Martin, Chapter 3, pp. 33-51). According to this method, FR1 comprises the amino acid residues at positions 1-25, CDR1 comprises the amino acid residues at positions 26-35, FR2 comprises the amino acids at positions 36-49, CDR2 comprises the amino acid residues at positions 50-58, FR3 comprises the amino acid residues at positions 59-94, CDR3 comprises the amino acid residues at positions 95-102, and FR4 comprises the amino acid residues at positions 103-113.

Determination of CDR regions may also be done according to different methods. In the CDR determination according to Kabat. FR1 of an immunoglobulin single variable domain comprises the amino acid residues at positions 1-30, CDR1 of an immunoglobulin single variable domain comprises the amino acid residues at positions 31-35, FR2 of an immunoglobulin single variable domain comprises the amino acids at positions 36-49, CDR2 of an immunoglobulin single variable domain comprises the amino acid residues at positions 50-65, FR3 of an immunoglobulin single variable domain comprises the amino acid residues at positions 66-94, CDR3 of an immunoglobulin single variable domain comprises the amino acid residues at positions 95-102, and FR4 of an immunoglobulin single variable domain comprises the amino acid residues at positions 103-113.

In such an immunoglobulin sequence, the framework sequences may be any suitable framework sequences, and examples of suitable framework sequences will be clear to the skilled person, for example on the basis the standard handbooks and the further disclosure and prior art mentioned herein.

The framework sequences can be (a suitable combination of) immunoglobulin framework sequences or framework sequences that have been derived from immunoglobulin framework sequences (for example, by humanization or camelization). For example, the framework sequences may be framework sequences derived from a light chain variable domain (e.g. a Vl-sequence) and/or from a heavy chain variable domain (e.g. a $V_H$-sequence or $V_{HH}$ sequence). In one embodiment, the framework sequences are either framework sequences that have been derived from a $V_{HH}$-sequence (in which said framework sequences may optionally have been partially or fully humanized) or are conventional $V_H$ sequences that have been camelized (as defined herein).

In particular, the framework sequences present in the ISVD sequence as disclosed herein may contain one or more of hallmark residues (as defined herein), such that the ISVD sequence is a Nanobody®, such as a $V_{HH}$, including a humanized $V_{HH}$ or camelized $V_H$. Some non-limiting examples of (suitable combinations of) such framework sequences will become clear from the further disclosure herein.

Again, as generally described herein for the immunoglobulin sequences, it is also possible to use suitable fragments (or combinations of fragments) of any of the foregoing, such as fragments that contain one or more CDR sequences, suitably flanked by and/or linked via one or more framework sequences (for example, in the same order as these CDR's and framework sequences may occur in the full-sized immunoglobulin sequence from which the fragment has been derived).

However, it should be noted that the disclosure is not limited as to the origin of the ISVD sequence (or of the nucleotide sequence used to express it), nor as to the way that the ISVD sequence or nucleotide sequence is (or has been) generated or obtained. Thus, the ISVD sequences may be naturally occurring sequences (from any suitable species) or synthetic or semi-synthetic sequences. In a specific but non-limiting aspect, the ISVD sequence is a naturally occurring sequence (from any suitable species) or a synthetic or semi-synthetic sequence, including but not limited to "humanized" (as defined herein) immunoglobulin sequences (such as partially or fully humanized mouse or rabbit immunoglobulin sequences, and in particular partially or fully humanized $V_{HH}$ sequences), "camelized" (as defined herein) immunoglobulin sequences, as well as immunoglobulin sequences that have been obtained by techniques such as affinity maturation (for example, starting from synthetic, random or naturally occurring immunoglobulin sequences), CDR grafting, veneering, combining fragments derived from different immunoglobulin sequences, PCR assembly using overlapping primers, and similar techniques for engineering immunoglobulin sequences well known to the skilled person; or any suitable combination of any of the foregoing.

Similarly, nucleotide sequences may be naturally occurring nucleotide sequences or synthetic or semi-synthetic sequences, and may for example be sequences that are isolated by PCR from a suitable naturally occurring template (e.g. DNA or RNA isolated from a cell), nucleotide sequences that have been isolated from a library (and in particular, an expression library), nucleotide sequences that have been prepared by introducing mutations into a naturally occurring nucleotide sequence (using any suitable technique known per se, such as mismatch PCR), nucleotide sequence that have been prepared by PCR using overlapping primers, or nucleotide sequences that have been prepared using techniques for DNA synthesis known per se.

As described above, an ISVD may be a Nanobody® or a suitable fragment thereof. For a general description of Nanobodies® (Nanobody® and Nanobodies® are registered trademarks of Ablynx N.V., a Sanofi Company), reference is made to the further description below, as well as to the prior art cited herein. In this respect, it should however be noted that this description and the prior art mainly described Nanobodies® of the so-called "$V_H3$ class" (i.e. Nanobodies® with a high degree of sequence homology to human germline sequences of the $V_H3$ class such as DP-47. DP-51 or DP-29). It should however be noted that the disclosure in its broadest sense can generally use any type of Nanobody®, and for example also uses the Nanobodies® belonging to the so-called "$V_H4$ class" (i.e. Nanobodies® with a high degree of sequence homology to human germline sequences of the $V_H4$ class such as DP-78), as for example described in WO 2007/118670, incorporated by reference in its entirety.

Generally, Nanobodies® (in particular $V_{HH}$ sequences, including (partially) humanized $V_{HH}$ sequences and camelized $V_H$ sequences) can be characterized by the presence of one or more "Hallmark residues" (as described herein) in one or more of the framework sequences (again as further described herein). Thus, generally, a Nanobody® can be defined as an immunoglobulin sequence with the (general) structure

FR1-CDR1-FR2-CDR2-FR3-CDR3-FR4 in which FR1 to FR4 refer to framework regions 1 to 4, respectively, and in which CDR1 to CDR3 refer to the complementarity determining regions 1 to 3, respectively, and in which one or more of the Hallmark residues are as further defined herein.

In particular, a Nanobody® can be an immunoglobulin sequence with the (general) structure

FR1-CDR1-FR2-CDR2-FR3-CDR3-FR4 in which FR1 to FR4 refer to framework regions 1 to 4, respectively, and in which CDR1 to CDR3 refer to the complementarity determining regions 1 to 3, respectively, and in which the framework sequences are as further defined herein.

More in particular, a Nanobody® can be an immunoglobulin sequence with the (general) structure

FR1-CDR1-FR2-CDR2-FR3-CDR3-FR4 in which FR1 to FR4 refer to framework regions 1 to 4, respectively, and in which CDR1 to CDR3 refer to the complementarity determining regions 1 to 3, respectively, and in which:

one or more of the amino acid residues at positions 11, 37, 44, 45, 47, 83, 84, 103, 104 and 108 according to the Kabat numbering are chosen from the Hallmark residues mentioned in Table A-0 below.

TABLE A-0

Hallmark Residues in Nanobodies ®

| Position | Human $V_H3$ | Hallmark Residues |
|---|---|---|
| 11 | L, V; predominantly L | L, S, V, M, W, F, T, Q, E, A, R, G, K, Y, N, P, I |
| 37 | V, I, F; usually V | F$^{(1)}$, Y, V, L, A, H, S, I, W, C, N, G, D, T, P |
| 44$^{(8)}$ | G | E$^{(3)}$, Q$^{(3)}$, G$^{(2)}$, D, A, K, R, L, P, S, V, H, T, N, W, M, I |
| 45$^{(8)}$ | L | L$^{(2)}$, R$^{(3)}$, P, H, F, G, Q, S, E, T, Y, C, I, D, V |
| 47$^{(8)}$ | W, Y | F$^{(1)}$, L$^{(1)}$ or W$^{(2)}$ G, I, S, A, V, M, R, Y, E, P, T, C, H, K, Q, N, D |
| 83 | R or K; usually R | R, K$^{(5)}$, T, E$^{(5)}$, Q, N, S, I, V, G, M, L, A, D, Y, H |
| 84 | A, T, D; predominantly A | P$^{(5)}$, S, H, L, A, V, I, T, F, D, R, Y, N, Q, G, E |
| 103 | W | W$^{(4)}$, R$^{(6)}$, G, S, K, A, M, Y, L, F, T, N, V, Q, P$^{(6)}$, E, C |

TABLE A-0-continued

Hallmark Residues in Nanobodies ®

| Position | Human V$_H$3 | Hallmark Residues |
|---|---|---|
| 104 | G | G, A, S, T, D, P, N, E, C, L |
| 108 | L, M or T; predominantly L | Q, L[(7)], R, P, E, K, S, T, M, A, H |

Notes:
[(1)]In particular, but not exclusively, in combination with KERE or KQRE at positions 43-46.
[(2)]Usually as GLEW at positions 44-47.
[(3)]Usually as KERE or KQRE at positions 43-46, e.g. as KEREL, KEREF, KQREL, KQREF, KEREG, KQREW or KQREG at positions 43-47. Alternatively, also sequences such as TERE (for example TEREL), TQRE (for example TQREL), KECE (for example KECEL or KECER), KQCE (for example KQCEL), RERE (for example REREG), RQRE (for example RQREL, RQREF or RQREW), QERE (for example QEREG), QQRE, (for example QQREW, QQREL or QQREF), KGRE (for example KGREG), KDRE (for example KDREV) are possible. Some other possible sequences include for example DECKL and NVCEL.
[(4)]With both GLEW at positions 44-47 and KERE or KQRE at positions 43-46.
[(5)]Often as KP or EP at positions 83-84 of naturally occurring V$_{HH}$ domains.
[(6)]In particular, but not exclusively, in combination with GLEW at positions 44-47.
[(7)]With the proviso that when positions 44-47 are GLEW, position 108 is always Q in (non-humanized) V$_{HH}$ sequences that also contain a W at 103.
[(8)]The GLEW group also contains GLEW-like sequences at positions 44-47, such as for example GVEW, EPEW, GLER, DQEW, DLEW, GIEW, ELEW, GPEW, EWLP, GPER, GLER and ELEW.

In some embodiments, the hallmark residue at position 11 is L. In some embodiments, the hallmark residue at position 37 is F1[(1)] or Y. In some embodiments, the hallmark residue at position 44 is G[(2)] or Q[(3)]. In some embodiments, the hallmark residue at position 45 is L[(2)] or R[(3)]. In some embodiments, the hallmark residue at position 47 is F[(1)], L[(1)] or W[(2)]. In some embodiments, the hallmark residue at position 83 is K. In some embodiments, the hallmark residue at position 84 is P. In some embodiments, the hallmark residue at position 103 is W. In some embodiments, the hallmark residue at position 104 is G. In some embodiments, the hallmark residue at position 108 is Q or L.

The disclosure inter alia uses ISVDs that can specifically bind to OX40L or IL-13. In the context of the present disclosure, "binding to" a certain target molecule has the usual meaning in the art as understood in the context of antibodies and their respective antigens.

The polypeptide of the present disclosure may comprise one or more ISVDs binding to OX40L and two or more ISVDs binding to IL-13. For example, the polypeptide may comprise one ISVD that binds to OX40L and two ISVDs that bind to IL-13.

In some embodiments, at least one ISVD can functionally block its target molecule. For example, targeting moieties can block the interaction between OX40L and OX40 (receptor), and in some embodiments can inhibit the OX40L induced release of IL2 from T-cells, or can block the interaction between IL-13 and IL-13Rα1 (Interleukin 13 receptor, alpha 1) and/or the interaction between IL-13/IL-13Rα1 complex and IL-4Rα (alpha interleukin-4 receptor). Accordingly, in one embodiment, the polypeptide of the present disclosure comprises at least one ISVD that specifically binds to OX40L and inhibits its interaction with OX40, and two ISVDs that specifically bind to IL-13 and functionally block its interaction with IL-13Rα1 and/or the interaction between IL-13/IL-3Rα1 complex and IL-4Rα.

The ISVDs used in the disclosure form part of a polypeptide of the present disclosure, which comprises or consists of at least three ISVDs, such that the polypeptide can specifically bind to OX40L and IL-13.

Accordingly, the target molecules for the at least three ISVDs as used in the polypeptide of the present disclosure are OX40L and IL-13. Examples are mammalian OX40L and IL-13. While human OX40L (Uniprot accession P23510) and human IL-13 (Uniprot accession P35225) can be used, the versions from other species are also amenable to the present disclosure, for example OX40L and IL-13 from mice, rats, rabbits, cats, dogs, goats, sheep, horses, pigs, non-human primates, such as cynomolgus monkeys (also referred to herein as "cyno"), or camelids, such as llama or alpaca.

Specific examples of ISVDs specifically binding to OX40L or IL-13 that can be used in the disclosure are as described in the following items A to C:

A. An ISVD that specifically binds to human OX40L and comprises
   i. a CDR1 which has the amino acid sequence of SEQ ID NO: 6 or has 2 or 1 amino acid difference with SEQ ID NO: 6;
   ii. a CDR2 which has the amino acid sequence SEQ ID NO: 10 or has 2 or 1 amino acid difference with SEQ ID NO: 10; and
   iii. a CDR3 which has the amino acid sequence of SEQ ID NO: 14 or has 2 or 1 amino acid difference with SEQ ID NO: 14,
   In some embodiments, the CDR1 has the amino acid sequence of SEQ ID NO: 6, the CDR2 has the amino acid sequence of SEQ ID NO: 10, and the CDR3 has the amino acid sequence of SEQ ID NO: 14.

Non-limiting examples of such an ISVD that specifically binds to human OX40L have one or more, or all, framework regions as indicated for construct 15B07AM in Table A-2 (in addition to the CDRs as defined in the preceding item A), such as an ISVD having the full amino acid sequence of construct 15B07AM (SEQ ID NO: 2, see Table A-1 and A-2).

Also, in one embodiment, the amino acid sequence of the ISVD specifically binding to human OX40L may have a sequence identity of more than 90%, such as more than 95% or more than 99%, with SEQ ID NO: 2, wherein optionally the CDRs are as defined in the preceding item A. In some embodiments, the ISVD specifically binding to OX40L has the amino acid sequence of SEQ ID NO: 2.

When such an ISVD specifically binding to OX40L has 2 or 1 amino acid difference in at least one CDR relative to a corresponding reference CDR sequence (item A above), in some embodiments, the ISVD has at least half the binding affinity, at least the same binding affinity, or even higher binding affinity to human OX40L as construct 15B07AM, wherein the binding affinity is measured using the same method, such as SPR.

B. An ISVD that specifically binds to human IL-13 and comprises
   i. a CDR1 which has the amino acid sequence SEQ ID NO: 7 or has 2 or 1 amino acid difference with SEQ ID NO: 7;
   ii. a CDR2 which has the amino acid sequence SEQ ID NO: 11 or has 2 or 1 amino acid difference with SEQ ID NO: 11; and
   iii. a CDR3 which has the amino acid sequence SEQ ID NO: 15 or has 2 or 1 amino acid difference with SEQ ID NO: 15,
   In some embodiments, the CDR1 has the amino acid sequence of SEQ ID NO: 7, the CDR2 has the amino acid sequence of SEQ ID NO: 11 and the CDR3 has the amino acid sequence of SEQ ID NO: 15.

Non-limiting examples of such an ISVD that specifically binds to human IL-13 have one or more, or all, framework regions as indicated for construct 4B02/1 in Table A-2 (in addition to the CDRs as defined in the preceding item B), such as an ISVD having the full amino acid sequence of construct 4B02/1 (SEQ ID NO: 3, see Table A-1 and A-2).

Also, in one embodiment, the amino acid sequence of an ISVD specifically binding to human IL-13 may have a sequence identity of more than 90%, such as more than 95% or more than 99%, with SEQ ID NO: 3, wherein optionally the CDRs are as defined in the preceding item B. In some embodiments, the ISVD binding to IL-13 has the amino acid sequence of SEQ ID NO: 3.

When such an ISVD binding to IL-13 has 2 or 1 amino acid difference in at least one CDR relative to a corresponding reference CDR sequence (item B above), in some embodiments, the ISVD has at least half the binding affinity, at least the same binding affinity, or even higher binding affinity to human IL-13 as construct 4B02/1, wherein the binding affinity is measured using the same method, such as SPR.

C. An ISVD that specifically binds to human IL-13 and comprises
   i. a CDR1 which has the amino acid sequence of SEQ ID NO: 9 or has 2 or 1 amino acid difference with SEQ ID NO: 9;
   ii. a CDR2 which has the amino acid sequence of SEQ ID NO: 13 or has 2 or 1 amino acid difference with SEQ ID NO: 13; and
   iii. a CDR3 which has the amino acid sequence of SEQ ID NO: 17 or has 2 or 1 amino acid difference with SEQ ID NO: 17,
In some embodiments, the CDR1 has the amino acid sequence of SEQ ID NO: 9, the CDR2 has the amino acid sequence of SEQ ID NO: 13 and the CDR3 has the amino acid sequence of SEQ ID NO: 17.

Non-limiting examples of such an ISVD that specifically binds to human IL-13 have one or more, or all, framework regions as indicated for construct 4B06/1 in Table A-2 (in addition to the CDRs as defined in the preceding item C), such as an ISVD having the full amino acid sequence of construct 4B06/1 (SEQ ID NO: 5, see Table A-1 and A-2).

Also, in one embodiment, the amino acid sequence of an ISVD specifically binding to human IL-13 may have a sequence identity of more than 90%, such as more than 95% or more than 99%, with SEQ ID NO: 5, wherein optionally the CDRs are as defined in the preceding item C. In some embodiments, the ISVD binding to IL-13 has the amino acid sequence of SEQ ID NO: 5.

When such an ISVD specifically binding to IL-13 has 2 or 1 amino acid difference in at least one CDR relative to a corresponding reference CDR sequence (item C above), the ISVD has at least half the binding affinity, at least the same binding affinity, or even higher binding affinity to human IL-13 as construct 4B06/1, wherein the binding affinity is measured using the same method, such as SPR.

In some embodiments, each of the ISVDs as defined under items A to C above is comprised in the polypeptide of the present disclosure. In some embodiments, such a polypeptide of the present disclosure comprising each of the ISVDs as defined under items A to C above has at least half the binding affinity, at least the same binding affinity, or even more binding affinity to human OX40L and to human IL-13 as a polypeptide consisting of the amino acid of SEQ ID NO: 1, wherein the binding affinity is measured using the same method, such as SPR.

The SEQ ID NOs referred to in the above items A to C are based on the CDR definition according to the AbM definition (see Table A-2). It is noted that the SEQ ID NOs defining the same CDRs according to the Kabat definition (see Table A-2.1) can likewise be used in the above items A to C.

Accordingly, the specific ISVDs specifically binding to OX40L or IL-13 that can be used in the disclosure as described above using the AbM definition can be also described using the Kabat definition as set forth in items A' to C' below:

A'. An ISVD that specifically binds to human OX40L and comprises
   i. a CDR1 which has the amino acid sequence of SEQ ID NO: 31 or has 2 or 1 amino acid difference with SEQ ID NO: 31;
   ii. a CDR2 which has the amino acid sequence SEQ ID NO: 35 or has 2 or 1 amino acid difference with SEQ ID NO: 35; and
   iii. a CDR3 which has the amino acid sequence of SEQ ID NO: 14 or has 2 or 1 amino acid difference with SEQ ID NO: 14,
In some embodiments, the CDR1 has the amino acid sequence of SEQ ID NO: 31, the CDR2 has the amino acid sequence of SEQ ID NO: 35 and the CDR3 has the amino acid sequence of SEQ ID NO: 14.

Non-limiting examples of such an ISVD that specifically binds to human OX40L have one or more, or all, framework regions as indicated for construct 15B07AM in Table A-2.1 (in addition to the CDRs as defined in the preceding item A'), such as an ISVD having the full amino acid sequence of construct 15B07AM (SEQ ID NO: 2, see Table A-1 and A-2.1).

B'. An ISVD that specifically binds to human IL-13 and comprises
   i. a CDR1 which has the amino acid sequence SEQ ID NO: 32 or has 2 or 1 amino acid difference with SEQ ID NO: 32;
   ii. a CDR2 which has the amino acid sequence SEQ ID NO: 36 or has 2 or 1 amino acid difference with SEQ ID NO: 36; and
   iii. a CDR3 which has the amino acid sequence SEQ ID NO: 15 or has 2 or 1 amino acid difference with SEQ ID NO: 15,
In some embodiments, the CDR1 has the amino acid sequence of SEQ ID NO: 32, the CDR2 has the amino acid sequence of SEQ ID NO: 36 and the CDR3 has the amino acid sequence of SEQ ID NO: 15.

Non-limiting examples of such an ISVD that specifically binds to human IL-13 have one or more, or all, framework regions as indicated for construct 4B02/1 in Table A-2.1 (in addition to the CDRs as defined in the preceding item B'), such as an ISVD having the full amino acid sequence of construct 4B02/1 (SEQ ID NO: 3, see Table A-1 and A-2.1).

C'. An ISVD that specifically binds to human IL-13 and comprises
   i. a CDR1 which has the amino acid sequence of SEQ ID NO: 34 or has 2 or 1 amino acid difference with SEQ ID NO: 34;
   ii. a CDR2 which has the amino acid sequence of SEQ ID NO: 38 or has 2 or 1 amino acid difference with SEQ ID NO: 38; and
   iii. a CDR3 which has the amino acid sequence of SEQ ID NO: 17 or has 2 or 1 amino acid difference with SEQ ID NO: 17,
In some embodiments, the CDR1 has the amino acid sequence of SEQ ID NO: 34, the CDR2 has the amino acid sequence of SEQ ID NO: 38 and the CDR3 has the amino acid sequence of SEQ ID NO: 17.

Non-limiting examples of such an ISVD that specifically binds to human IL-13 have one or more, or all, framework regions as indicated for construct 4B06/1 in Table A-2.1 (in addition to the CDRs as defined in the preceding item C'), such as an ISVD having the full amino acid sequence of construct 4B06/1 (SEQ ID NO: 5, see Table A-1 and A-2.1).

The percentage of "sequence identity" between a first amino acid sequence and a second amino acid sequence may be calculated by dividing [the number of amino acid residues in the first amino acid sequence that are identical to the amino acid residues at the corresponding positions in the second amino acid sequence] by [the total number of amino acid residues in the first amino acid sequence] and multiplying by 1100%1, in which each deletion, insertion, substitution or addition of an amino acid residue in the second amino acid sequence—compared to the first amino acid sequence—is considered as a difference at a single amino acid residue (i.e. at a single position).

Usually, for the purpose of determining the percentage of "sequence identity" between two amino acid sequences in accordance with the calculation method outlined hereinabove, the amino acid sequence with the greatest number of amino acid residues will be taken as the "first" amino acid sequence, and the other amino acid sequence will be taken as the "second" amino acid sequence.

An "amino acid difference" as used herein refers to a deletion, insertion or substitution of a single amino acid residue vis-h-vis a reference sequence. In some embodiments, the amino acid difference is a substitution.

In some embodiments, the amino acid substitutions are conservative substitutions. In some embodiments, such conservative substitutions are substitutions in which one amino acid within the following groups (a)-(e) is substituted by another amino acid residue within the same group: (a) small aliphatic, nonpolar or slightly polar residues: Ala, Ser, Thr, Pro and Gly; (b) polar, negatively charged residues and their (uncharged) amides: Asp, Asn, Glu and Gln: (c) polar, positively charged residues: His, Arg and Lys; (d) large aliphatic, nonpolar residues: Met, Leu. Ile, Val and Cys; and (e) aromatic residues: Phe, Tyr and Trp.

In some embodiments, the conservative substitutions are as follows: Ala into Gly or into Ser; Arg into Lys; Asn into Gln or into His; Asp into Glu; Cys into Ser, Gln into Asn; Glu into Asp; Gly into Ala or into Pro: His into Asn or into Gin; Ile into Leu or into Val: Leu into Ile or into Val; Lys into Arg, into Gin or into Glu; Met into Leu, into Tyr or into lie; Phe into Met, into Leu or into Tyr; Ser into Thr, Thr into Ser; Trp into Tyr; Tyr into Trp; and/or Phe into Val, into lie or into Leu.

5.2 Specificity

The terms "specificity", "binding specifically" or "specific binding" refer to the number of different target molecules, such as antigens, from the same organism to which a particular binding unit, such as an ISVD, can bind with sufficiently high affinity (see below). "Specificity", "binding specifically" or "specific binding" are used interchangeably herein with "selectivity", "binding selectively" or "selective binding". According to some embodiments, binding units, such as ISVDs, specifically bind to their designated targets.

The specificity/selectivity of a binding unit can be determined based on affinity. The affinity denotes the strength or stability of a molecular interaction. The affinity is commonly given as by the KD, or dissociation constant, which has units of mol/liter (or M). The affinity can also be expressed as an association constant, KA, which equals 1/KD and has units of (mol/liter)$^{-1}$ (or M$^{-1}$).

The affinity is a measure for the binding strength between a moiety and a binding site on the target molecule: the lesser the value of the KD, the stronger the binding strength between a target molecule and a targeting moiety.

Typically, binding units used in the present disclosure (such as ISVDs) will bind to their targets (at room temperature) with a dissociation constant (KD) of $10^{-5}$ to $10^{12}$ moles/liter or less, such as $10^{-7}$ to $10^{-12}$ moles/liter or less, more particularly such as $10^{-8}$ to $10^{-12}$ moles/liter (i.e. with an association constant (KA) of 105 to $10^{12}$ liter/moles or more, such as 107 to $10^{12}$ liter/moles or more and more particularly such as $10^8$ to $10^{12}$ liter/moles).

Any KD value greater than $10^{-4}$ mol/liter (or any KA value lower than $10^4$ liters/mol) is generally considered to indicate non-specific binding.

The KD for biological interactions, such as the binding of immunoglobulin sequences to an antigen, which are considered specific are typically in the range of $10^{-5}$ moles/liter (10000 nM or 10 µM) to $10^{-12}$ moles/liter (0.001 nM or 1 pM) or less.

Accordingly, specific/selective binding may mean that—using the same measurement method, e.g. SPR—a binding unit (or polypeptide comprising the same) binds to OX40L and/or IL-13 with a KD value of $10^{-5}$ to $10^{-12}$ moles/liter or less and binds to related cytokines with a KD value greater than $10^{-4}$ moles/liter. Examples of OX40L related targets are human TRAIL, CD30L, CD40L and RANKL. Examples of IL-13 related targets are human IL-4. Thus, in an embodiment, at least one ISVD comprised in the polypeptide binds to OX40L with a KD value of $10^{-5}$ to $10^{-2}$ moles/liter or less and binds to TRAIL, CD30L, CD40L and RANKL of the same species with a KD value greater than 104 moles/liter, and at least two ISVDs comprised in the polypeptide bind to IL-13 with a KD value of $10^{-5}$ to $10^{-2}$ moles/liter or less and binds to IL-4 of the same species with a KD value greater than $10^{-4}$ moles/liter.

Thus, in some embodiments, the polypeptide of the present disclosure has at least half the binding affinity, at least the same binding affinity, or even higher binding affinity to human OX40L and to human IL-13 as compared to a polypeptide consisting of the amino acid of SEQ ID NO: 1, wherein the binding affinity is measured using the same method, such as SPR.

Specific binding to a certain target from a certain species does not exclude that the binding unit can also specifically bind to the analogous target from a different species. For example, specific binding to human OX40L does not exclude that the binding unit (or a polypeptide comprising the same) can also specifically bind to OX40L from cynomolgus monkeys. Likewise, for example, specific binding to human IL-13 does not exclude that the binding unit (or a polypeptide comprising the same) can also specifically bind to IL-13 from cynomolgus monkeys ("cyno").

Specific binding of a binding unit to its designated target can be determined in any suitable manner known per se, including, but not limited to, Scatchard analysis and/or competitive binding assays, such as radioimmunoassays (RIA), enzyme immunoassays (EIA) and sandwich competition assays, and the different variants thereof known per se in the art; as well as the other techniques mentioned herein.

The dissociation constant may be the actual or apparent dissociation constant, as will be clear to the skilled person. Methods for determining the dissociation constant will be clear to the skilled person, and for example include the techniques mentioned below. In this respect, it will also be clear that it may not be possible to measure dissociation constants of more than $10^{-4}$ moles/liter or $10^{-3}$ moles/liter (e.g. of $10^{-2}$ moles/liter). Optionally, as will also be clear to the skilled person, the (actual or apparent) dissociation constant may be calculated on the basis of the (actual or apparent) association constant (KA), by means of the relationship [KD=1/KA].

The affinity of a molecular interaction between two molecules can be measured via different techniques known per se, such as the well-known surface plasmon resonance (SPR) biosensor technique (see for example Ober et al. 2001, Intern. Immunology 13: 1551-1559). The term "surface plasmon resonance", as used herein, refers to an optical phenomenon that allows for the analysis of real-time biospecific interactions by detection of alterations in protein concentrations within a biosensor matrix, where one molecule is immobilized on the biosensor chip and the other molecule is passed over the immobilized molecule under flow conditions yielding $k_{on}$, $k_{off}$ measurements and hence $K_D$ (or $K_A$) values. This can for example be performed using the well-known BIAcore® system (BIAcore International AB, a GE Healthcare company, Uppsala, Sweden and Piscataway, Nj). For further descriptions, see Jonsson et al. (1993, Ann. Biol. Clin. 51: 19-26), Jonsson et al. (1991 Biotechniques 11: 620-627), Johnsson et al. (1995, J. Mol. Recognit. 8: 125-131), and Johnsson et al. (1991, Anal. Biochem. 198: 268-277).

Another well-known biosensor technique to determine affinities of biomolecular interactions is bio-layer interferometry (BLI) (see for example Abdiche et al. 2008, Anal. Biochem. 377: 209-217). The term "bio-layer Interferometry" or "BLI", as used herein, refers to a label-free optical technique that analyzes the interference pattern of light reflected from two surfaces: an internal reference layer (reference beam) and a layer of immobilized protein on the biosensor tip (signal beam). A change in the number of molecules bound to the tip of the biosensor causes a shift in the interference pattern, reported as a wavelength shift (nm), the magnitude of which is a direct measure of the number of molecules bound to the biosensor tip surface. Since the interactions can be measured in real-time, association and dissociation rates and affinities can be determined. BLI can for example be performed using the well-known Octet® Systems (ForteBio, a division of Pall Life Sciences, Menlo Park, USA).

Alternatively, affinities can be measured in Kinetic Exclusion Assay (KinExA) (see for example Drake et al. 2004, Anal. Biochem., 328: 35-43), using the KinExA@ platform (Sapidyne Instruments Inc, Boise, USA). The term "KinExA", as used herein, refers to a solution-based method to measure true equilibrium binding affinity and kinetics of unmodified molecules. Equilibrated solutions of an antibody/antigen complex are passed over a column with beads precoated with antigen (or antibody), allowing the free antibody (or antigen) to bind to the coated molecule. Detection of the antibody (or antigen) thus captured is accomplished with a fluorescently labeled protein binding the antibody (or antigen).

The GYROLAB® immunoassay system provides a platform for automated bioanalysis and rapid sample turnaround (Fraley et al. 2013, Bioanalysis 5: 1765-74).

5.3 (In Vivo) Half-Life Extension

The polypeptide may further comprise one or more other groups, residues, moieties or binding units, optionally linked via one or more peptidic linkers, in which said one or more other groups, residues, moieties or binding units provide the polypeptide with increased (in vivo) half-life, compared to the corresponding polypeptide without said one or more other groups, residues, moieties or binding units. In vivo half-life extension means, for example, that the polypeptide has an increased half-life in a mammal, such as a human subject, after administration. Half-life can be expressed for example as t1/2beta.

The type of groups, residues, moieties or binding units is not generally restricted and may for example be chosen from the group consisting of a polyethylene glycol molecule, serum proteins or fragments thereof, binding units that can bind to serum proteins, an Fc portion, and small proteins or peptides that can bind to serum proteins.

More specifically, said one or more other groups, residues, moieties or binding units that provide the polypeptide with increased half-life can be chosen from the group consisting of binding units that can bind to serum albumin, such as human serum albumin, or a serum immunoglobulin, such as IgG. In some embodiments, the binding unit can bind to human serum albumin. In some embodiments, the binding unit is an ISVD.

For example, WO 04/041865 (incorporated by reference in its entirety) describes Nanobodies® binding to serum albumin (and in particular against human serum albumin) that can be linked to other proteins (such as one or more other Nanobodies® binding to a desired target) in order to increase the half-life of said protein.

The international application WO 06/122787 (incorporated by reference in its entirety) describes a number of Nanobodies® against (human) serum albumin. These Nanobodies® include the Nanobody® called Alb-1 (SEQ ID NO: 52 in WO 06/122787, incorporated by reference in its entirety) and humanized variants thereof, such as Alb-8 (SEQ ID NO: 62 in WO 06/122787, incorporated by reference in its entirety). Again, these can be used to extend the half-life of therapeutic proteins and polypeptide and other therapeutic entities or moieties.

Moreover, WO2012/175400 (incorporated by reference in its entirety) describes a further improved version of Alb-1, called Alb-23.

In one embodiment, the polypeptide comprises a serum albumin binding moiety selected from Alb-1, Alb-3, Alb-4, Alb-5, Alb-6, Alb-7, Alb-8, Alb-9, Alb-10 and Alb-23. In some embodiments, the polypeptide comprises Alb-8 or Alb-23, or its variants, as shown on pages 7-9 of WO2012/175400 and the albumin binders described in WO2012/175741, WO2015/173325, WO2017/080850, WO2017/085172, WO2018/104444, WO2018/134235, WO2018/134234, each of which is herein incorporated by reference in its entirety. Some non-limiting examples of serum albumin binders are also shown in Table A-4. In some embodiments, the polypeptide of the present disclosure comprises a further component as described in item D:

D. An ISVD that binds to human serum albumin and comprises
   i. a CDR1 which has the amino acid sequence of SEQ ID NO: 8 or has 2 or 1 amino acid difference with SEQ ID NO: 8;
   ii. a CDR2 which has the amino acid sequence of SEQ ID NO: 12 or has 2 or 1 amino acid difference with SEQ ID NO: 12; and
   iii. a CDR3 which has the amino acid sequence of SEQ ID NO: 16 or has 2 or 1 amino acid difference with SEQ ID NO: 16;

In some embodiments, the CDR1 has the amino acid sequence of SEQ ID NO: 8, the CDR2 has the amino acid sequence of SEQ ID NO: 12 and the CDR3 has the amino acid sequence of SEQ ID NO: 16.

Non-limiting examples of such an ISVD that binds to human serum albumin have one or more, or all, framework regions as indicated for construct ALB23002 in Table A-2

(in addition to the CDRs as defined in the preceding item D), such as an ISVD having the full amino acid sequence of construct ALB23002 (SEQ ID NO: 4, see Table A-1 and A-2).

Item D can be also described using the Kabat definition as:

D'. An ISVD that binds to human serum albumin and comprises
  i. a CDR1 which has the amino acid sequence of SEQ ID NO: 33 or has 2 or 1 amino acid difference with SEQ ID NO: 33;
  ii. a CDR2 which has the amino acid sequence of SEQ ID NO: 37 or has 2 or 1 amino acid difference with SEQ ID NO: 37; and
  iii. a CDR3 which has the amino acid sequence of SEQ ID NO: 16 or has 2 or 1 amino acid difference with SEQ ID NO: 16;
  In some embodiments, the CDR1 has the amino acid sequence of SEQ ID NO: 33, the CDR2 has the amino acid sequence of SEQ ID NO: 37 and the CDR3 has the amino acid sequence of SEQ ID NO: 16.

Non-limiting examples of such an ISVD that binds to human serum albumin have one or more, or all, framework regions as indicated for construct ALB23002 in Table A-2.1 (in addition to the CDRs as defined in the preceding item D'), such as an ISVD having the full amino acid sequence of construct ALB23002 (SEQ ID NO: 4, see Table A-1 and A-2.1).

Also in one embodiment, the amino acid sequence of an ISVD binding to human serum albumin may have a sequence identity of more than 90%, such as more than 95% or more than 99%, with SEQ ID NO: 4, wherein optionally the CDRs are as defined in the preceding item D. In some embodiments, the ISVD binding to human serum albumin has the amino acid sequence of SEQ ID NO: 4.

When such an ISVD binding to human serum albumin has 2 or 1 amino acid difference in at least one CDR relative to a corresponding reference CDR sequence (item D above), the ISVD has at least half the binding affinity, at least the same binding affinity, or even higher binding affinity to human serum albumin as construct ALB23002, wherein the binding affinity is measured using the same method, such as SPR.

When such an ISVD binding to human serum albumin has a C-terminal position it exhibits a C-terminal alanine (A) or glycine (0) extension and can be selected from SEQ ID NOs: 52, 53, 55, 57, 58, 59, 60, 61, 62, and 63 (see table A-4 below). In one embodiment, the ISVD binding to human serum albumin has another position than the C-terminal position (i.e. is not the C-terminal ISVD of the polypeptide of the present disclosure) and is selected from SEQ ID NOs: 4, 50, 51, 54, and 56 (see table A-4 below).

5.4 Nucleic Acid Molecules

Also provided is a nucleic acid molecule encoding the polypeptide of the present disclosure.

A "nucleic acid molecule" (used interchangeably with "nucleic acid") is a chain of nucleotide monomers linked to each other via a phosphate backbone to form a nucleotide sequence. A nucleic acid may be used to transform/transfect a host cell or host organism, e.g. for expression and/or production of a polypeptide. Suitable hosts or host cells for production purposes will be clear to the skilled person, and may for example be any suitable fungal, prokaryotic or eukaryotic cell or cell line or any suitable fungal, prokaryotic or eukaryotic organism. A host or host cell comprising a nucleic acid encoding the polypeptide of the present disclosure is also encompassed by the disclosure.

A nucleic acid may be for example DNA, RNA, or a hybrid thereof, and may also comprise (e.g. chemically) modified nucleotides, like PNA. It can be single- or double-stranded DNA. For example, the nucleotide sequences of the present disclosure may be genomic DNA, cDNA.

The nucleic acids of the present disclosure can be prepared or obtained in a manner known per se, and/or can be isolated from a suitable natural source. Nucleotide sequences encoding naturally occurring (poly)peptides can for example be subjected to site-directed mutagenesis, so as to provide a nucleic acid molecule encoding polypeptide with sequence variation. Also, as will be clear to the skilled person, to prepare a nucleic acid, also several nucleotide sequences, such as at least one nucleotide sequence encoding a targeting moiety and for example nucleic acids encoding one or more linkers can be linked together in a suitable manner.

Techniques for generating nucleic acids will be clear to the skilled person and may for instance include, but are not limited to, automated DNA synthesis; site-directed mutagenesis; combining two or more naturally occurring and/or synthetic sequences (or two or more parts thereof), introduction of mutations that lead to the expression of a truncated expression product; introduction of one or more restriction sites (e.g. to create cassettes and/or regions that may easily be digested and/or ligated using suitable restriction enzymes), and/or the introduction of mutations by means of a PCR reaction using one or more "mismatched" primers.

5.5 Vectors

Also provided is a vector comprising the nucleic acid molecule encoding the polypeptide of the present disclosure. A vector as used herein is a vehicle suitable for carrying genetic material into a cell. A vector includes naked nucleic acids, such as plasmids or mRNAs, or nucleic acids embedded into a bigger structure, such as liposomes or viral vectors.

Vectors generally comprise at least one nucleic acid that is optionally linked to one or more regulatory elements, such as for example one or more suitable promoter(s), enhancer(s), terminator(s), etc.). The vector can is an expression vector, i.e. a vector suitable for expressing an encoded polypeptide or construct under suitable conditions, e.g. when the vector is introduced into a (e.g. human) cell. For DNA-based vectors, this usually includes the presence of elements for transcription (e.g. a promoter and a polyA signal) and translation (e.g. Kozak sequence).

In some embodiments, in the vector, said at least one nucleic acid and said regulatory elements are "operably linked" to each other, by which is generally meant that they are in a functional relationship with each other. For instance, a promoter is considered "operably linked" to a coding sequence if said promoter is able to initiate or otherwise control/regulate the transcription and/or the expression of a coding sequence (in which said coding sequence should be understood as being "under the control of" said promotor). Generally, when two nucleotide sequences are operably linked, they will be in the same orientation and usually also in the same reading frame. They will usually also be essentially contiguous, although this may also not be required.

In some embodiments, any regulatory elements of the vector are such that they are capable of providing their intended biological function in the intended host cell or host organism.

For instance, a promoter, enhancer or terminator should be "operable" in the intended host cell or host organism, by which is meant that for example said promoter should be capable of initiating or otherwise controlling/regulating the transcription and/or the expression of a nucleotide sequence—e.g. a coding sequence—to which it is operably linked.

5.6 Compositions

The present disclosure also provides a composition comprising at least one polypeptide of the present disclosure, at least one nucleic acid molecule encoding a polypeptide of the present disclosure or at least one vector comprising such a nucleic acid molecule. The composition may be a pharmaceutical composition. The composition may further comprise at least one pharmaceutically acceptable carrier, diluent or excipient and/or adjuvant, and optionally comprise one or more further pharmaceutically active polypeptides and/or compounds.

5.7 Host Organisms

The disclosure also pertains to host cells or host organisms comprising the polypeptide of the present disclosure, the nucleic acid encoding the polypeptide of the present disclosure, and/or the vector comprising the nucleic acid molecule encoding the polypeptide of the present disclosure.

Suitable host cells or host organisms are clear to the skilled person, and are for example any suitable fungal, prokaryotic or eukaryotic cell or cell line or any suitable fungal, prokaryotic or eukaryotic organism. Specific examples include HEK293 cells, CHO cells, *Escherichia coli* or *Pichia pastoris*. In some embodiments, the host is *Pichia pastoris*.

5.8 Methods and Uses of the Polypepdde

The disclosure also provides a method for producing the polypeptide of the present disclosure. The method may comprise transforming/transfecting a host cell or host organism with a nucleic acid encoding the polypeptide, expressing the polypeptide in the host, optionally followed by one or more isolation and/or purification steps. Specifically, the method may comprise:

a) expressing, in a suitable expression system (e.g., a suitable host cell or host organism or in another expression system), a nucleic acid sequence encoding the polypeptide; optionally followed by:
b) isolating and/or purifying the polypeptide.

Suitable host cells or host organisms for production purposes will be clear to the skilled person, and may for example be any suitable fungal, prokaryotic or eukaryotic cell or cell line or any suitable fungal, prokaryotic or eukaryotic organism. Specific examples include HEK293 cells, CHO cells, *Escherichia coli* or *Pichia pastoris*. In some embodiments, the host is *Pichia pastoris*.

The polypeptide of the present disclosure, a nucleic acid molecule or vector as described, or a composition comprising the polypeptide of the present disclosure, nucleic acid molecule or vector—such as the polypeptide or a composition comprising the same—are useful as a medicament.

Accordingly, the disclosure provides the polypeptide of the present disclosure, a nucleic acid molecule or vector as described, or a composition comprising the polypeptide of the present disclosure, nucleic acid molecule or vector for use as a medicament.

Also provided is the polypeptide of the present disclosure, a nucleic acid molecule or vector as described, or a composition comprising the polypeptide of the present disclosure, nucleic acid molecule or vector for use in the (prophylactic or therapeutic) treatment of an autoimmune and/or an inflammatory disease and/or a fibrotic disease.

Further provided is a (prophylactic and/or therapeutic) method of treating an autoimmune disease and/or an inflammatory and/or a fibrotic disease, wherein said method comprises administering, to a subject in need thereof, a pharmaceutically active amount of the polypeptide of the present disclosure, a nucleic acid molecule or vector as described, or a composition comprising the polypeptide of the present disclosure, nucleic acid molecule or vector.

Further provided is the use of the polypeptide of the present disclosure, a nucleic acid molecule or vector as described, or a composition comprising the polypeptide of the present disclosure, nucleic acid molecule or vector in the preparation of a pharmaceutical composition, such as a pharmaceutical composition for treating an autoimmune disease or an inflammatory disease or a fibrotic disease.

A "subject" as referred to in the context of the present disclosure can be any animal, such as a mammal. Among mammals, a distinction can be made between humans and non-human mammals. Non-human animals may be for example companion animals (e.g. dogs, cats), livestock (e.g. bovine, equine, ovine, caprine, or porcine animals), or animals used generally for research purposes and/or for producing antibodies (e.g. mice, rats, rabbits, cats, dogs, goats, sheep, horses, pigs, non-human primates, such as cynomolgus monkeys, or camelids, such as llama or alpaca).

In the context of prophylactic and/or therapeutic purposes, the subject can be any animal, and more specifically any mammal, such as a human subject.

Substances (including polypeptides, nucleic acid molecules and vectors) or compositions may be administered to a subject by any suitable route of administration, for example by enteral (such as oral or rectal) or parenteral (such as epicutaneous, sublingual, buccal, nasal, intra-articular, intradermal, intramuscular, intraperitoneal, intravenous, subcutaneous, transdermal, or transmucosal) administration. Parenteral administration, such as intramuscular, subcutaneous or intradermal, administration can be used. In some embodiments, subcutaneous administration is used.

An effective amount of a polypeptide, a nucleic acid molecule or vector as described, or a composition comprising the polypeptide, nucleic acid molecule or vector can be administered to a subject in order to provide the intended treatment results.

One or more doses can be administered. If more than one dose is administered, the doses can be administered in suitable intervals in order to maximize the effect of the polypeptide, composition, nucleic acid molecule or vector.

TABLE A-1

Amino acid sequences of the different monovalent $V_{HH}$ building blocks identified within the tetravalent polypeptide F027100187 ("ID" refers to the SEQ ID NO as used herein)

| Name | ID | Amino acid sequence |
|---|---|---|
| 15B07AM (building block 1) | 2 | DVQLVESGGGVVQPGGSLRLSCAASRSIGRYDRMIGW YRHRPGEPRELVATITGSSINYGDSVKGRFTISIDN SKNTVYLQMNSLRPEDTALYYCNFNKYQISRDTWGQG TLVTVSS |
| 4B02/1 (building block 2) | 3 | EVQLVESGGGVVQPGGSLRLSCAASGRTFSSYRMGWF RQAPGKEREFVAALSGDGYSTYTANSVKGRFTISRDN SKNTVILQMNSLRPEDTALYYCAAKLQYVSGWSYDYP YWGQGTLVTVSS |

TABLE A-1-continued

Amino acid sequences of the different monovalent V_HH building blocks identified within the tetravalent polypeptide F027100187 ("ID" refers to the SEQ ID NO as used herein)

| Name | ID | Amino acid sequence |
|---|---|---|
| ALB23002 (building block 3) | 4 | EVQLVESGGGVVQPGGSLRLSCAASGFTFRSFGMSWV RQAPGKGPEWVSSISGSGSDTLYADSVKGRFTISRDN SKNTLYLQMNSLRPEDTALYYCTIGGSLSRSSQGTLV TVSS |
| 4B06/1 (building block 4) | 5 | EVQLVESGGGVVQPGGSLRLSCAASGFTFNNYAMKWV RQAPGKGLEWVSSITTGGGSTDYADSVKGRFTISRDN SKNTLYLQMNSLRPEDTALYYCANVPFGYYSEHFSGL SFDYRGQGTLVTVSSA |

TABLE A-2

Sequences for CDRs according to AbM numbering and frameworks ("ID" refers to the given SEQ ID NO)

| ID | V_HH | ID | FR1 | ID | CDR1 | ID | FR2 | ID | CDR2 | ID | FR3 | ID | CDR3 | ID | FR4 |
|---|---|---|---|---|---|---|---|---|---|---|---|---|---|---|---|
| 2 | 15B07AM | 18 | DVQLVESGGGVVQPGGSLRLSCAAS | 6 | RSIGRYDRMG | 20 | WYRHRPGEPRELVA | 10 | TITGGSSIN | 24 | YGDSVKGRFTISIDNSKNTVYLQMNSLRPEDTALYYCNF | 14 | NKYQISRDT | 28 | WGQGFLVTVSS |
| 3 | 4B02/1 | 19 | EVQLVESGGGVVQPGGSLRLSCAAS | 7 | GRTFSSYRMG | 21 | WFRQAPGKEREFVA | 11 | ALSGDGYSTY | 25 | TANSVKGRFTISRDNSKNTVYLQMNSLRPEDTALYYCAA | 15 | KLQYVSGWSYDYPY | 28 | WGQGFLVTVSS |
| 4 | ALB23002 | 19 | EVQLVESGGGVVQPGGSLRLSCAAS | 8 | GFTFRSFGMS | 22 | WVRQAPGKGPEWVS | 12 | SISGSGSDTL | 26 | YADSVKGRFTISRDNSKNTLYLQMNSLRPEDTALYYCTI | 16 | GGSLSR | 29 | SSQGTLVTVSS |
| 5 | 4B06/1 | 19 | EVQLVESGGGVVQPGGSLRLSCAAS | 9 | GFTFNNYAMK | 23 | WVRQAPGKGLEWVS | 13 | SITTGGGSTD | 27 | YADSVKGRFTISRDNSKNTLYLQMNSLRPEDTALYYCAN | 17 | VPFGYYSEHFSGLSFDY | 30 | RGQGFLVTVSSA |

TABLE A-2.1

Sequences for CDRs according to Kabat numbering and frameworks ("ID" refers to the given SEQ ID NO)

| ID | V_HH | ID | FR1 | ID | CDR1 | ID | FR2 | ID | CDR2 | ID | FR3 | ID | CDR3 | ID | FR4 |
|---|---|---|---|---|---|---|---|---|---|---|---|---|---|---|---|
| 2 | 15B07AM | 39 | DVQLVESGGGVVQPGGSLRLSCAAS | 31 | RSIGRYDRMG | 43 | WYRHRPGEPRELVA | 35 | TITGGSSINYGDSVKG | 46 | RFTISIDNSKNTVYLQMNSLRPEDTALYYCNF | 14 | NKYQISRDT | 28 | WGQGTLVTVSS |
| 3 | 4B02/1 | 40 | EVQLVESGGGVVQPGGSLRLSCAASGRTFS | 32 | SYRMG | 44 | WFRQAPGKEREFVA | 36 | ALSGDGYSTYTANSVKG | 47 | RFTISRDNSKNTVYLQMNSLRPEDTALYYCAA | 15 | KLQYVSGWSYDYPY | 28 | WGQGTLVTVSS |
| 4 | ALB23002 | 41 | EVQLVESGGGVVQPGGSLRLSCAASGFTFR | 33 | SFGMS | 45 | WVRQAPGKGPEWVS | 37 | SISGSGSDTLYADSVKG | 48 | RFTISRDNSKNTLYLQMNSLRPEDTALYYCTI | 16 | GGSLSR | 29 | SSQGTLVTVSS |
| 5 | 4B06/1 | 42 | EVQLVESGGGVVQPGGSLRLSCAASGFTFN | 34 | NYAMK | 45 | WVRQAPGKGLEWVS | 38 | SITTGGGSTDYADSVKG | 49 | RFTISRDNSKNTLYLQMNSLRPEDTALYYCAN | 17 | VPFGYYSEHFSGLSFDY | 30 | RGQGTLVTVSSA |

TABLE A-3

Amino acid sequences of selected multivalent polypeptide
("ID" refers to the given SEQ ID NO)

| Name | ID | Amino acid sequence |
|---|---|---|
| F027100187 | 1 | DVQLVESGGGVVQPGGSLRLSCAASRSIGRYDRMGWYRHRPGEPRELVATTFGGSSINYGDSVKGRFTISID<br>NSKNTVYLQMNSLRPEDTALYYCNFNKYQISRDTWGQGTLVTVSSGGGGSGGGSEVQLVESGGGVVQPGGSL<br>RLSCAASGRTFSSYRMGWFRQAPGKEREFVAALSGDGYSTYTANSVKGRFTISRDNSKNTVYLQMNSLRPED<br>TALYYCAAKLQYVSGWSYDYPYWGQGTLVTVSSGGGGSGGGSEVQLVESGGGVVQPGGSLRLSCAASGFTFR<br>SFGMSWVRQAPGKGPEWVSSISGSGSDTLYADSVKGRFTISRDNSKNTLYLQMNSLRPEDTALYYCTIGGSL<br>SRSSQGTLVTVSSGGGGSGGGSEVQLVESGGGVVQPGGSLRLSCAASGFTFNNYAMKWVRQAPGKGLEWVSS<br>ITTGGGSTDYAPSVKGRFTISRDNSKNTLYLQMNSLRPEDTALYYCANVPFGYYSEHFSGLSEDYRGQGTLV<br>TVSSA |
| F027100186 | 99 | DVQLVESGGGVVQPGGSLRLSCAASRSIGRYDRMGWYRHRPGEPRELVATITGGSSINYGDSVKGRFTISID<br>NSKNTVYLQMNSLRPEDTALYYCNFNKYQISRDTWGQGTLVTVSSGGGGSGGGSEVQLVESGGGVVQPGGSL<br>RLSCAASGRTFSSYRMGWFRQAPGKEREFVAALSGDGYSTYTANSVKGRFTISRDNSKNTVYLQMNSLRPED<br>TALYYCAAKLQYVSGWSYDYPYWGQGTLVTVSSGGGGSGGGSEVQLVESGGGVVQPGGSLRESCAASRSIGR<br>YDRMGWYRHRPGEPRELVATITGGSSINYGDSVKGRFTISIDNSKNTVYLQMNSLRPEDTALYYCNFNKYQI<br>SRDTWGQGTLVTVSSGGGGSGGGSEVQLVESGGGVVQPGGSLRLSCAASGFTFNNYAMKWVRQAPGKGLEWV<br>SSITTGGGSTDYAPSVKGRFTISRDNSKNTLYLQMNSLRPEDTAINYCANVPFGYYSEHFSLSFDYRGQGT<br>LVTVSSGGGGSGGGSEVQLVESGGGVVQPGGSLRLSCAASGFTFRSFGMSWVRQAPGKGPEWVSSISGSGSD<br>TLYADSVKGRFTISRDNSKNTLYLQMNSLRPEDTALYYCTLGGSLSRSSQGTLVTVSSA |
| F027100188 | 100 | DVQLVESGGGVVQPGGSLRLSCAASGRTFSSIYAKGWFRQAPGKEREFVAAISRSGRSTSYADSVKGRFTIS<br>RDNSKNTVYLQMNSLRPEDIALYYCAAVGGATTVTASEWDYWGQGTLVTVSSGGGGSGGGSEVQLNESGGGV<br>VQPGGSLRLSCAASGRTFSSIYAKGWFRQAPGKEREFVAAISRSGRSTSYADSVKGRFTISRDNSKNTVYLQ<br>MNSLRPEDTALYYCAAVGGATTVTASEWDYWGQGTLVTVSSGGGGSGGGSEVQLNESGGGVVQPGGSLRLSC<br>AASGRTFSSYRMGWFRQAPGKEREFVAALSGDGYSTYTANSVKGRFTISRDNSKNTVYLQMNSLRPEIDTAL<br>YYCAAKLQYVSGWSYDYPYWGQGTLVTVSSGGGGSGGGSEVQLVESGGGVVQPGGSLRLSCAASGFTFRSFG<br>MSWVRQAPGKGPEWVSSISGSGSDTLYADSVKGRETISRDNSKNTIALQMNSLRPEDTALICYCTIGGSLSR<br>SSQGTINTVSSGGGGSGGGSEVQLVESGGGVVQPGGSLRLSCAASGFTFNNYAMKWVRQAPGKGLEWVSSIT<br>TGGGSTDYADSVKGRFTISRDNSKNTLYLQMNSLRPEDTALYYCANVPFGYYSEFIFSGLSFDYRGQGTLVT<br>VSSA |

TABLE A-4

Serum albumin binding ISVD sequences ("ID" refers to the SEQ ID NO as used herein)

| Name | ID | Amino acid sequence |
|---|---|---|
| Alb8 | 50 | EVQLVESGGGLVQPGNSLRLSCAASGFTFSSFGMS<br>WVRQAPGKGLEWVSSISGSGSDTLYADSVKGRFTI<br>SRDNAKTTLYLQMNSLRPEDTAVYYCTIGGSLSRS<br>SQGTLVTVSS |
| Alb23 | 51 | EVQLLESGGGLVQPGGSLRLSCAASGFTERSFGMS<br>WVRQAPGKGPEWVSSISGSGSDTLYADSVKGRFTI<br>SRDNSKNTLYLQMNSLRPEDTAVYYCTIGGSLSRS<br>SQGTLVTVSS |
| Alb129 | 52 | EVQLVESGGGVVQPGNSLRLSCAASGFTFSSFGMS<br>WVRQAPGKGLEWVSSISGSGSDTLYADSVKGRFTI<br>SRDNAKTTLYLQMNSLRPEDTATYYCTIGGSLSRS<br>SQGTLVTVSSA |
| Alb132 | 53 | EVQINESGGGVVQPGGSLRLSCAASQFTFRSFGMS<br>WVRQAPGKGPEWVSSISGSGSDTLYADSVKGRFTI<br>SRDNSKNTLYLQMNSLRPEDTATYYCTIGGSLSRS<br>SQGTLVTVSSA |
| Alb11 | 54 | EVQLVESGGGLVQPGNSLRLSCAASGFIFSSFGMS<br>WVRQAPGKGLEWVSSISGSGSDTLYADSVKGRFTI<br>SRDNAKTTLYLQMNSLRPEDTAVYYCTIGGSLSRS<br>SQGTLVTVSS |
| Alb11<br>(S112K)-<br>A | 55 | EVQLVESGGGLVQPGNSLRLSCAASGPTFSSFGMS<br>WVRQAPGKGLEWVSSISGSGSDTLYADSVKGRFTI<br>SRDNAKTTLYLQMNSLRPEDTAVYYCTIGGSLSRS<br>SQGTLVKVSSA |
| Alb82 | 56 | EVQLVESGGGVVQPGNSLRLSCAASGFTFSSFGMS<br>WVRQAPGKGLEWVSSISGSGSDTLYADSVKGRFTI<br>SRDNAKTTLYLQMNSLRPEDTALYYCTIGGSLSRS<br>SQGTLVTVSS |
| Alb82-A | 57 | EVQLVESGGGVVQPGNSLRLSCAASGFTFSSFGMS<br>WVRQAPGKGLEWVSSISGSGSDTLYADSVKGRFTI<br>SRDNAKTTLYLQMNSLRPEDTALYYCTIGGSLSRS<br>SQGTLVTVSSA |
| Alb82-AA | 58 | EVQLVESGGGVVQPGNSLRLSCAASGFTFSSFGMS<br>WVRQAPGKGLEWVSSISGSGSDTLYADSVKGRVTI<br>SRDNAKTTLYLQMNSLRPEDTALYYCTIGGSISRS<br>SQGTLVTVSSAA |
| AlB82-<br>AAA | 59 | EVQLVESGGGVVQPGNSLRLSCAASGFIFSSFGMS<br>WVRQAPGKGLEWVSSISGSGSDTLYADSVKGRFTI<br>SRDNAKTTLYLQMNSLRPEDTALYYCTIGGSLSRS<br>SQGTLNTVSSAAA |
| Alb82-G | 60 | EVQLVESGGGVVQPGNSLRLSCAASGFTFSSFGMS<br>WVRQAPGKGLEWVSSISGSGSDTLYADSVKGRFTI<br>SRDNAKTTLYLQMNSLRPEDTALYYCTIGGSLSRS<br>SQGTLVTVSSG |
| Alb82-GG | 61 | EVQLVESGGGVVQPGNSLRLSCAASGETFSSFGMS<br>WVRQAPGKGLEWVSSISGSGSDTLYADSVKGRETI<br>SRDNAKTTLYLQMNSLRPEDTALYYCTIGGSLSRS<br>SQGTLVTVSSGG |
| Alb82-<br>GGG | 62 | EVQLVESGGGVVQPGNSIRLSCAASGFTFSSFGMS<br>WVRQAPGKGLEWVSSISGSGSDTLYADSVKGRETI<br>SRDNAKTTLYLQMNSLRPEDTALNYCTIGGSLSRS<br>SQGTLVTVSSGGG |
| Alb23002 | 4 | EVQLVESGGGVVQPGGSLRLSCAASGFTFRSFGMS<br>WVRQAPQKGPEWVSSISGSGSDTLYADSVKGRFTI<br>SRDNSKNTLYLQMNSLRPEDTALYYCTIGGSISRS<br>SQGTLVTVSS |

TABLE A-4-continued

Serum albumin binding ISVD sequences ("ID" refers to the SEQ ID NO as used herein)

| Name | ID | Amino acid sequence |
|---|---|---|
| Alb223 | 63 | EVQLVESGGGVVQPGGSLRLSCAASGFTFRSFGMS WVRQAPGKGPEWVSSISGSGSDTLYADSVKGRETI SRDNSKNTLYLQMNSLRPEDTALYYCTIGGSLSRS SQGTLVTVSSA |

TABLE A-5

Linker sequences ("ID" refers to the SEQ ID NO as used herein)

| Name | ID | Amino acid sequence |
|---|---|---|
| 3A linker | 64 | AAA |
| 5GS linker | 65 | GGGGS |
| 7GS linker | 66 | SGGSGGS |
| 8GS linker | 67 | GGGGSGGS |
| 9GS linker | 68 | GGGGSGGGS |
| 10GS linker | 69 | GGGGSGGGGS |
| 15GS linker | 70 | GGGGSGGGGSGGGGS |
| 18GS linker | 71 | GGGGSGGGGSGGGGSGGS |
| 20GS linker | 72 | GGGGSGGGGSGGGGSGGGGS |
| 25GS linker | 73 | GGGGSGGGGSGGGGSGGGGSGGGGS |
| 30GS linker | 74 | GGGGSGGGGSGGGGSGGGGSGGGGSGGGGS |
| 35GS linker | 75 | GGGGSGGGGSGGGGSGGGGSGGGGSGGGGSGGGGS |
| 40GS linker | 76 | GGGGSGGGGSGGGGSGGGGSGGGGSGGGGSGGGGSGGGGS |
| G1 hinge | 77 | EPKSCDKTHTCPPCP |
| 9GS-G1 hinge | 78 | GGGGSGGGSEPKSCDKTHTCPPCP |
| Llama upper long hinge region | 79 | EPKTPKPQPAAA |
| G3 hinge | 80 | ELKTPLGDTFHTCPRCPEPKSCDTPPPCPRCPEPKSCDTPPPCPRCPEPKSCDTPPPCRCP |

6 EXAMPLES

6.1 Example 1: Multispecific ISVD Construct Generation

Identification of ISVD-containing polypeptide F027100187 (SEQ ID NO:1) resulted from a data-driven bispecific engineering and formatting campaign in which anti-OX40L building blocks (OX40L01E07, OX40L01B11 and OX40L15B07, described in WO2011073180 as SEQ ID NOs: 181, 180, and 179, respectively), anti-IL-13 building blocks (F0107003D12, F0107009F07, F0107009G09, F0107004B02, F0107004B06 and F0107007C10) and anti-HSA $V_{HH}$ building block ALB23002 (described in WO2017085172 as SEQ ID NO: 10) were included. Different positions/orientations/valences of the building blocks and different linker lengths (9GS vs 20GS vs 35GS) were applied and proofed to be critical for different parameters (potency, cross-reactivity, expression, etc.). Potency in this Example refers to the inhibition of IL-13 induced eotaxin release assay in vitro and the inhibition of OX40L induced co-stimulation of T cells in vitro as assayed in Examples 6 and 7, respectively.

A panel comprising 123 constructs was transformed in *Pichia Pastoris* for small scale productions. Induction of ISVD construct expression occurred by stepwise addition of methanol. Clarified medium with secreted ISVD construct was used as starting material for purification via Protein A affinity chromatography followed by desalting. The purified samples were used for functional characterisation and expression evaluation.

Some constructs showed impaired potencies and expression levels depending on valency, linker length, the ISVD building block used, and the relative position of ISVD building blocks. In general, the pentavalent ISVD constructs showed low expression levels, except for some ISVDs with C-terminal positioned bivalent anti-OX40L building blocks OX40L01E07 (hereinafter "1E07"). However, C-terminal positioned 1E07 showed insufficient potency for OX40L. Reducing the valency by using a monovalent OX40L arm improved expression levels but resulted again in insufficient potency for OX40L. Thus, the particular composition (valency, orientation of building blocks and usage of linker lengths) was found to be important for potency and sufficient expression levels.

In order to generate a potent monovalent OX40L target arm to incorporate in a tetravalent multispecific ISVD construct, OX40L building blocks OX40L015B07 (hereinafter "15B07") and OX40L001B11 (hereinafter "1B11") were subjected to affinity maturation.

For each ($V_{HH}$) building block a pooled single site saturation library of all CDR positions was constructed for each CDR. Each single site saturation library was constructed using primers that are designed according to the 22c-trick approach (Kille et al. ACS Synth. Biol., 2013, 2 (2), pp 83-92). Surface plasmon resonance spectroscopy (SPR)-based off-rate screening on immobilized human and cyno OX40L was performed to identify individual mutations that result in an improved binding.

In the second step a combinatorial library was constructed comprising beneficial mutations identified in the first step. Again, off-rate screening on human and cyno OX40L was performed to identify Via variants with further improved binding. These variants were then purified for biophysical characterization affinity determination via SPR and functional characterization in the PBMC activity assay (as described in Example 7) to select the final affinity maturation variant. Characteristics of the affinity matured variants of ISVDs OX40L015B07 and OX40L001B11 are listed in Table 1.

TABLE 1

Summary of the properties of the final affinity maturation variants 15B07AM and 01B11AM compared to the parental versions OX40L015B07 (15B07) and OX40L001B11 (01B11) respectively.

| ISVD ID | Changes vs parental | KD (M) huOX40L/ cyOX40L | Fold improved affinity vs parental | IC50 (nM) PBMC assay human OX40L | IC50 (nM) PBMC assay cyno OX40L | Gap human-cyno OX40L |
|---|---|---|---|---|---|---|
| F027300042 (15B07) | NA | 4.52E-09/ 9.92E-09 | NA | 150 | ~368 | ~2.45 |
| F027301552 (15B07AM) | L31Y-T99I-V98Q | 8.53E-11/ 1.08E-10 | 53/92 | 1.78 | 7.58 | 4.3 |
| F02730041 (1B11) | NA | 6.20E-10/ 4.30E-10 | NA | 39.7 | 244 | 6.1 |
| F027301969 (1B11AM) | S59Y-Q100fI-L100hG | 2.00E-10/ 1.90E-10 | 3.1/2.7 | 14.5 | 35.6 | 2.5 |

By making use of affinity matured versions of the monovalent OX40L building blocks 15B07 and 1B11 potent and well expressing tetravalent multispecific ISVD contracts could be obtained.

The presence of an affinity matured monovalent 15B07 building block (15B07AM) in tetravalent multispecific ISVD constructs provided a 20-fold better potency in the OX40L-driven PBMC activity assay (as described in Example 7) as compared to the non-affinity matured counterpart (15B07) (Table 3).

Moreover, the N-terminal position of the 15B07AM building block in the tetravalent multispecific ISVD construct was critical. Comparison of constructs F-027100172 and F-027100179 in Table 4 shows a 10-fold better potency in case the 15B07AM building block is at the N-terminal position versus the C-terminal position.

The presence of the N-terminal 15B07AM building block in the F-027100187 (SEQ ID NO: 1) tetravalent multispecific ISVD was beneficial for CMC properties (i.e. expression and solubility) as compared to pentavalent constructs which merely suffered from low expression yields. As exemplified in Table 2, the three multispecific ISVD constructs F027100186 (SEQ ID NO: 99) (pentavalent), F027100187 (SEQ ID NO: 1) (tetravalent) and F027100188 (SEQ ID NO: 100) (pentavalent), exhibited a largely different initial CMC (Chemistry Manufacturing and Control) profile. Upon 5L fermentation the ISVD construct F027100187 (SEQ ID NO: 1) reached a titer of 4 g/l which is more than 2-fold higher than for pentavalent ISVD constructs F027100186 (SEQ ID NO: 99) and F027100188 (SEQ ID NO: 100) and also exhibited superior solubility.

In order to allow sufficient space between the two IL13 building blocks for optimal potency on IL-13 and in order to avoid presence of a long 35GS linker in the F027100187 tetravalent multispecific ISVD construct, both IL13 building blocks were linked via 9GS-ALB-9GS entity.

Finally, the ISVD construct F027100187 was selected based on the overall good potencies on IL-13 and OX40L and superior expression levels and CMC characteristics.

TABLE 2

Expression yields and solubility of pentavalent ISVDs F027100186 (SEQ ID NO: 99) and F027100188 (SEQ ID NO: 100), and tetravalent ISVD F027100187 (SEQ ID NO: 1).

| ISVD ID | BB1 | linker 1 | BB2 | linker 2 | BB3 | linker 3 | BB4 | linker 4 | BB5 | Expression yield 5 ml culture (µg/ml) | Expression yield 5 L fermentor (g/L) | solubility (mg/ml) |
|---|---|---|---|---|---|---|---|---|---|---|---|---|
| F027100186 | 15B07 | 9GS | 4B02/1 | 9GS | 15B07 | 9GS | 4B06/01 | 9GS | ALB | 92 | 1.5 | nt |
| F027100187 | 15B07AM | 9GS | 4B02/1 | 9GS | ALB | 9GS | 4B06/01 | | | 194 | 4.0 | 150 |
| F027100188 | 1E07 | 9GS | 1E07 | 9GS | 4B02/1 | 9GS | ALB | 9GS | 4B06/01 | 109 | 1.7 | <25 |

ALB = ALB23002, BB = building block.

TABLE 3

IC50 values of ISVD constructs mediated neutralization of human OX40L induced IL-2 release in PBMC assay

| ISVD ID | BB1 | linker 1 | BB2 | linker 2 | BB3 | linker 3 | BB4 | PBMC activity assay IC50 (M) |
|---|---|---|---|---|---|---|---|---|
| F027100057 | 15B07 | 9GS | ALB | 9GS | 3D12 | 35GS | 9G09 | 59.9E-09 |
| F027100060 | 15B07 | 9GS | ALB | 9GS | 4B02/1 | 35GS | 3D12 | 47.7E-09 |
| F027100172 | 15B07AM | 9GS | 3D12 | 9GS | ALB | 9GS | 9G09 | 2.5E-09 |

TABLE 4

IC50 values of ISVD constructs mediated neutralization of
human OX40L induced IL-2 release in PBMC assay

| ISVD ID | BB1 | linker 1 | BB2 | linker 2 | BB3 | linker 3 | BB4 | PBMC activity assay IC50 (M) |
|---|---|---|---|---|---|---|---|---|
| F027100172 | 15B07AM | 9GS | 3D12 | 9GS | ALB | 9GS | 9G09 | 2.5E−09 |
| F027100179 | 3D12 | 9GS | ALB | 9GS | 9G09 | 9GS | 15B07 | 26.3E−09 |

6.2 Example 2: Multispecific ISVD Construct Binding Affinity to OX40L, IL-13 and Serum Albumin The affinity, expressed as the equilibrium dissociation constant ($K_D$), of F027100187 towards human, cynomolgus monkey (cyno) and rhesus IL-13, towards human and cyno OX40L, and human, cyno and mouse serum albumin was quantified by means of in-solution affinity measurements on a Gyrolab xP Workstation (Gyros).

Under $K_D$-controlled measurements a serial dilution of OX40L (ranging from 1.3 μM-0.008 μM), IL-13 (ranging from 0.1 μM-0.25 fM), or serum albumin (ranging from 100 μM-3.2 μM) and a fixed amount of ISVD construct F027100187 (10 μM in case of OX40L, 5 μM in case of IL-13, 100 μM in case of HSA and cyno SA and 30 nM in case of mouse SA) were mixed to allow interaction and incubated for either 24 or 48 hours (in case of OX40L and IL-13) or 2 hours (in case of serum albumin) to reach equilibrium.

Under receptor-controlled measurements a serial dilution of OX40L (ranging from 1.3 μM-0.031 μM), IL-13 (ranging from 0.1 μM-0.25 fM), or serum albumin (ranging from 100 μM-3.2 μM) and a fixed amount of ISVD construct F027100187 (5 nM in case of OX40L, 250 μM in case of IL-13 and 30 nM in case of HSA and cyno SA) were mixed to allow interaction and incubated for either 24 or 48 hours (in case of OX40L and IL-13) or 2 hours (in case of serum albumin) to reach equilibrium.

Biotinylated human OX40L/IL-13/serum albumin was captured in the microstructures of a Gyrolab Bioaffy 1000 CD, which contains columns of beads and was used as a molecular probe to capture free F027100187 from the equilibrated solution. The mixture of OX40L/IL13/serum albumin and F027100187 (containing free OX40UIL-13/serum albumin, free F027100187 and OX40L/IL13/serum albumin—F027100187 complexes) was allowed to flow through the beads, and a small percentage of free F027100187 was captured, which is proportional to the free ISVD construct concentration. A fluorescently labeled anti-ISVD antibody, ABH0086-Alexa647, was then injected to label any captured F027100187 and after rinsing away excess of fluorescent probe, the change in fluorescence was determined. Fitting of the dilution series was done using Gyrolab Analysis software, where KD- and receptor-controlled curves were analyzed to determine the KD value. The results (Table 5) demonstrate that the multispecific ISVD construct binds human/cyno OX40L and human/cyno/rhesus IL-13 with high affinity.

TABLE 5

Binding affinities of F027100187 to human, rhesus and cyno IL-13; human and cyno OX40L; and human, cyno and mouse serum albumin (sequences of cyno and rhesus OX40L and sequences of cyno and rhesus albumin are identical)

| | human | | cynomolgus monkey | | rhesus monkey | | |
|---|---|---|---|---|---|---|---|
| Antigen | $K_D$ (pM) | 95% CI (pM) | $K_D$ (pM) | 95% CI (pM) | $K_D$ (pM) | 95% CI (pM) | Incubation time (h) |
| O40XL | 125 | 108-141 | 196 | 174-218 | | | 24 |
| | 109 | 98-120 | 275 | 225-326 | | | 48 |
| | 77.8 | 64.7-91.0 | 128 | 101-156 | | | 24 |
| IL-13 | 7.8 | 6.4-9.1 | 6.7 | 5.8-7.5 | 29.3 | 9.0-49.5 | 48 |
| | 5.3 | 3.4-7.1 | 11.7 | 9.5-13.9 | 14.1 | 6.3-49.5 | 48 |
| | 7.6 | 3.8-11.5 | 8.2 | 7.0-9.3 | 23.2 | 6.8-39.6 | 48 |
| | | | 5.9 | 4.7-7.1 | | | 48 |

| | human | | cynomolgus monkey | | mouse | | |
|---|---|---|---|---|---|---|---|
| Antigen | $K_D$ (nM) | 95% CI (nM) | $K_D$ (nM) | 95% CI (nM) | $K_D$ (nM) | 95% CI (nM) | Incubation time (h) |
| SA | 8.3 | 7.7-9.0 | 10.2 | 9.7-10.7 | 109 | 101-117 | 2 |
| | 6.6 | 5.5-7.6 | 10.6 | 9.0-12.3 | | | 2 |
| | 7.8 | 6.7-8.9 | 9.6 | 8.3-10.9 | | | 2 |

6.3 Example 3: Multispecific ISVD Construct Binding to Membrane Bound OX40L

Binding of F027100187 to membrane bound human and cyno OX40L was demonstrated using flow cytometry on CHO-KI cells expressing human or cyno OX40L. Briefly, cells were fixed with 4% paraformaldehyde and 0.1% Glutaraldehyde in PBS, seeded at a density of $1\times10^4$ cells/well and incubated with a dilution series of ISVD F027100187 or reference compound anti-hOX40L mAb, named Comparator 3, starting from 100 nM up to 0.5 µM, for 48 hours at room temperature. Comparator 3 is a standard conventional monoclonal antibody directed against human OX40L, which is used as a reference throughout the Examples 1 to 12 described herein. Cells were washed 3 times and subsequently incubated with an anti-$V_{HH}$ mAb (ABH00119) for 30 min at 4° C., washed again, and incubated for 30 min at 4° C. with a goat anti-mouse PE or FITC labeled antibody. Samples were washed and resuspended in FACS Buffer (D-PBS with 10% FBS and 0.05% sodium azide supplemented with 5 nM TOPRO3). Cell suspensions were then analyzed on an iQuescreener. EC50 values were calculated using GraphPad Prism. Binding affinities of F0271000187 and anti-hOX40L reference mAb Comparator 3 are shown in Table 6.

TABLE 6

Binding affinity of F027100187 to membrane expressed human and cyno OX40L after a 48 h incubation compared to reference compound anti-hOX40L mAb Comparator 3.

| Analyte | human OX40L EC50 (M) | cyno OX40L EC50 (M) |
| --- | --- | --- |
| F027100187 | 2.354E-11 | 3.632E-11 |
| Comparator 3 | 9.934E-11 | 9.587E-11 |

6.4 Example 4: Multispecific ISVD Construct Binds Selectively to OX40L and IL-13

Absence of binding to OX40L and IL-13 related human cytokines was assessed via SPR (Proteon XPR36). As IL-13 related cytokine, IL-4 was assessed. As OX40L related targets, human TRAIL, CD30L, CD40L and RANKL were assessed.

To this end, the cytokines were immobilized on a ProteOn GLC sensor chip at 25 µg/mL for 600 s using amine coupling, with 80 seconds injection of EDC/NHS for activation and a 150-seconds injection of 1 M Ethanolamine HCl for deactivation (ProteOn Amine Coupling Kit. cat. 176-2410). Flow rate during activation and deactivation was set to 30 µl/min, and during ligand injection to 25 µl/min. The pH of the 10 mM acetate immobilization buffer was 6.0 for all cytokines, except for RANKL where the pH was 5.0.

Next, 1 µM of F027100187 was injected for 2 minutes and allowed to dissociate for 600 s at a flow rate of 45 µL/min. As running buffer PBS (pH7.4)+0.005% Tween 20 was used. As positive controls, 100 nM α-hIL-4, α-hTRAIL, α-hCD30L, α-hCD40L Ab and α-hRANKL $V_{HH}$ (Nanobody®, Nb) were injected. Interaction between F027100187 and the positive controls with the immobilized targets was measured by detection of increases in refractory index which occurs as a result of mass changes on the chip upon binding.

All positive controls did bind to their respective target. No binding was detected of ISVD construct F027100187 to human IL-4, TRAIL, CD30L, CD40L and RANKL.

6.5 Example 5: Simultaneous Binding of Multispecific ISVD to IL-13, OX40L and HSA Using flow cytometry, it was determined whether ISVD construct F0271000187 can bind simultaneously to recombinant soluble hIL-13 and cell membrane bound hOX40L. To this end, CHO-KI cells expressing human OX40L were seeded at a density of 5×10W cells/well and incubated with 100 nM ISVD construct F027100187 for 90 minutes at 4° C. Subsequently the mixture was incubated with a dilution series of biotinylated IL-13 starting from 500 nM down to 7.6 µM, and incubated for 30 min at 4° C., in the presence of 30 µM HSA. Cells were washed 3 times and subsequently incubated with PE-labelled anti-streptavidin for 30 min at 4° C., washed again. Samples were washed and resuspended in FACS Buffer (D-PBS with 10% FBS and 0.05% sodium azide supplemented with 5 nM TOPRO3). Cell suspensions were then analyzed on a iQuescreener. The dose-response curve (FIG. 1) demonstrated that that ISVD construct F027100187 can bind membrane bound hOX40L and soluble hIL-13 simultaneously in the presence of HAS, whereas the negative control $V_{HH}$, IRR0096, cannot bind.

6.6 Example 6: In Vitro Inhibition by Multispecific ISVD of IL-13 Induced Eotaxin Release Functional activity of soluble IL-13 from the different species of interest (human, rhesus and cynomolgus monkey) and inhibition thereof by F027100187 was studied using a cell based assay investigating eotaxin release by A549 human lung carcinoma cells.

To this end, A549 suspension cells were cultured in Ham's F12K, supplemented with 10% FCS, and seeded into a 96 well plate at 400.000 cells/well. After 24 hours incubation, a dilution series of F027100187 or reference compounds (anti-hIL-13 reference mAbs Comparator 1 and Comparator 2) were added. Comparators 1 and 2 are both standard conventional monoclonal antibodies directed against human IL-13, which are used as references throughout the Examples 1 to 12 described herein. After 20 min incubation, IL-13 (human IL13 (Sino Biological cat nr 10369-HNAC), cyno IL13 (Sino Biological cat nr 11057-CNAH) or rhesus IL13 (R&D Systems, cat nr 2674-RM-025) is added to a final concentration of 160 µM. After further incubation for 24 hours in the presence of 30 µM HSA, heparin is added at a final concentration of 50 µg/ml, to enhance the eotaxin expression. After an additional 4 hours of incubation, eotaxin-3, secreted in the cell supernatant was quantified by use of the Human CCL26/Eotaxin-3 DuoSet ELISA (R&D systems, DY346).

F027100187 inhibited human, cyno and rhesus IL-13-induced eotaxin-3 release in a concentration-dependent manner with an IC50 of 259 µM (for human IL-13), 1940 µM (for cyno IL-13) and 858 µM (for rhesus IL-13) (Table 7, FIG. 2).

TABLE 7

IC$_{50}$ values of F027100187 mediated neutralization of human, cyno and rhesus IL-13 in the eotaxin release assay versus the reference compounds anti-hIL-13 reference mAbs Comparator 1 and Comparator 2.

| Antigen | F027100187 | | | anti-hIL-13 reference mAb Comparator 1 | | | anti-hIL-13 reference mAb Comparator 2 | | |
|---|---|---|---|---|---|---|---|---|---|
| | Human IL-13 | Cyno IL-13 | Rhesus IL-13 | Human IL-13 | Cyno IL-13 | Rhesus IL-13 | Human IL-13 | Cyno IL-13 | Rhesus IL-13 |
| eotaxin release assay (IC50, pM) | 259 | 1940 | 858 | 48 | 250 | 107 | 686 | 10400 | 4680 |

6.7 Example 7: In Vitro Inhibition by Multispecific ISVD Construct of OX40L Induced Co-Stimulation of T-Cells Functional activity of human and cyno OX40L and inhibition thereof by ISVD construct F027100187 was studied using a cell-based assay, investigating OX40L induced co-stimulation of T-cells (PBMC activity assay). The assay was performed by co-culturing buffy coat derived PBMC (at a density of $1\times10^5$ cells/well) in the presence of suboptimal concentration of PHA-L (to induce OX40 expression) with CHO-KI cells overexpressing OX40L (at a density of $1\times10^4$ cells/well) in transparent 96-well plates. A dilution series of ISVD construct F027100187 or reference compound anti-hOX40L mAb, named Comparator 3, was added to the co-culture and incubated in the presence of 30 μM HSA for 22 hours at 37° C. in a humidified incubator. Readout was performed by evaluating IL-2 levels in the supernatant of these cells using ELISA.

ISVD construct F027100187 inhibited human and cyno OX40L-induced T-cell activation in a concentration-dependent manner with an IC50 of 1.9 nM (for human OX40L) and 14 nM (for cyno OX40L) comparable to reference compound anti-hOX40L mAb Comparator 3 (Table 8, FIG. 3).

TABLE 8

IC50 values of ISVD construct F0271000187 mediated neutralization of human and cyno OX40L in the PBMC activity assay versus the reference compound anti-hOX40L mAb Comparator 3.

| Antigen | F027100187 | | Comparator 3 | |
|---|---|---|---|---|
| | Human OX40L | Cyno OX40L | Human OX40L | Cyno OX40L |
| PBMC activity assay IC50 (M) | 1.9E-09 | 1.4E-08 | 9.9E-10 | 1.4E-08 |

6.8 Example 8: Multispecific ISVD Construct Binding to Pre-Existing Antibodies The binding of pre-existing antibodies, that are present in 96 serum samples from healthy volunteers, to ISVD construct F027100187 was determined using the ProteOn XPR36 (Bio-Rad Laboratories, Inc.). PBS/Tween (phosphate buffered saline, pH7.4, 0.005% Tween20) was used as running buffer and the experiments were performed at 25° C.

ISVD constructs were captured on the chip via binding of the ALB23002 building block to HSA, which is immobilized on the chip. To immobilize HSA, the ligand lanes of a ProteOn GLC Sensor Chip were activated with EDC/NHS (flow rate 30 μl/min) and HSA was injected at 100 μl/ml in ProteOn Acetate buffer pH4.5 to render immobilization levels of approximately 2600 RU. After immobilization, surfaces were deactivated with ethanolamine HCl (flow rate 30 μl/min).

Subsequently, ISVD constructs were injected for 2 min at 45 μl/min over the HSA surface to render an ISVD capture level of approximately 800 RU. The samples containing pre-existing antibodies were centrifuged for 2 minutes at 14,000 rpm and supernatant was diluted 1:10 in PBS-Tween20 (0.005%) before being injected for 2 minutes at 45 μl/min followed by a subsequent 400 seconds dissociation step. After each cycle (i.e., before a new ISVD capture and blood sample injection step) the HSA surfaces were regenerated with a 2-minute injection of HCl (100 mM) at 45 μl/min. Sensorgrams showing pre-existing antibody binding were obtained after double referencing by subtracting 1) ISVD-HSA dissociation and 2) non-specific binding to reference ligand lane. Binding levels of pre-existing antibodies were determined by setting report points at 125 seconds (5 seconds after end of association). Percentage reduction in pre-existing antibody binding was calculated relative to the binding levels at 125 seconds of a reference ISVD construct.

The tetravalent ISVD construct F027100187, optimized for reduced pre-existing antibody binding by introduction of mutations L11V and V89L in each building block and a C-terminal alanine, shows substantially less binding to pre-existing antibodies compared to a 5 control non-optimized pentavalent ISVD F027301186 (FIG. 4).

6.9 Example 9: Inhibition of OX40L and IL-13 by Multispecific ISVD Construct F027100187 Reduces IL-5 and CCL26 Levels in a Triculture System In order to test the physiological effects of OX40L blockade on T cell activation, PBMC from healthy blood donors, that were responsive to Der P, were co-cultured with MRC5 (fibroblast) and A549 (epithelial) cells. Mixing these cells provide additional activation driving a type 2 immune response by inducing IL-5 and IL-13 production. IL-13 triggers CCL26 production by local epithelial cells, leading to the ramification of type 2 immune response mediated inflammatory diseases and beyond. In addition, recapitulate of these cell types are found in tissues of interest (skin and lung). T cell response is monitored by means of cytokine measurement in the supernatant 7 days after mixing the cells.

Methods:

$7.5\times10^4$ MRC5 and $7.5\times10^4$ A549 cells in 500 μl AIM V CTS media with Serum Replacement CTS (assay media)

were added to each well in a 24-well plate and incubated overnight. Then, 100 µl of ISVD construct F02710018, anti-OX40L reference mAb Comparator 3, or anti-hIL-13 reference mAb Comparator 1 was added in assay media for 15 min. Afterwards, 1.2×106 thawed and rested allergic PBMCs was added in 200 µl assay media, followed by the addition of 200 µl of low endotoxin Der P from spent culture. The culture was incubated for 7 days before IL-5 and CCL26 in the culture supernatant was analyzed by Luminex, assayed in duplicate. Summary of 4 donors shown.

Results:

The collective results of the inhibition responses of F027100187 and benchmark antibodies, and anti-hOX40L mAb Comparator 3 and reference anti-hIL-13 mAb Comparator 1 are shown in Table 9 and Table 10, and FIG. 5 and FIG. 6.

In conclusion, these results demonstrate that ISVD F027100187 is equivalent to anti-hOX40L reference mAb, i.e. Comparator 3, and almost equivalent to anti-hIL-13 reference mAb, i.e. Comparator 1, by its ability to block two cytokines/chemokines (IL-5 and CCL26) in a complex assay system comprising human PBMCs co-cultured with tissue structural cells, highlighting its therapeutic potential for the treatment of type 2 inflammatory diseases such as asthma and atopic dermatitis, as well as a broad range of immunological disease indications.

TABLE 9

IL-5 Mean IC50 Results.

| Compound | IL-5 IC50 (nM) |
| --- | --- |
| F027100187 | 1 |
| Comparator 3 | 2.3 |
| Comparator 1 | NA |

TABLE 10

CCL26 Mean IC50 Results.

| Compound | CCL26 IC50 (pM) |
| --- | --- |
| F027100187 | 40.7 |
| Comparator 1 | 7.56 |
| Comparator 3 | NA |

6.10 Example 10: NSG Human Humanized Mouse Model to Evaluate F027100187 Mediated Target Occupancy and Pharmacodynamics In Vivo F027100187 targets both human OX40L and IL-13 and does not cross react with the murine orthologs. Hence, to evaluate the biological activities of F027100187, a xenografted, humanized model system was used. Female NSG (NOD.Cg-Prkdcscid Il2rgtm1Wjl/SzJ) were obtained from Jackson labs, Bar Harbor, ME, USA. These mice express human hematopoietic cytokines: stem cell factor (SCF), granulocyte/macrophage stimulating factor (GM-CSF), and interleukin-3 (IL-3), all driven by a human cytomegalovirus promoter/enhancer sequence. The triple transgenic mouse produces above cytokines constitutively, providing cell proliferation and survival signals, supporting the stable engraftment of CD33+ myeloid lineages, and several types of lymphoid cells.

Briefly, the protocol followed for engraftment is as follows: On day 0 of the study, mice were engrafted with 5×106 Der P sensitive peripheral blood mononuclear cells (PBMCs) by the intravenous (IV) route in 200 µl of Dulbecco's phosphate buffered saline (DPBS). Mice were challenged intranasally with 25 µg in 40 µl of House Dust Mite (HDM) extract (Greer lab Cat #XPB70-X29) on days 1, 2, 3, 6, 7, 8, 9, and 10 days of the study. Mice that were challenged with HDM received subcutaneous doses of either vehicle or F27100187 (11.1, 3.72, 1.11, or 0.37 mg/kg) on days 1, 3, 6, 8, 10, and 13. On day 20, mice were anesthetized by isoflurane anesthesia. While under isoflurane anesthesia, blood was collected by retro-orbital bleeds. Following blood collection and while still under isoflurane anesthesia, the mice were terminated by cervical dislocation. A portion of the lung was harvested and placed in media for human cell phenotyping (flow cytometry). Plasma levels of human cytokines and chemokines from the day 20 plasma samples were determined by Lumenix evaluation (Cat #HSTCMAG28SPMX13, Milliplex). Plasma levels of human igE from the day 20 plasma samples were determined by ELISA (Cat #BMS2097, Invitrogen).

The results of these experiments as shown in FIG. 7 and FIG. 8 demonstrate that F027100187 was able to significantly inhibit human T and B-cell expansion NSG mice. FIG. 9 and FIG. 10 demonstrate that F027100187 was able to significantly inhibit key type cytokines (IL-2, IL-4, IL-5, and IL-10) and IgE production. Collectively, these results demonstrate the in vivo efficacy of F027100187.

In the NSG-PBMC mouse model, several key markers of an allergic Type 2 disease are increased. The collective results of these experiments as shown in FIGS. 7 to 10 demonstrate that F27100187 was able to significantly inhibit key markers of an allergic Type 2 disease, demonstrating the in vivo pharmacodynamics effect of F27100187 on human type 2 makers.

6.11 Example 11: NSG-SGM3 Human Humanized Mouse Model to Evaluate F027100187 Mediated Target Occupancy and Pharmacodynamics In Vivo F027100187 targets both human OX40L and IL-13 and does not cross react with the murine orthologs. Hence, to evaluate the biological activities of F027100187, a xenografted, humanized model system was used. Female NSG-SGM3 (NOD/SCID-IL2Rγ–/–, NOD.Cg-Prkdcscidll2rγtm1Wjl/SzJ) engrafted with human CD34+ cells were obtained from Jackson labs, Bar Harbor, ME, USA. These mice express human hematopoietic cytokines: stem cell factor (SCF), granulocyte/macrophage stimulating factor (GM-CSF), and interleukin-3 (IL-3), all driven by a human cytomegalovirus promoter/enhancer sequence. The triple transgenic mouse produces above cytokines constitutively, providing cell proliferation and survival signals, supporting the stable engraftment of CD33+ myeloid lineages, and several types of lymphoid cells. Animals were 80 to 100 days post engraftment. Briefly, the protocol followed for engraftment is as follows:

Jackson labs provided data from engraftment checks performed by flow cytometry. The information from the engraftment check was used to assign mice to groups. Mice received subcutaneous doses of either vehicle or ISVD construct F27100187 on days 0, and 2. Mice were challenged intranasally with 7.5 µg in 20 pl of human IL-33 (Cat #200-33-500UG, Pepro Tech) on days 1, 2, and 3 days of the study. On day 4, while under isoflurane anesthesia, blood was collected by retro-orbital bleeds. Following blood collection and while still under isoflurane anesthesia, the mice were terminated by cervical dislocation. A portion of the lung was harvested and placed in media for human cell phenotyping (flow cytometry). Plasma levels of human cytokines and chemokines were determined by Lumenix evaluation (Cat #HSTCMAG28SPMX13, Milliplex). Plasma levels of human 11-13 from the day 20 plasma samples were determined by ELISA (Cat #88-7439-88, Invitrogen).

The collective results of these experiments as shown in FIG. 11 demonstrate that F027100187 was able to significantly inhibit detectable levels of human IL-13 in the plasma of humanized NSG-SGM3 mice, demonstrating target occupancy for human IL-13. Further, F027100187 was able to significantly inhibit key type 2 cytokines IL-5, TARC, and mouse eotaxin. These results therefore indicate the suitability of F027100187 for treating atopic dermatitis and/or asthma.

Example 12 Model of Allergic Asthma in Young Adult Rhesus

Thirty, 2-4 year old male rhesus macaque monkeys, from the California National Primate Research Center (CNPRC) were selected based upon: behavioral inhibition testing, pulmonary function testing (PFT) for methacholine responsiveness, effective concentration of 150 percent (EC150) (<3 mg/ml methacholine) and effective concentration of 200 percent (EC200) (<8 mg/ml methacholine) values. Physical exams, complete blood counts (CBC) and serum chemistry panels were completed on all animals enrolled in this study. All animals selected for this study were went hose dust mite (HDM) Sensitization. Bi-weekly animals received a single subcutaneous injection of approximately 60 ug HDM extract (D. *Pteronyssinus*, Greer B58A52) in 1 mg alum (1 ml total volume per injection, Thermo 77161), for 28 weeks.

Aerosolized HDM (8.5 ug Derp 1/ml, prepared from lyophilized D. *Pteronyssinus*, Greer) was administered by nebulizer on a biweekly basis starting at week 12 of the study. Study animals were sedated with ketamine and dexmedetomidine, then placed in a child safety seat in a semi-upright position. Sedated animals were subsequently fitted with a facemask that covers both the nose and mouth. A mouth block was placed to ensure maximal aerosol passage into the trachea and lung. A dose of atropine was administered to minimize the production of saliva that is typically the result of ketamine sedation, because excess saliva can lead to early termination of the procedure due to occlusion of the airways. Mask fit and head position were carefully adjusted to prevent leakage of aerosol without occluding the airway. HDM aerosol was administered through the facemask for approximately 5-15 minutes. Heart rate and oxygen saturation was continuously monitored throughout the procedure. Following the procedure, sedation was reversed with an equal dose of atipamezole.

Blood samples were collected at week 0, then weekly starting at week 18. At weeks 20 and 29, serum blood samples was collected for pharmacokinetic analysis following test article administration. HDM intradermal injections and skin biopsies took place on the shaved back of each study animal. Either 100 μl saline or HDM (1:1000 W/V in 100 μl saline) was injected intradermally per site for 8 sites per time point. HDM dermal reactivity and skin biopsies were conducted at weeks 19, 25, and 29. Biopsies were taken from the interscapular area using a 4 mm punch, and the site closed with skin glue or a suture, at the discretion of the veterinarian. Animals received ketoprofen (2-5 mg/kg, IM, SID×1-2 days post biopsy) following each biopsy.

Bronchoalveolar Lavage (BAL): Under sedation, animals were placed in a supine position. A laryngoscope was used to visual the larynx and the larynx was anesthetized with lidocaine. The bronchoscope was placed into the subsegmental bronchus. Two mg/kg of phosphate buffered saline (PBS) was instilled and aspirate by hand. This was repeated two times.

Cohort assignment: Groups of 6 animals were enrolled into one of three cohorts in a rolling fashion based up PFT criteria (defined in earlier section). Eosinophil frequency/number obtained from the BAL procedure during week 18 was used to assigned animals to treatment groups or control (vehicle) group.

Test Article Administration: Animals received vehicle or test article by subcutaneous administration starting at week 20. Test article consisted of F027100187, which was dosed weekly. Vehicle was also dosed weekly.

Necropsy: Animals will undergo necropsy either at the end of week 30 or 31 immediately following a final PFT and BAL procedure. Euthanasia will be conducted by an overdose of sodium pentobarbital. Blood will be collected and prepared for serum, plasma, and PBMC.

Lungs will be removed en bloc and sections from each lobe prepared for RNA, flow cytometry and histology.

Plasma levels of IL-5 were determined by Simoa (Cat #102860, Quanterix). Serum levels of IgE were determined by ELISA (Cat #KA2450, Abnova).

The results of these experiments as shown in FIG. 13 demonstrates that F027100187 was able to significantly inhibit inflammation in the lungs (Eosinophil density (histology), Bal IL-5 and percent eosinophils). FIG. 14 demonstrates that F027100187 was able to significantly inhibit inflammation in the skin (histology). FIG. 15 demonstrates that F027100187 was able to significantly inhibit systemic IgE production. Collectively, these results demonstrate the in-vivo efficacy of F027100187. These results further support that F27100187 is suitable for treating asthma.

7 INDUSTRIAL APPLICABILITY

The polypeptides, nucleic acid molecules encoding the same, vectors comprising the nucleic acids and compositions described herein may be used for example in the treatment of subjects suffering from inflammatory diseases.

The publications discussed herein are provided solely for their disclosure prior to the filing date of the present application. Nothing herein is to be construed as an admission that the present invention is not entitled to antedate such publication by virtue of prior invention.

While the invention has been described in connection with specific embodiments thereof, it will be understood that it is capable of further modifications and this application is intended to cover any variations, uses, or adaptations of the invention following, in general, the principles of the invention and including such departures from the present disclosure as come within known or customary practice within the art to which the invention pertains and as may be applied to the essential features hereinbefore set forth and as follows in the scope of the appended claims.

The invention claimed is:

1. A polypeptide comprising at least three immunoglobulin single variable domains (ISVDs), optionally linked via one or more peptidic linkers, wherein each of said ISVDs comprises three complementarity determining regions (CDR1 to CDR3, respectively); and wherein:
   a) a first ISVD that binds to OX40L and comprises:
      i. a CDR1 which has the amino acid sequence of SEQ ID NO: 6;
      ii. a CDR2 which has the amino acid sequence of SEQ ID NO: 10; and
      iii. a CDR3 which has the amino acid sequence of SEQ ID NO: 14;
   b) a second ISVD that binds to IL-13 and comprises:
      iv. a CDR1 which has the amino acid sequence of SEQ ID NO: 7;
      v. a CDR2 which has the amino acid sequence of SEQ ID NO: 11; and
      vi. a CDR3 which has the amino acid sequence of SEQ ID NO: 15; and
   c) a third ISVD that binds to IL-13 and comprises:
      vii. a CDR1 which has the amino acid sequence of SEQ ID NO: 9;
      viii. a CDR2 which has the amino acid sequence of SEQ ID NO: 13; and
      ix. a CDR3 which has the amino acid sequence of SEQ ID NO: 17.

2. The polypeptide according to claim 1, wherein:
   a) the amino acid sequence of said first ISVD has a sequence identity of more than 90% with SEQ ID NO: 2;

b) the amino acid sequence of said second ISVD has a sequence identity of more than 90% with SEQ ID NO: 3; and
c) the amino acid sequence of said third ISVD has a sequence identity of more than 90% identity with SEQ ID NO: 5.

3. The polypeptide according to claim 1, wherein:
a) said first ISVD has the amino acid sequence of SEQ ID NO: 2;
b) said second ISVD has the amino acid sequence of SEQ ID NO: 3; and
c) said third ISVD has the amino acid sequence of SEQ ID NO: 5.

4. The polypeptide according to claim 1, wherein said polypeptide further comprises one or more other groups, residues, moieties or binding units, optionally linked via one or more peptidic linkers, in which said one or more other groups, residues, moieties or binding units provide the polypeptide with increased half-life, compared to the corresponding polypeptide without said one or more other groups, residues, moieties or binding units.

5. The polypeptide according to claim 4, in which said one or more other groups, residues, moieties or binding units that provide the polypeptide with increased half-life is chosen from the group consisting of a polyethylene glycol molecule, serum proteins or fragments thereof, binding units that can bind to serum proteins, an Fc portion, and small proteins or peptides that can bind to serum proteins.

6. The polypeptide according to claim 4, in which said one or more other groups, residues, moieties or binding units that provide the polypeptide with increased half-life is an ISVD that binds to human serum albumin and comprises: a CDR1 having the amino acid sequence of SEQ ID NO:8; a CDR2 having the amino acid sequence of SEQ ID NO: 12; and a CDR3 having the amino acid sequence of SEQ ID NO: 16.

7. The polypeptide according to claim 1, further comprising a fourth ISVD, wherein the fourth ISVD comprises: i. a CDR1 which has the amino acid sequence of SEQ ID NO: 8 or has 2 or 1 amino acid difference(s) with SEQ ID NO: 8; ii. a CDR2 which has the amino acid sequence of SEQ ID NO: 12 or has 2 or 1 amino acid difference(s) with SEQ ID NO: 12; and iii. a CDR3 which has the amino acid sequence of SEQ ID NO: 16 or has 2 or 1 amino acid difference(s) with SEQ ID NO: 16.

8. The polypeptide according to claim 7, wherein the amino acid sequence of said fourth ISVD has a sequence identity of more than 90% with SEQ ID NO: 4.

9. The polypeptide according to claim 7, wherein said fourth ISVD has the amino acid sequence of SEQ ID NO: 4.

10. The polypeptide of claim 7, wherein the polypeptide comprises, from N-terminally to C-terminally, the first ISVD, the second ISVD, the fourth ISVD, and the third ISVD.

11. The polypeptide according to claim 1, wherein the amino acid sequence of the polypeptide has a sequence identity of more than 90% with SEQ ID NO: 1.

12. The polypeptide according to claim 1, wherein the amino acid sequence of the polypeptide has the amino acid sequence of SEQ ID NO: 1.

13. An isolated nucleic acid comprising a nucleotide sequence that encodes a polypeptide according to claim 1.

14. An isolated host cell comprising a nucleic acid according to claim 13.

15. A method for producing a polypeptide, said method comprising the steps of: a) expressing a nucleic acid according to claim 13; optionally followed by: b) isolating and/or purifying the polypeptide.

16. A composition comprising at least one polypeptide according to claim 1, optionally, wherein the composition is a pharmaceutical composition which further comprises: at least one pharmaceutically acceptable carrier, diluent or excipient and/or adjuvant; and/or one or more further pharmaceutically active polypeptides and/or compounds.

17. A method for the treatment of an inflammatory disease, wherein said inflammatory disease is selected from the group consisting of asthma and atopic dermatitis, said method comprising administering, to a subject in need thereof, a pharmaceutically active amount of a polypeptide according to claim 1.

18. The method according to claim 17, wherein the inflammatory disease is selected from the group consisting of asthma and atopic dermatitis.

19. The polypeptide of claim 1, wherein the polypeptide comprises, N-terminally to C-terminally, the first ISVD, the second ISVD, and the third ISVD.

20. An immunoglobulin single domain (ISVD) that specifically binds to human OX40L, wherein said ISVD comprises three complementarity determining regions (CDR1 to CDR3, respectively); and wherein: CDR1 has the amino acid sequence of SEQ ID NO: 6; CDR2 has the amino acid sequence of SEQ ID NO: 10; and CDR3 has the amino acid sequence of SEQ ID NO: 14.

* * * * *